(12) United States Patent
Williamson, IV

(10) Patent No.: US 11,774,330 B2
(45) Date of Patent: Oct. 3, 2023

(54) SECTIONABLE CASSETTE AND EMBEDDING FRAME WITH TISSUE IMMOBILIZING SEPARABLE LID, AND METHODS FOR PREPARING BIOPSY TISSUE SAMPLES

(71) Applicant: BioPath Automation, L.L.C., Marion, MA (US)

(72) Inventor: Warren P. Williamson, IV, Marion, MA (US)

(73) Assignee: BioPath Automation, LLC, Marion, MA (US)

( * ) Notice: Subject to any disclaimer, the term of this patent is extended or adjusted under 35 U.S.C. 154(b) by 0 days.

(21) Appl. No.: 17/544,247

(22) Filed: Dec. 7, 2021

(65) Prior Publication Data

US 2022/0090996 A1 Mar. 24, 2022

Related U.S. Application Data

(60) Division of application No. 15/886,917, filed on Feb. 2, 2018, now Pat. No. 11,226,272, which is a
(Continued)

(51) Int. Cl.
*G01N 1/00* (2006.01)
*G01N 1/31* (2006.01)
(Continued)

(52) U.S. Cl.
CPC ............. *G01N 1/312* (2013.01); *G01N 1/06* (2013.01); *G01N 1/36* (2013.01); *B01L 3/50825* (2013.01);
(Continued)

(58) Field of Classification Search
None
See application file for complete search history.

(56) References Cited

U.S. PATENT DOCUMENTS

| | | |
|---|---|---|
| 5,127,537 A | 7/1992 | Graham |
| 2008/0138854 A1* | 6/2008 | Williamson ............ B01L 3/508 435/40.52 |
| 2014/0271407 A1 | 9/2014 | Knorr et al. |

FOREIGN PATENT DOCUMENTS

| | | |
|---|---|---|
| WO | 0019897 A1 | 4/2000 |
| WO | 2008/073387 A1 | 6/2008 |

OTHER PUBLICATIONS

Canadian Intellectual Property Office, Canadian Office Action issued in related Canadian Application 2,994,393; dated Mar. 21, 2022; 5 pages.
(Continued)

*Primary Examiner* — Jyoti Nagpaul
(74) *Attorney, Agent, or Firm* — Rooney IP, LLC

(57) ABSTRACT

A histologic tissue sample support device includes a tissue cassette a frame, and a lid. The tissue cassette has a recess including a body with at least one side wall and a bottom wall and is formed of material that can be successfully sectioned in a microtome and is resistant to degradation from solvents and chemicals used to fix, process and stain tissue. The tissue cassette is movably coupled to the frame. The lid is separably coupled to a peripheral portion of the frame. When the lid is separated from the peripheral portion, the lid and the tissue cassette are capable of moving from a first position to a second position with respect to the frame, and in the second position the bottom wall and at least a portion of the side wall extend beyond a bottom edge of the frame for sectioning in the microtome.

7 Claims, 45 Drawing Sheets

Related U.S. Application Data continuation-in-part of application No. PCT/US2016/044379, filed on Jul. 28, 2016.

(60) Provisional application No. 62/356,170, filed on Jun. 29, 2016, provisional application No. 62/200,753, filed on Aug. 4, 2015.

(51) Int. Cl.
*G01N 1/06* (2006.01)
*G01N 1/36* (2006.01)
*B01L 3/00* (2006.01)

(52) U.S. Cl.
CPC ... *B01L 2200/025* (2013.01); *B01L 2300/042* (2013.01); *B01L 2300/043* (2013.01); *B01L 2300/0609* (2013.01); *B01L 2300/069* (2013.01); *G01N 2001/315* (2013.01); *G01N 2001/366* (2013.01)

(56) References Cited

OTHER PUBLICATIONS

Brazilian Patent Office, Brazilian Technical Opinion Report issued in related Brazilian Application BR1120180023558; dated Mar. 4, 2022; 5 pages.
U.S. Patent and Trademark Office, Final Office Action issued in U.S. Appl. No. 16/680,601; dated Apr. 18, 2022; 24 pages.
U.S. Patent and Trademark Office, Notice of Allowance issued in U.S. Appl. No. 16/680,601; dated Jul. 12, 2022; 12 pages.
Japanese Patent Office, Office Action in related JP Application No. 2021-159359, dated Oct. 31, 2022.
European Patent Office, Extended European Search Report in EP Application No. 20886503, dated Nov. 25, 2022.
Canadian Intellectual Property Office, Canadian Office Action issued in related Canadian Application 2,994,393; dated Jan. 18, 2023.
Australian Patent Office, Australian Examination Report No. 1 in related Australian Patent Application 2022201012, dated Feb. 9, 2023.
Chinese Patent Office, Chinese Office Action issued in Chinese Patent Application 2020800777165, dated Mar. 31, 2023.
Australian Patent Office, Australian Examination Report No. 2 in related Australian Patent Application 2022201012, dated Jul. 4, 2023.
Canadian Patent Office, Notice of Allowance in related Canadian Patent Application No. 2994393, dated Jun. 22, 2023.

\* cited by examiner

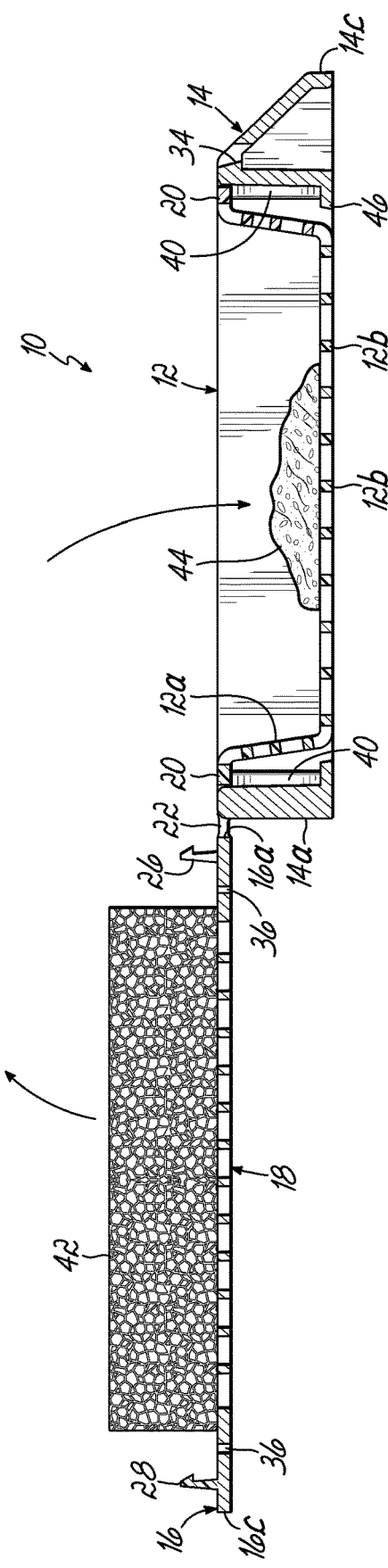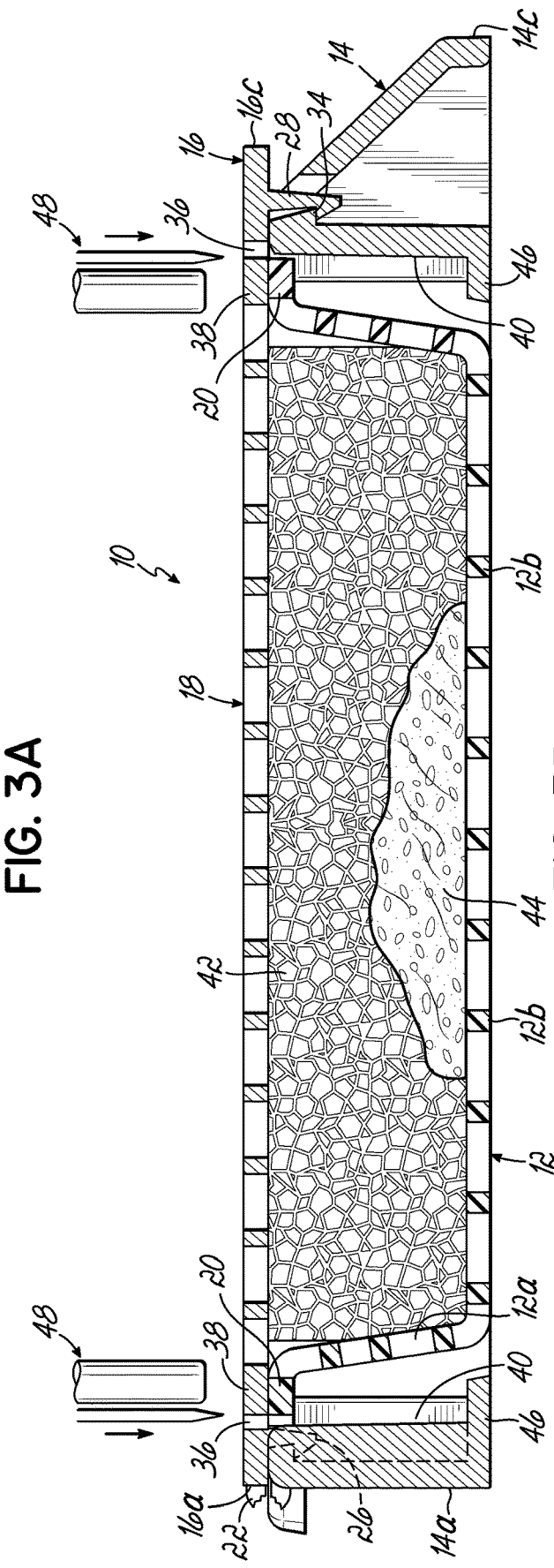

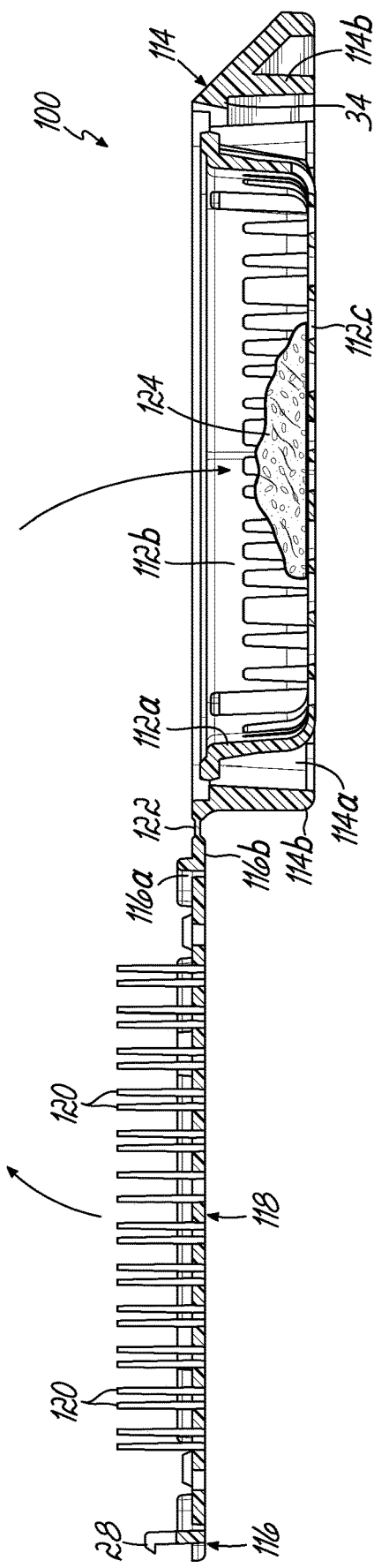
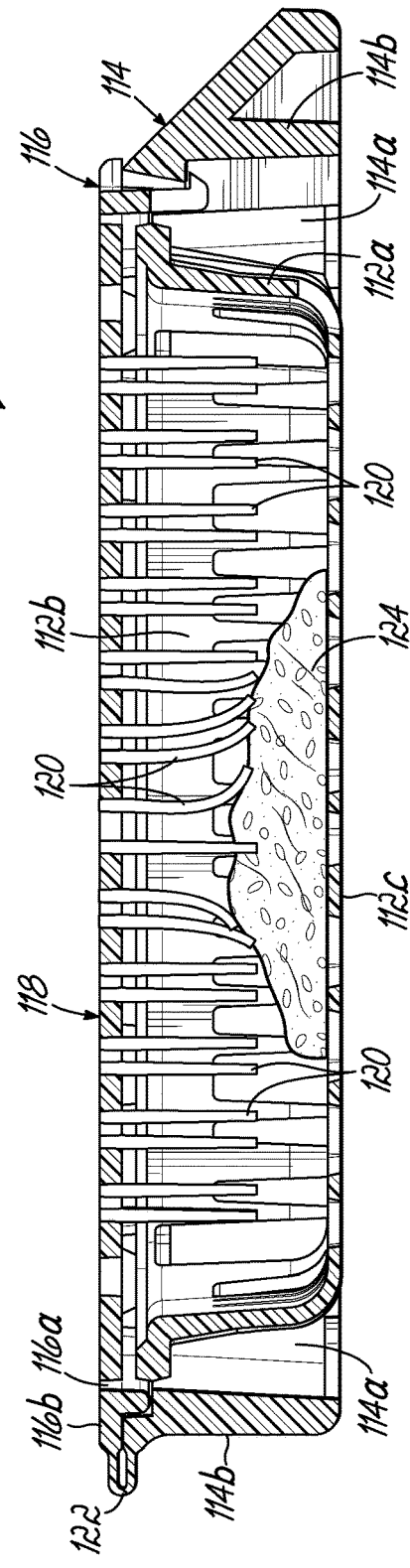
FIG. 10A
FIG. 10B

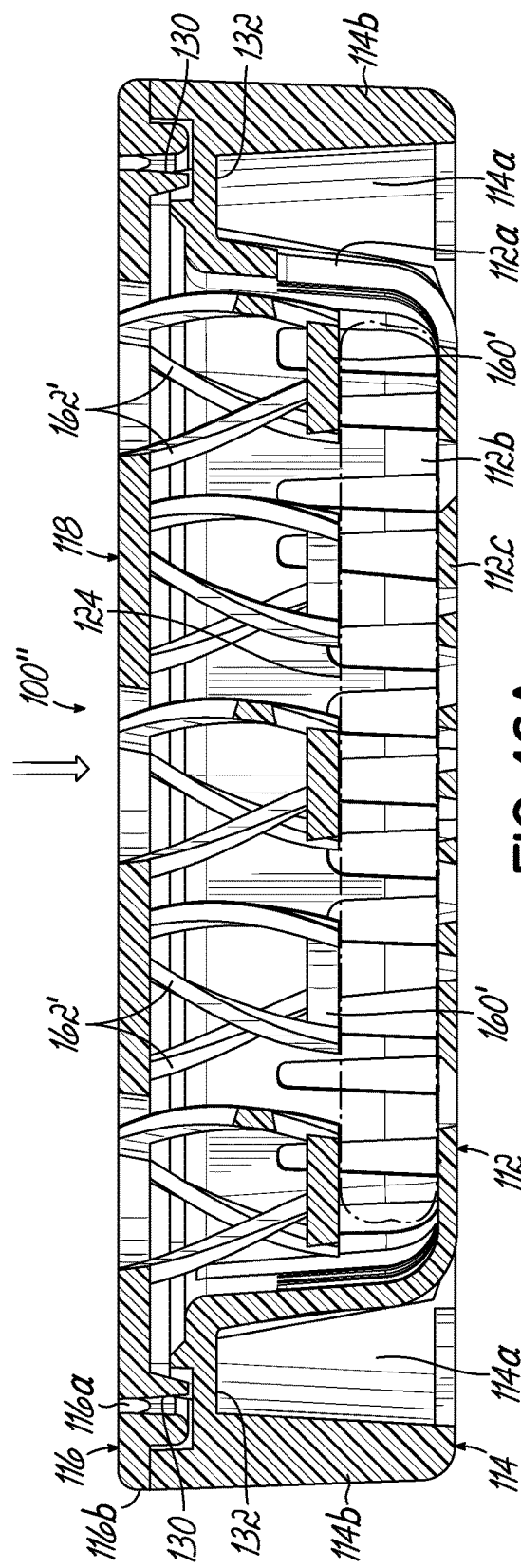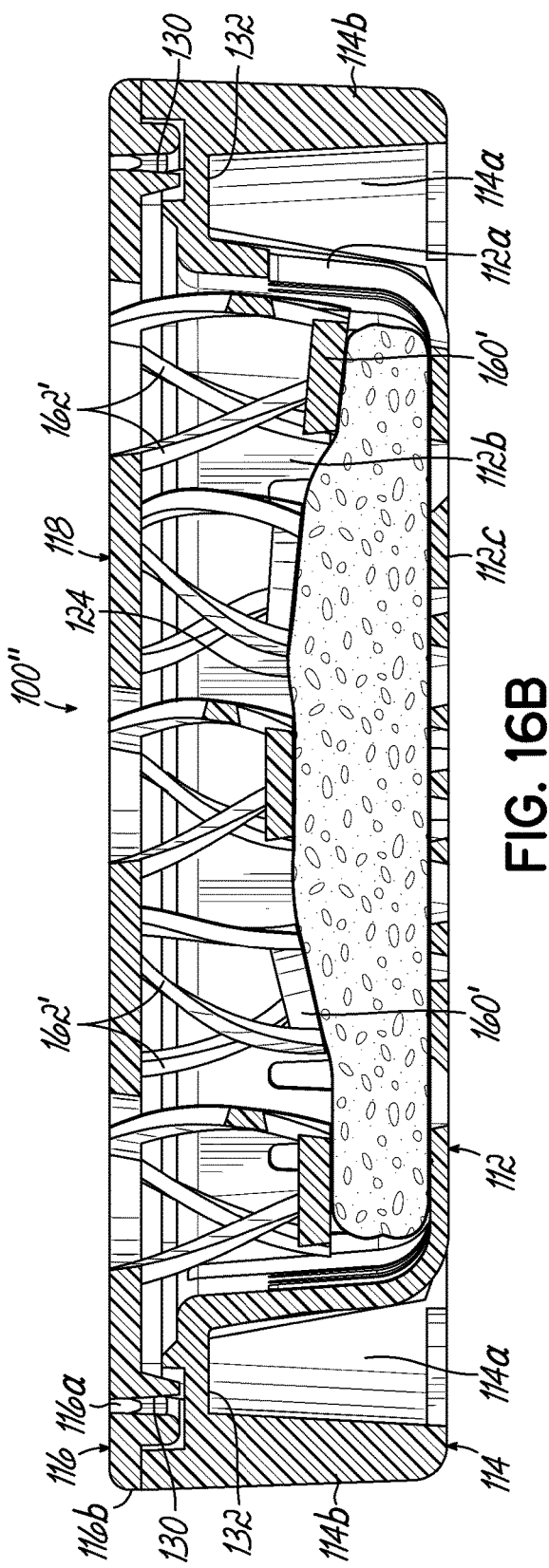

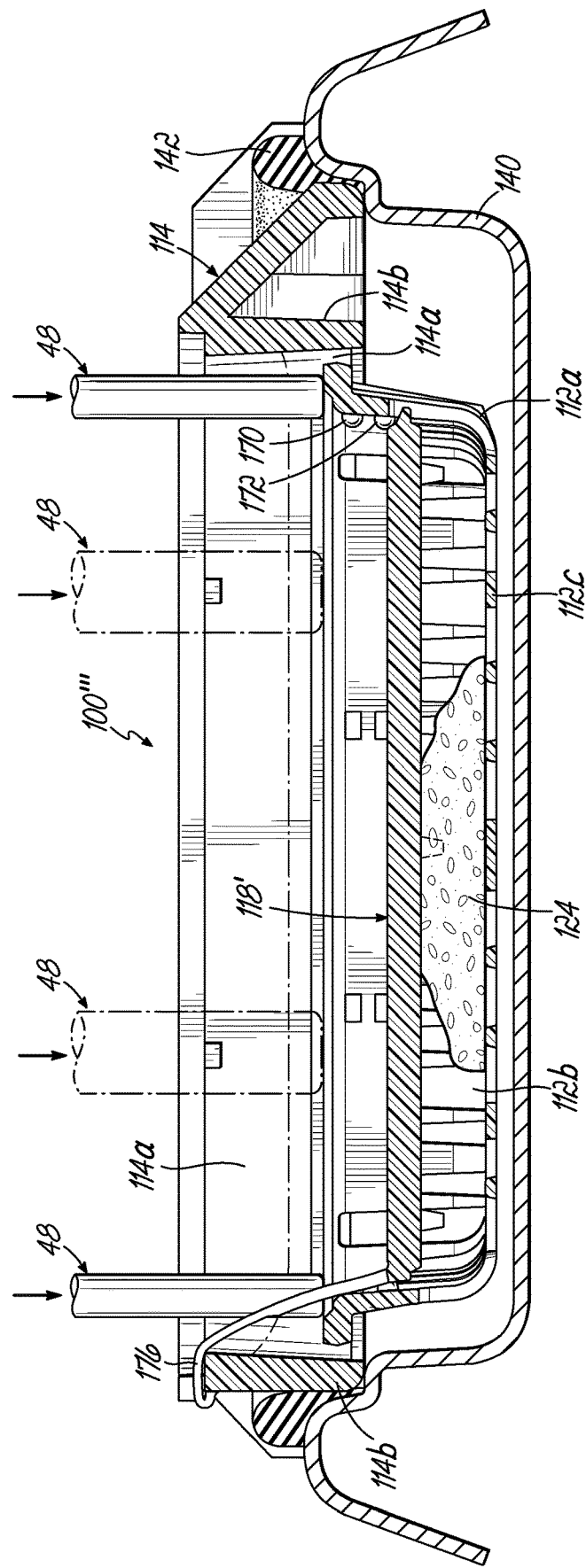

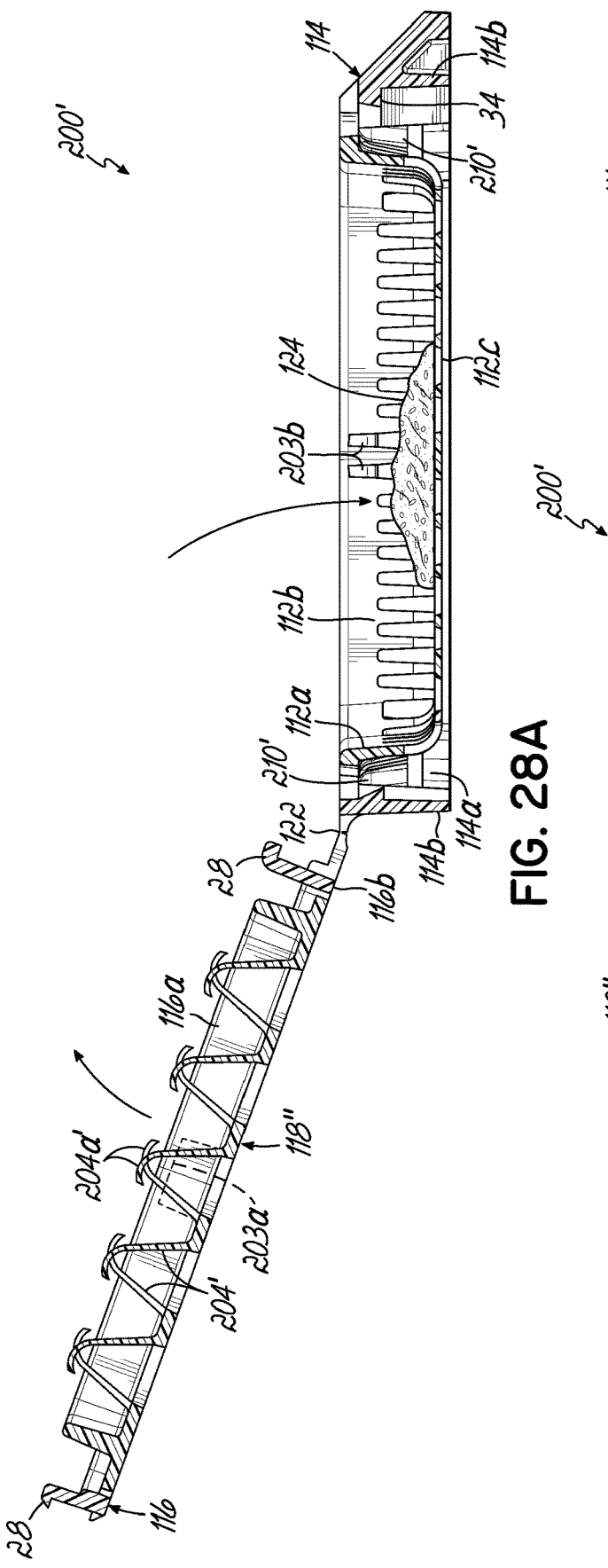
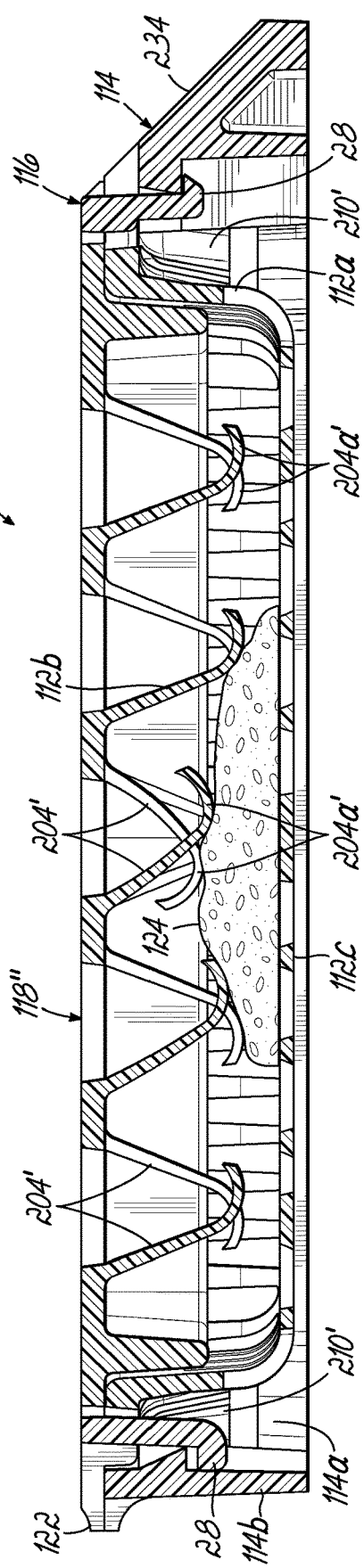
FIG. 28A
FIG. 28B

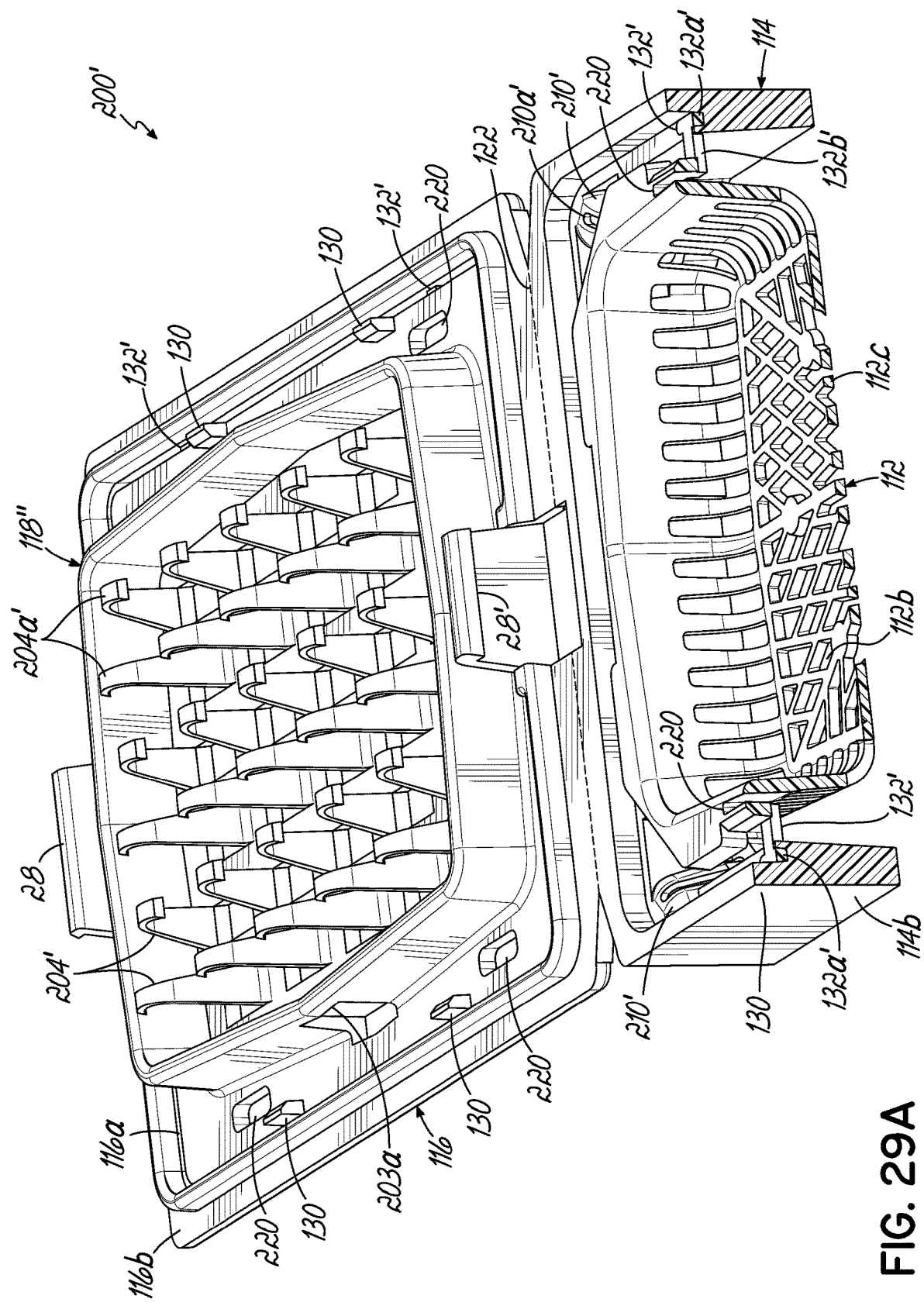

SECTIONABLE CASSETTE AND EMBEDDING FRAME WITH TISSUE IMMOBILIZING SEPARABLE LID, AND METHODS FOR PREPARING BIOPSY TISSUE SAMPLES

CROSS-REFERENCE TO RELATED APPLICATIONS

This application is a divisional of U.S. patent application Ser. No. 15/886,917, filed Feb. 2, 2018 (pending), which is a continuation-in-part of PCT Application Serial No. PCT/US2016/044379, filed Jul. 28, 2016 (expired), which relates to and claims the priority of U.S. Provisional Patent Application Ser. No. 62/200,753, filed Aug. 4, 2015 and U.S. Provisional Patent Application Ser. No. 62/356,170, filed Jun. 29, 2016, the disclosures of which are incorporated by reference herein in their entirety.

TECHNICAL FIELD

The present invention generally relates to supports for handling and embedding tissue samples for pathological analysis and, more particularly, to microtome sectionable supports which can receive one or more tissue samples and a support frame having a tissue immobilizing separable lid.

BACKGROUND

To accurately diagnose various tissue diseases and conditions, medical personnel must remove one or more samples of tissue from the body of a patient. This process of harvesting tissue from the body is known as a biopsy. Once the tissue sample or samples are removed and sent to a pathology laboratory, the tissue will go through a series of procedures performed by a histotechnician and, ultimately, a pathologist, in order to diagnose one or more conditions associated with the tissue. The present invention generally relates to those procedures that are normally performed by the histotechnician to prepare the tissue sample or samples into slides that may be analyzed under a microscope by the pathologist.

Although the singular term "sample" is used throughout this specification, it should be understood that this term likewise encompasses plural "samples" as well. Once a tissue sample is removed from the body of a patient, it is typically placed into a specimen container containing a tissue fixative solution and then the container is transported to a pathology laboratory. The tissue will undergo a process known as "grossing-in" in the pathology lab during which a histotechnician will retrieve the tissue sample from the container, typically cut the tissue into appropriate sizes for tissue processing, place individual samples into the appropriate sized small plastic tissue cassettes, and assign tracking numbers to each cassette. The assignment of tracking numbers is usually done by printing the tracking number on the cassette, or onto a label which is then applied to the cassette. These tracking numbers are then logged into a tracking system used in the laboratory. For the smallest tissue samples, which may only be scrapings, the cassette includes fine mesh openings on the sides and bottoms. In other situations involving very small tissue samples, the samples are placed into a bag that resembles a tea bag that prevents the smallest tissue samples from escaping. Larger tissue samples are placed into cassettes having somewhat larger slotted openings which are nevertheless smaller than the tissue sample inside the cassette.

The cassettes are then placed into a stainless steel perforated basket and run through a tissue processing machine, often overnight. This machine uses a combination of vacuum, heat, and liquid reagents or chemicals to remove the interstitial fluids within the tissue. Once the fluids have been removed from the tissue samples, the processing machine immerses the tissues samples in a bath of a hardenable material such as molten paraffin (i.e., a form of wax) so that the interstices in the tissue are replaced with paraffin. The histotechnician then removes the basket from the machine and removes the individual tissue cassettes. In a conventional procedure practiced for many years, the histotechnician individually removes the tissue sample from each cassette. The histotechnician must carefully orient the tissue sample, based on tissue type, into a stainless steel base mold that is roughly the size of the tissue cassette and is partially filled with molten paraffin. The tissue sample must be manually held, typically using forceps, against the bottom of the mold. If it is not, this could compromise the ability to make proper slices of the tissue sample later in a microtome. The molten paraffin is then rapidly cooled on a refrigerated plate, which may be a thermal electric cooler (TEC), to partially solidify the paraffin thereby holding the tissue sample in the proper orientation against the bottom of the mold.

The cassette is then placed on top of the base mold and an embedding material, which is also typically paraffin wax, is poured through the opened top of the cassette into the base mold. The cassette changes its function at this point in the procedure from a tissue holding component to a fixture type device for mounting in the microtome and making shavings or slices from the solidified paraffin block (containing the tissue sample) in the microtome. The base mold is chilled until all of the molten paraffin has hardened and the histotechnician removes the stainless steel base mold from the block of paraffin and embedded tissue. The tissue sample is thus embedded within a rectangular block of hard paraffin with a plastic tissue cassette on the opposite side. As mentioned, the cassette may then be used as a holder or fixture in the chuck of the microtome. As with the tissue processing machine, the embedding process is accomplished in a batch fashion during which an average histotechnician may process approximately 40 to 60 cassettes per hour into blocks of embedded tissue.

The blocks of hardened paraffin containing the embedded tissue samples are then ready to be sliced into extremely thin sections for placement on a microscope slide. The histotechnician mounts the embedded tissue block in a chuck on the microtome sized to accept the side of the block that has the embedded plastic cassette. The histotechnician can then begin slicing the paraffin block which has the tissue sample embedded opposite to the plastic cassette surface. This yields a ribbon of individual slices of the tissue embedded in the hardened paraffin. The action of the microtome causes the individual slices to stick together when done properly and, subsequently, these very thin ribbons of slices are floated into a water bath and a glass slide is carefully placed underneath the slice. Each slice, with the thin sectioned tissue sample embedded therein, is then adhered to the top of a microscope slide.

When the histotechnician has enough slides from the tissue sample, the slides are placed into an automatic staining machine. The staining machine goes through a series of infiltrating steps to stain the different tissue and cells of the slide different colors. This helps the pathologist identify different structures and makes it easier to find any abnormalities in the tissue. After the staining procedure is complete, the slides are cover slipped and prepared for the pathologist to place under a microscope for analysis.

Based on the summary of the procedure provided above, it will be appreciated that conventional tissue sample handling and processing is a very labor-intensive process involving several manual steps performed by a histotechnician. Thus, repetitive stress injuries such as carpal tunnel syndrome are prevalent. This is especially true with the tissue sample embedding process. These multiple manual operations and repeated tissue handling increase the likelihood of human error and, moreover, require highly trained and skilled histotechnicians to ensure that the tissue samples ultimately adhered to the slides for analysis by the pathologist are in an optimum condition and orientation to make accurate diagnoses.

U.S. Pat. No. 5,817,032 (the '032 patent), U.S. Pat. Nos. 7,156,814, 7,179,424, 7,722,810, 7,776,274 and 8,383,067 disclose various improvements to this area of technology, including new manners of holding tissue samples during the grossing in, embedding, and microtome or slicing procedures. The disclosures of the '032 patent, U.S. Pat. Nos. 7,156,814, 7,179,424, 7,722,810, 7,776,274 and 8,383,067 are hereby fully incorporated by reference herein. For example, the '032 patent relates to a tissue trapping and supporting device, which may be a cassette, and which may be successfully sectioned using a microtome. When such a cassette is used, the tissue sample is immobilized within the cassette and subjected to the process for replacing tissue fluids with paraffin. Then, both the tissue sample and the cassette are sliced at the same time for later mounting on microscope slides. Because the tissue sample is never removed from the cassette from the time it is processed in the tissue processing machine to the time that it is cut or sliced with the microtome, a significant amount of handling time is saved. Moreover, the chance for human error or tissue loss is significantly reduced due to the elimination of separate tissue handling steps. The '032 patent and the other above-incorporated patent properties also generally disclose further improvements that help to automate the overall process and, in conjunction with the novel tissue supports (e.g., cassettes), can even further reduce the handling steps during the entire procedure and make the procedure more reliable.

Various drawbacks of current procedures and limits on innovation exist. For instance, improvements to the outer form of the cassette and frame are bounded by existing limits of histopathology lab equipment such as tissue processing retorts, and "input devices" for tissue processors, embedding stations, and microtomes. Many of these processes are integrated with systems and machines for automation of the steps and robotic handling further limiting the potential for innovation. Additionally, costs for materials have been rising in recent years, especially for the fluoropolymer (FEP/PFA) sectionable plastics useful in sectionable cassettes. Each cassette is essentially consumed by the sectioning procedure, which adds to the cost of the pathology procedure. Further, because the sectionable FEP/PFA material is not rigid, it is challenging to manufacture a secure lid from this material that will not dimensionally distort during transit and storage. Currently, frames and cassette baskets are shipped to the customer in separate boxes and must be assembled by the user. With increased scrutiny on healthcare costs due to governmental and competitive forces, the need for a lower-cost device and ways to reduce labor are necessary.

In spite of the various advances made in this field, there is an increasing need for additional improvements related to increased production capability and more consistent quality of embedded tissue samples and resulting slices or ribbons of embedded tissue that will be subject to diagnosis. This can be especially important when handling smaller tissue sample sizes, although the improvements to be disclosed herein are applicable to all tissue sample sizes.

SUMMARY

In accordance with one embodiment, a histologic tissue sample support device includes a tissue cassette having a recess including at least one side wall and a bottom wall. The tissue cassette is formed of material that can be successfully sectioned in a microtome and is resistant to degradation from solvents and chemicals used to fix, process and stain tissue. The device further includes a frame including a peripheral portion and a bottom edge, the tissue cassette being movably coupled to the frame, and a lid separably coupled to the peripheral portion of the frame. It will be appreciated that the lid may be coupled to the peripheral portion in a frangible manner or in any other separable manner. When the lid is separated from the peripheral portion, the lid and the tissue cassette are capable of moving from a first position to a second position with respect to the frame, and in the second position the bottom wall and at least a portion of the side wall extend beyond the bottom edge of the frame for sectioning in the microtome.

In accordance with another embodiment, a histologic tissue sample support device includes a tissue cassette having a recess including at least one side wall and a bottom wall. The tissue cassette is formed of material that can be successfully sectioned in a microtome and is resistant to degradation from solvents and chemicals used to fix, process and stain tissue. The device further includes a frame including a peripheral portion and a bottom edge. The tissue cassette is movably coupled to the frame. A microtome sectionable, resilient structure is configured to engage and retain tissue in place during processing and embedding. A lid is separably coupled to the peripheral portion of the frame and may be coupled to the resilient structure. The lid is used to compress the resilient structure against the tissue. The resilient structure is capable of being successfully sectioned in the microtome and porous to allow infiltration of the solvents and chemicals used to fix, process and stain tissue, and of embedding material used to embed the tissue while the tissue is retained by the resilient structure in the recess. When the lid is separated from the peripheral portion, the lid and the tissue cassette are capable of moving from a first position to a second position with respect to the frame, and in the second position the bottom wall, at least a portion of the side wall, and at least a portion of the resilient structure extend beyond the bottom edge of the frame for sectioning in the microtome.

The invention further provides a method of preparing one or more biopsy tissue samples for histological examination using a histologic tissue sample support device. The support device includes a microtome sectionable tissue cassette, a frame including a peripheral portion, and a lid separably coupled to the peripheral portion of the frame. The method includes positioning a tissue sample in the tissue cassette, closing the peripheral portion of the frame and the lid when the tissue cassette is in a first position relative to the frame, separating the lid from the peripheral portion of the frame, and moving the lid and the tissue cassette into a second position relative to the frame where a portion of the tissue cassette extends beyond an edge of the frame for sectioning in the microtome.

In accordance with another embodiment, an apparatus for holding a histologic tissue sample while sectioning the tissue sample in a microtome includes a tissue cassette having a recess including at least one side wall and a bottom wall. The tissue cassette is configured to hold the tissue sample, and is formed of a first material that can be successfully sectioned in a microtome, and resistant to degradation from solvents and chemicals used to fix and process the tissue sample during a histologic procedure. The apparatus further includes a frame having a peripheral portion and a lid, the frame being formed from a second material different from the first material and being formed integrally with the tissue cassette. The lid is separably coupled to the peripheral portion.

A method for manufacturing an apparatus for holding a histologic tissue sample while sectioning the tissue sample in a microtome includes molding a tissue cassette having a recess including at least one side wall and a bottom wall, the tissue cassette being formed of a first material that can be successfully sectioned in a microtome, the tissue cassette further being resistant to degradation from solvents and chemicals used to fix and process the tissue sample during a histologic procedure, and molding a frame such that the frame is integrally coupled with the tissue cassette, the frame having a peripheral portion, being formed from a second material different from the first material, and including a lid separably coupled to the peripheral portion.

Embodiments of the invention further provide histologic tissue sample support devices comprising a tissue cassette having a recess including at least one side wall and a bottom wall. The tissue cassette is formed of material that can be successfully sectioned in a microtome and is resistant to degradation from solvents and chemicals used to fix, process and stain tissue. A frame includes a bottom edge. The tissue cassette is movably coupled to the frame. A lid is coupled to the frame wherein the lid and the tissue cassette are capable of moving from a first position to a second position with respect to the frame, and in the second position the bottom wall and at least a portion of the side wall extend beyond the bottom edge of the frame for sectioning in the microtome.

In additional or alternative aspects, the lid is coupled to the frame with a hinge. The cassette is coupled to the frame with at least one breakaway connection. Likewise, the lid may be coupled to a portion of the frame, such as a frame portion that surrounds the lid, with at least one breakaway connection. The lid may move from an open position to a closed position and in various embodiments from a closed position to an open position, and is capable of latching to the tissue cassette in the closed position. The cassette, lid and frame may be molded from a single material. The cassette and frame may alternatively be formed using other techniques such as by being co-molded or insert molded respectively from different materials.

In additional aspects, or as alternative aspects, the breakaway connection between the lid and the frame may accommodate movement of the lid with respect to a peripheral frame portion around the lid without causing warpage or undesirable distortions of the lid or the frame. Likewise, the breakaway connection or connections may accommodate movement of the cassette with respect to the frame without causing warpage or undesirable distortions of the cassette or the frame. These breakaway connections may be formed from a first material that can be successfully sectioned in a microtome, and is resistant to degradation from solvents and chemicals used to fix and process the tissue sample during a histologic procedure. The frame, including the peripheral portion of the frame that surrounds the lid is formed from a second material different from the first material and being formed integrally with the tissue cassette and/or the lid. In embodiments in which the breakaway connections accommodate relative movement between the lid and the peripheral frame portion and/or between the cassette and the frame, the lid, breakaway connections, and the cassette may be formed from the first material.

A method is provided for preparing one or more biopsy tissue samples for histological examination using a histologic tissue sample support device, the support device including a microtome sectionable tissue cassette, a frame, and a lid coupled to the frame. The method comprises positioning a tissue sample in the tissue cassette, closing the lid when the tissue cassette is in a first position relative to the frame and moving the lid and the tissue cassette into a second position relative to the frame where a portion of the tissue cassette extends beyond an edge of the frame for sectioning in the microtome.

The method may further comprise subjecting the tissue cassette and the tissue sample to a process that replaces fluid in the tissue sample with a hardenable material before or after moving the lid and the tissue cassette into the second position, embedding the tissue cassette and the tissue sample in an embedding material, hardening the embedding material into a block, and slicing the block with a microtome into thin slices of the embedding material, the tissue cassette, and the tissue sample. The method may further comprise after hardening the embedding material into a block, positioning the histologic tissue sample support device in a microtome. The method may further comprise latching the lid to the tissue cassette.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

FIG. 3A is a cross sectional view of the assembly of FIG. 1 taken generally along line 3A-3A of FIG. 2 showing the tissue cassette and the frame in the open position ready to accept tissue in the tissue cassette.

FIG. 3B is a cross sectional view of the assembly of FIG. 1 taken generally along line 3A-3A of FIG. 2 but showing the peripheral portion of the frame and the lid in the closed position.

FIGS. 10 and 10B are respective cross sectional views (taken along line 10A-10A of FIG. 9) of the structure illustrated in FIG. 9, with FIG. 10A showing the lid in an open position and FIG. 10B illustrating the lid in a closed position.

FIG. 16A is a cross sectional view (taken along line 16-16 of FIG. 15) of the integrated cassette and frame structure from FIG. 15, but illustrating the lid in a closed position.

FIG. 16B is a cross sectional view similar to FIG. 16A, but illustrating the lid structure engaging a tissue sample within the cassette recess and against the bottom wall.

FIG. 19C is a cross sectional view similar to FIG. 19B, but illustrating the lid portion compressed or moved downwardly against a tissue sample within the cassette body, and illustrating the cassette staged downwardly with respect to the frame and into a second position and into a mold.

FIG. 28A is a cross sectional view taken along line 28-28 of FIG. 26.

FIG. 28B is a side cross sectional view similar to FIG. 28A, but illustrating the lid in a closed position.

FIG. 29A is a partially sectioned, perspective view of the device shown in FIG. 25, with the lid in the open position.

DETAILED DESCRIPTION

Figure 1:
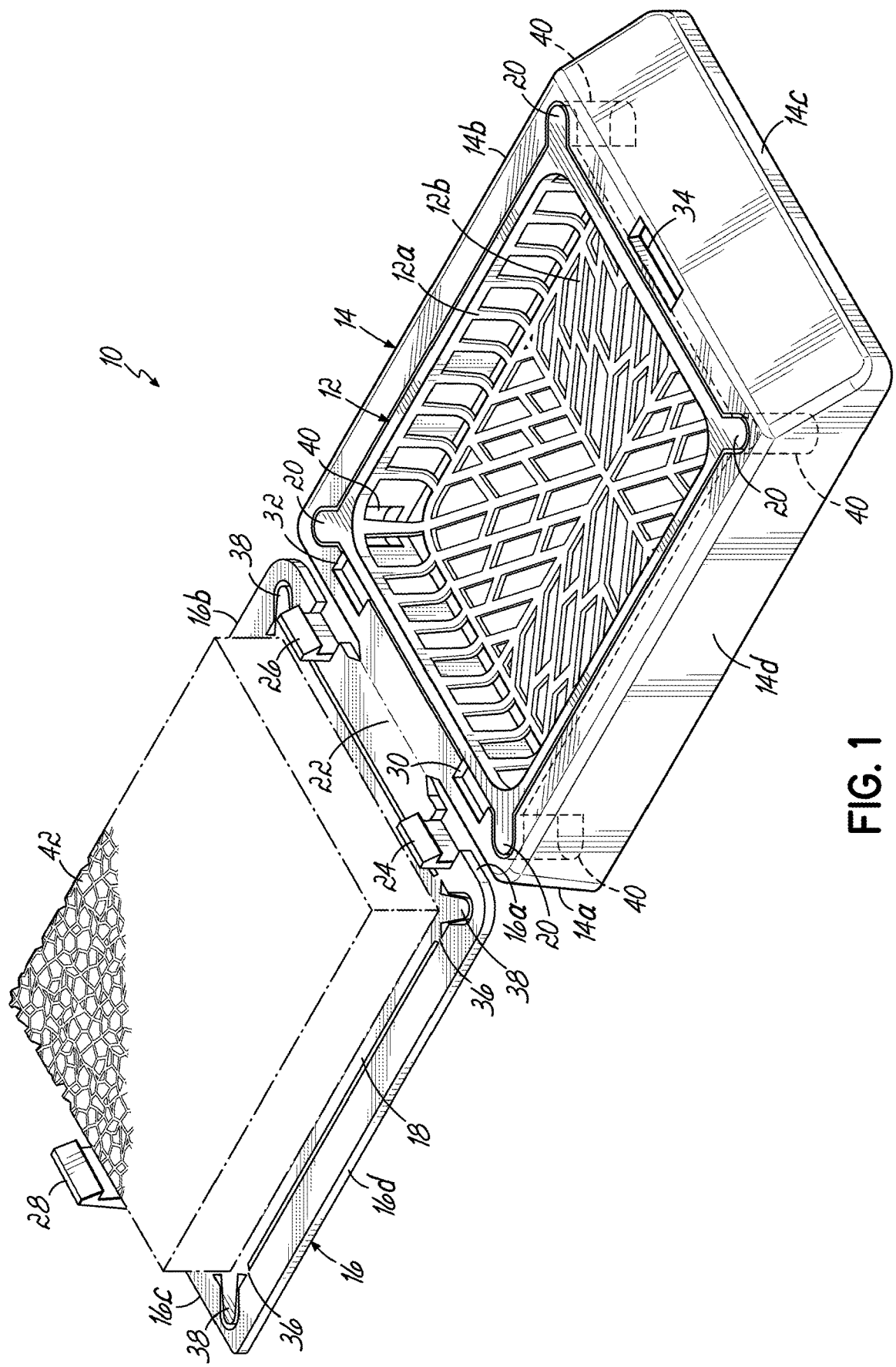
FIG. 1 is a perspective view of an assembly according to one embodiment.
Figure 2:
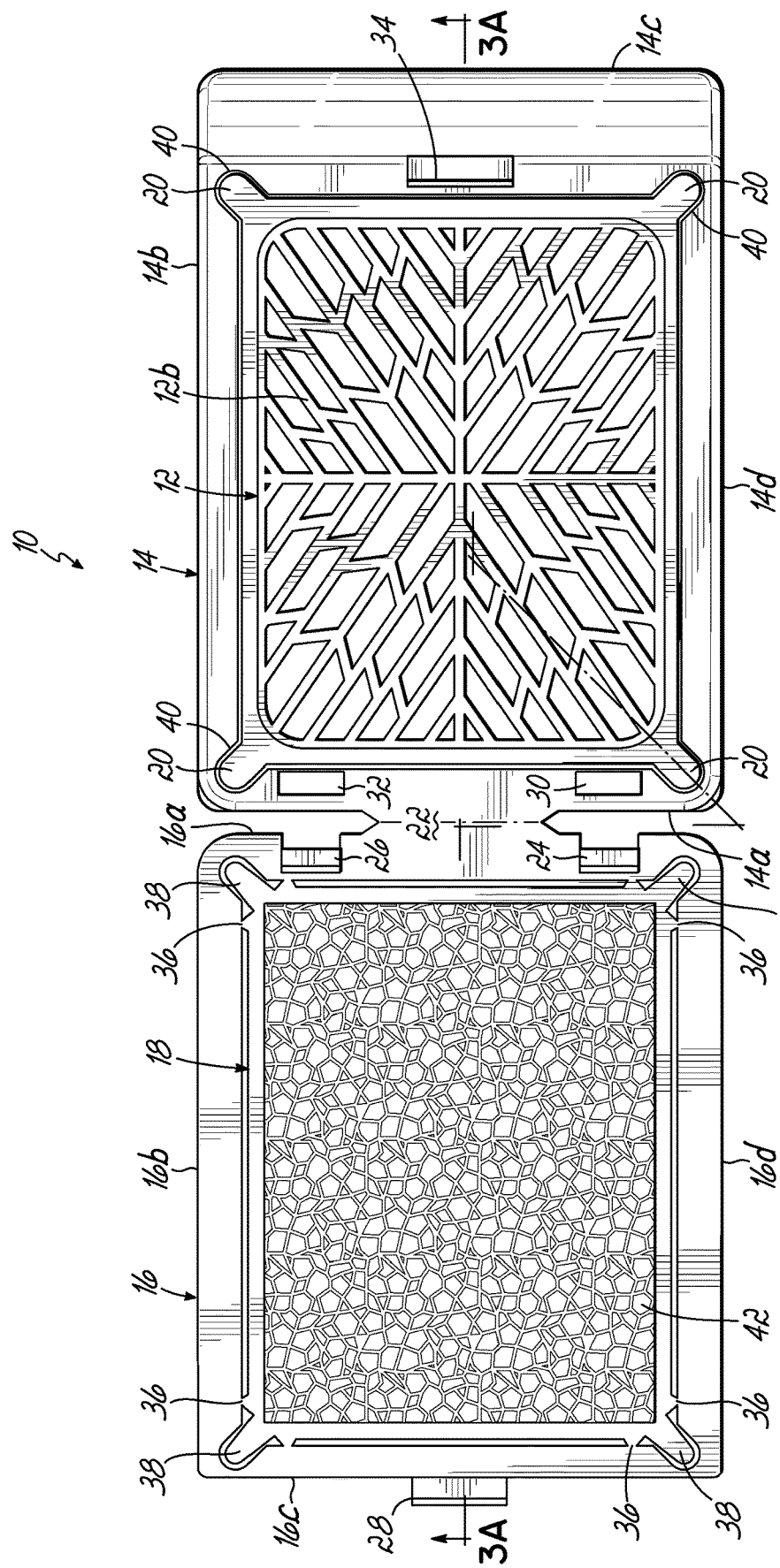
FIG. 2 is a top view of the assembly of FIG. 1 showing the tissue cassette and the frame in the open position ready to accept tissue in the tissue cassette.

Referring first to FIGS. 1 and 2, an assembly 10 constructed in accordance with an illustrative embodiment of the invention is shown. Assembly 10 includes a tissue sample cassette 12 carried within a frame 14, which includes a peripheral portion 16. A lid 18 is separably coupled to peripheral portion 16. Peripheral portion 16 generally includes an interior defined between surrounding walls 16a, 16b, 16c, 16d, and lid 18 is sized and configured to fit in the interior and is separably coupled to at least one of the surrounding walls 16a, 16b, 16c, 16d. The frame 14 generally includes an interior defined between surrounding outer walls 14a, 14b, 14c, 14d and the cassette 12 is sized and configured to frictionally or "snap" fit and move within the interior between at least first and second positions, again, as generally discussed in the above-incorporated patent properties and for the same purposes. The first position is shown in FIG. 3B, while the second, "staged" position is shown in FIG. 3C in which the lower portion of the cassette 12 is exposed below the bottom of the frame 14 for allowing cassette 12 and embedded tissue sample to be sectioned in a microtome while the frame 14 is held in the microtome chuck.

The connection of the tissue cassette 12 to the frame 14 may be accomplished in many different manners, such as any of the manners described in the above-incorporated patent properties. Alternatively, the cassette 12 may be coupled to the frame in other novel manners such as described hereinbelow. In the illustrative embodiment, cassette 12 includes cassette retention tabs 20 that are frictionally secured in retention slots 40 of frame 14. The friction fit between the tabs 20 and the slots 40 prevents unwanted movement of the cassette 12 between the first and second positions. Slots 40 are tapered such that slots 40 are narrower at the bottom than at the top. In this regard, the force required to move the cassette retention tabs 20 to the second position is less than the force required to move the tabs 20 to the first position. It will be appreciated that cassette 12 may be configured in any suitable manner as a tissue support and frame 14 may be configured in any suitable manner. Any of the configurations, features, characteristics and materials disclosed for the tissue supports (e.g., cassettes) and frames in the above-incorporated patent properties may be employed for cassette 12 and frame 14. In the embodiment shown, cassette 12 is porous and is releasably retained in frame 14 and frame 14 is further configured to be releasably secured within a microtome chuck (shown in FIG. 4). The general procedure for processing, embedding, and sectioning is discussed in the above-incorporated patent properties in more detail.

Figure 3C:
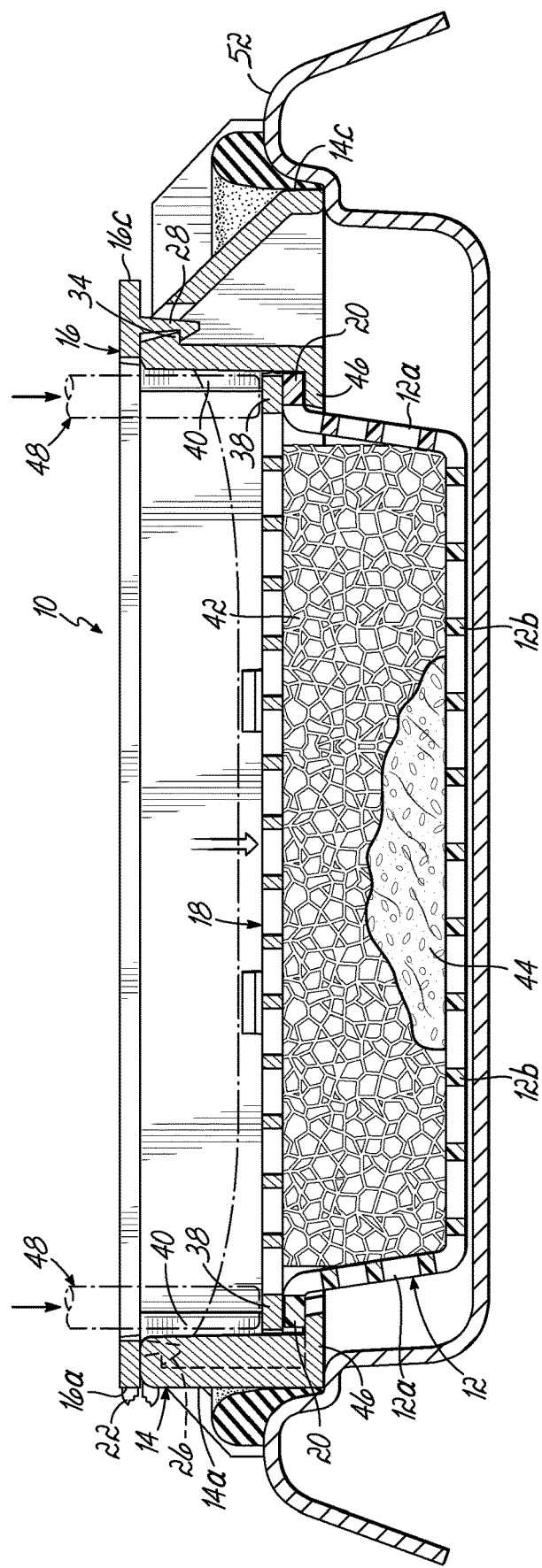
FIG. 3C is a cross sectional view of a portion of the assembly of FIG. 1 taken generally along line 3A-3A of FIG. 2 but showing the assembly in a staged or second position where the lid is separated from the peripheral portion of the frame and the tissue and a portion of the tissue cassette are ready to be embedded and then sectioned in a microtome.

Now referring to FIGS. 2 and 3A, the connections between frame 14, peripheral portion 16, and lid 18 are shown in more detail. Peripheral portion 16 is coupled to wall 14a of frame 14 by a frangible hinge 22. Peripheral portion 16 snap fits into a closed position through the engagement of latches 24, 26, 28 with frame 14 as shown in FIG. 3B. Latches 24, 26 are positioned on outer wall 16a of peripheral portion 16 and engage with openings 30, 32 in wall 14a of frame 14 respectively. Latch 28 is positioned on wall 16c of peripheral portion 16 and engages with an outer flange 34 of wall 14c of frame 14. Lid 18 is separably coupled to peripheral frame portion 16 through breakaway connections 36 on surrounding walls 16a, 16b, 16c, 16d. Lid 18 is sized and configured to frictionally or "snap" fit and move within the interior of frame 14 between at least first and second positions, as shown best in FIGS. 3B and 3C. More particularly, lid 18 includes lid retention tabs 38 on each of the four corners of lid 18. Retention tabs 38 are configured to engage with retention slots 40 of frame 14, which are on each of the four corners of frame 14. Lid 18 carries a resilient structure 42 on the central portion of lid 18.

Resilient structure 42 is a compliant structure that holds the tissue in the desired orientation without creating an artifact impression on the tissue sample 44 during processing. As shown in FIG. 3A, one or more tissue samples 44 may be placed in cassette 12 that defines a recess or interior area surrounded by at least one sidewall 12a and including a bottom wall 12b. Although a rectangular recess is shown, it will be appreciated that any other shape, such as cylindrical or circular shapes or shapes with troughs or alignment features for the tissue sample 44, may be used instead.

The porosity of resilient structure 42 allows infiltration of the solvents and chemicals used to fix, process, and stain tissue, and of embedding material used to embed the tissue while the tissue is retained by resilient structure 42. Resilient structure 42 has a thickness that is compressible and configured to engage and retain tissue in place during processing and embedding. Further, resilient structure 42 is capable of successful sectioning in the microtome after having its interstices or pores filled with liquefied embedding material which subsequently hardens. Resilient structure 42 may, for example, be an open cell foam material, such as a foam including at least one of a polyether or a polyurethane and which may be a fully reticulated open cell foam. Here, "fully reticulated" means that at least substantially all cells of the foam are open. The open cells help ensure full infiltration and eventual draining of the fluids used during processing and embedding procedures. Resilient structure 42 may further be a gel, sectionable plastic, polyesters, alginates, or other materials that may be infiltrated with the embedding material and successfully sectioned in a microtome without adverse effects on the resulting ribbon of tissue and embedding material.

With reference now to FIG. 3B, assembly 10 is shown with peripheral portion 16 in the closed position and where cassette 12 and lid 18 are in a first position. Once the tissue is loaded in the interior or recess of cassette 12, peripheral portion 16 may be rotated to the closed position. As peripheral portion 16 is moved from the open position to the closed position, frangible hinge 22 severs. Once hinge 22 is severed, peripheral portion 16 may continue to rotate until latches 24, 26, 28 engage with openings 30, 32 and outer flange 34 of frame 14, securely locking peripheral portion 16 to frame 14. With peripheral portion 16 in the closed position, resilient structure 42 biases the tissue sample 44 towards bottom wall 12b of cassette 12. With peripheral portion 16 securely closed on frame 14, cassette 12 is trapped inside retention slots 40 and cannot become dislodged from frame 14. Lid retention tabs 38 are in alignment with the wider top portion of retention slots 40 of frame 14. Alternatively, in this position, lid retention tabs 38 may be located within a top portion of retention slots 40 and align with corresponding cassette retention tabs 20 when the lid 18 is closed.

Figure 5:
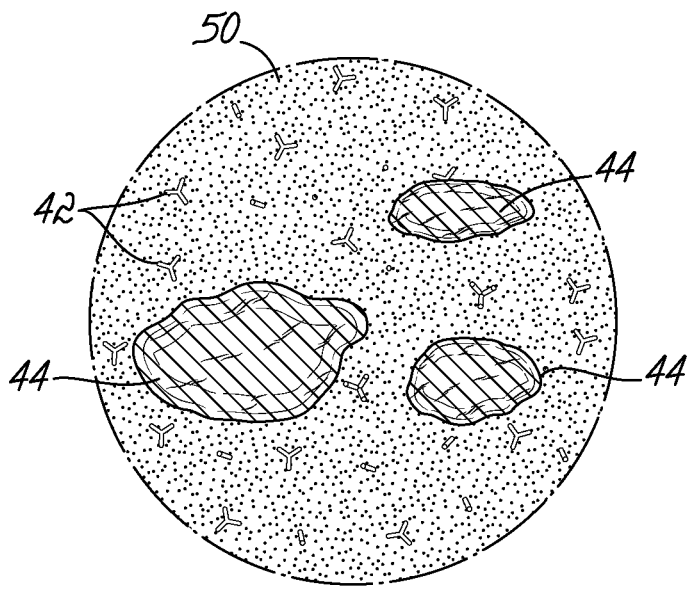
FIG. 5 is a plan view of a sample wax slice prepared using a method according to one embodiment.
Figure 6:
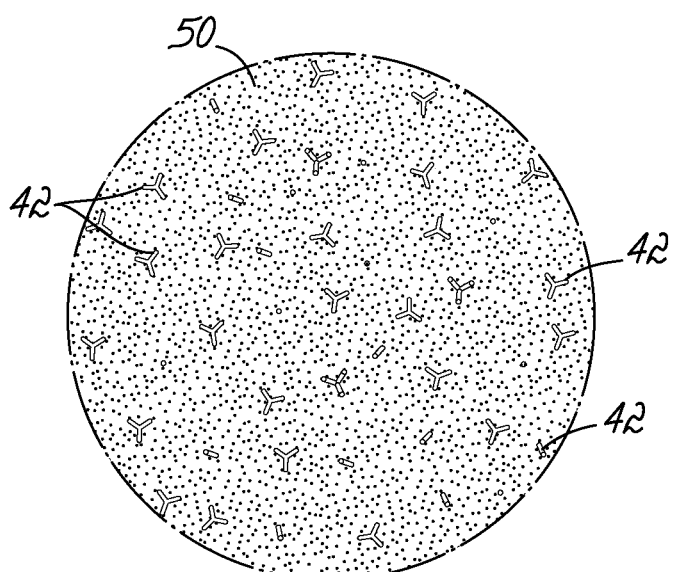
FIG. 6 is a plan view of a sample wax slice prepared using a method according to one embodiment.

As further shown in FIG. 3B, when lid 18 is closed, the resilient structure 42 presses against tissue sample 44 and deforms three dimensionally around tissue sample 44 creating three dimensional spaces around tissue sample 44 and essentially immobilizing tissue sample 44 during the tissue processing and embedding procedures. This also ensures that the tissue sample 44 is held flat against bottom wall 12b of cassette 12 such that when microtome slices are made, complete and continuous sections of tissue sample 44 may be formed generally as shown in FIG. 5. Once all of sample 44 has been sliced, the next slice would contain only resilient structure 42 and paraffin wax 50, as shown in FIG. 6. One specific type of foam structure suitable for the resilient structure 42 has a pore size of 50-60 ppi (pores per inch), with each pore having a diameter of between about 0.017 inch and 0.20 inch. The foam structure is fully reticulated with a compression force deflection at 20% deflection of 0.55 lbs/in$^2$ and a density of 1.4 lbs/ft$^3$. The foam material may be obtained from Crest Foam of Moonachie, N.J. under the name T-50. This is a polyether/polyurethane foam and operates well with a thickness of 0.06 inch to 0.10 inch with a 0.075 inch thickness being a practical manufacturing example. The foam should be constructed so as to shed or release processing fluid after each reagent cycle of a tissue processing machine. If the foam is too dense or too thick, or not fully reticulated, the reagents can become cross contaminated or the tissue may not be fully infiltrated with the fluids because each fluid bath must fully clear and exchange from one fluid bath to the next.

Figure 3D:
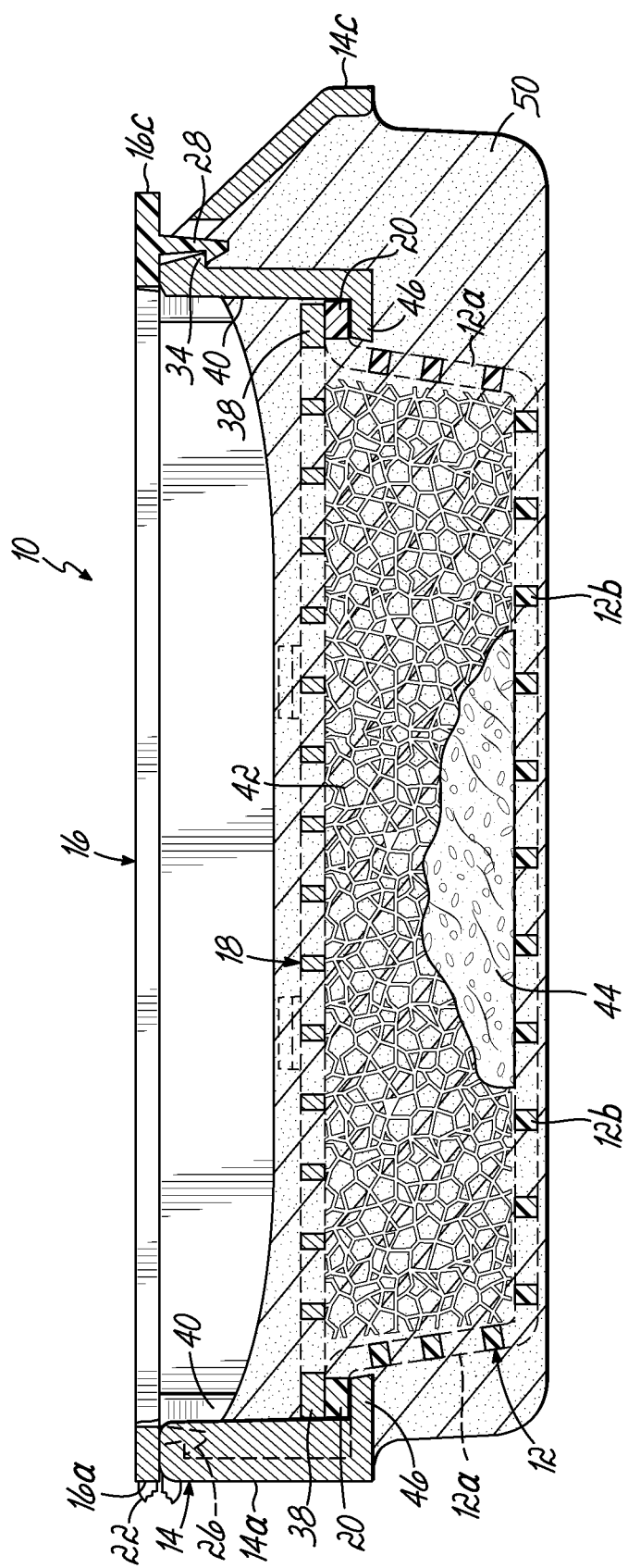
FIG. 3D is a cross sectional view of a portion of the assembly of FIG. 1 taken generally along line 3A-3A of FIG. 2 and similar to FIG. 3C but showing the tissue cassette embedded in paraffin wax.

Now referring to FIGS. 3C and 3D, assembly 10 is shown in which cassette 12 and lid 18 are in the second position. Pressing the center of lid 18 causes breakaway connections 36 to separate, allowing lid 18 to move from the first position (FIG. 3B) towards the second position (FIG. 3C). When connections 36 are broken, continued pressure on the center of lid 18 causes retention tabs 38 to bear against tabs 20 and slide through retention slots 40 of frame 14. Downward movement of lid 18 and tabs 20, 38 causes tissue cassette 12 to move from the first position towards the second position. More particularly, because cassette retention tabs 20 and lid retention tabs 38 are aligned in slots 40, downward movement of lid retention tabs 38 causes downward movement of cassette retention tabs 20. Because slots 40 are tapered, the friction fit between slots 40 and tabs 20, 38 in the second position secures cassette 12 in the second position during the embedding and sectioning process. As best shown in FIGS. 3B and 3C, retention slots 40 include a bottom edge 46. When cassette 12 reaches the second position, edge 46 will prevent further movement of cassette retention tabs 20, and thus lid retention tabs 38, through slots 40. In the second position, tissue sample 44, a portion of cassette 12, and a portion of resilient structure 42 are staged to be sectioned in a microtome. While cassette 12 is shown to have a rectangular configuration, it will be recognized that cassette 12 may have alternative configurations. For example, a cassette may have a circular configuration. Because edge 46 limits the travel of cassette 12 into the second position, edge 46 assures that cassette 12 is staged to a predetermined depth independent of the configuration of cassette 12. The illustrated configuration of cassette 12, frame 14, and lid 18 is an improvement over current assemblies that require a complex lid adjustment procedure whereby the user must choose from a limited number of specific engagement distances between the lid and the cassette. The specific engagement distances were determined by preset tabs in the interior of the cassette basket that engaged and retained the lid. By utilizing a breakaway, rigid central staging lid coupled to a resilient structure according to an option or aspect of the present invention, the complex adjustment procedure for the lid is eliminated. It will be appreciated that other configurations and designs may be used to achieve similar purposes.

Because there are millions of procedures completed each year utilizing assemblies like these, embodiments of the present invention are designed for high production volumes and, consequently, are directed towards use in automated histopathology processes. One such process is automated embedding. An exemplary automated embedding machine (not shown) uses a motorized staging device 48 that pushes the cassette through the frame into the embedding mold 52, which is shown in FIGS. 3B and 3C. A staging device 48 may incorporate spring-loaded cylindrical fingers or feet which push the cassette through frame. The staging device 48 may be improved so that it is capable of cleanly severing breakaway connections 36 between peripheral portion 16 and lid 18 during the staging process. For example, tubular cutters may be axially positioned around the cylindrical fingers that align with connections 36 to cut them, which would be easier than breaking the connections 36 with shear forces alone.

In use, one or more tissue samples 44 are placed within the interior space or recess and, specifically, on bottom wall 12b of cassette 12 as shown in FIG. 3A. Tissue sample 44 is sized and oriented in cassette 12 according to the required section plane desired by the pathologist for each tissue sample 44. Peripheral portion 16 is then closed and snapped into place such that resilient structure 42 (e.g., foam) bears against and traps tissue sample 44 against bottom wall 12b in the desired orientation as shown in FIG. 3B. Resilient structure 42 may deform to create a three dimensional space that receives tissue sample 44. The force of resilient structure 42 against tissue sample 44 should be enough to immobilize tissue sample 44 but not enough to induce artifacts in tissue sample 44. At this point, assembly 10 with the trapped tissue sample 44 may be subjected to a conventional tissue processing operation that uses vacuum, heat and chemicals to remove the interstitial fluids within the tissue and replace those fluids with a hardenable material, such as molten paraffin. As mentioned above, during these processing steps, the porous nature of the foam or other resilient structure 42 allows the fluids to reach and fully infiltrate into tissue sample 44. In addition, resilient structure 42 traps tissue sample 44 flat against bottom wall 12b without leaving artifacts or markings on the tissue that might interfere with subsequent analysis under a microscope. It will be appreciated that different types of resilient cellular materials may be chosen based, for example, on the type of tissue to be processed and analyzed. For example, small mucosal tissue samples may be held and processed with success using the T-50 foam discussed above, while other types of tissue, such as fatty tissue, may be better served by another type of resilient cellular material. As another example, larger tissue samples may require retention structure that operates well over a large surface area.

Figure 4:
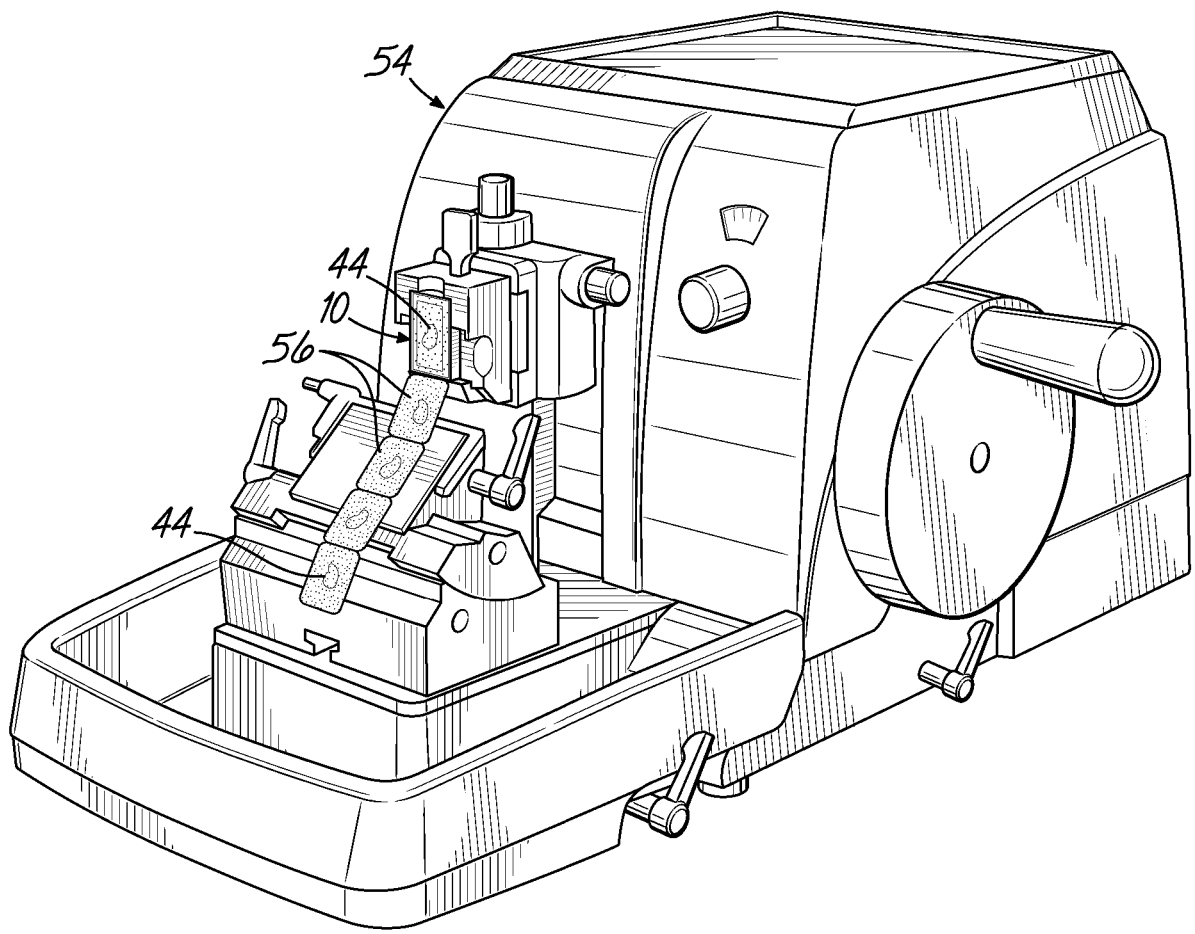
FIG. 4 is a perspective view of an assembly according to one embodiment positioned in a microtome.

It will also be appreciated that the processing steps may take place before assembling tissue cassette 12 with frame 14. After the tissue processing is complete, lid 18 may be separated from peripheral portion 16 whereby cassette 12 may be moved to a second position as shown in FIG. 3C exposing a portion of cassette 12 below the bottom edge 46 of frame 14. Cassette 12 and frame 14 are then placed into a suitable mold 52 and embedded in paraffin 50. Cassette 12 and/or frame 14 may include machine-readable indicia allowing a machine to determine the type and size cassette 12 being used and to make an appropriate decision as to which mold to place the cassette 12 in for embedding. As shown in FIG. 3D, the entire assembly 10 including the exposed portion of cassette 12 is embedded within a hardened block of paraffin wax 50. The mold 52 may generally follow the contour of the bottom 12b of cassette 12, although the portion of the mold surrounding cassette 12 is preferably square as opposed to round. This assists with the subsequent production of ribbon slices, as shown in FIG. 4. This portion of the procedure may therefore be similar to that disclosed in the above-incorporated patent properties. As discussed therein, and with reference to FIG. 4, frame 14 is then used as a fixture for mounting the embedded assembly 10 in a microtome 54. The necessary number of slices 56 are taken of the exposed underside until enough sections or slices 56, similar to those shown in FIG. 5, are taken and appropriately mounted on a microscope slide, stained and cover slipped.

Another method (not shown) of loading tissue sample 44 in assembly 10 is possible. First, peripheral portion 16 is detached from frame 14, which is set aside. Tissue sample 44 is placed onto resilient structure 42, and then frame 14 is installed on top of lid 18. When frame 14 is installed on top of peripheral portion 16, latches 24, 26, 28 of peripheral portion 16 engage with openings 30, 32 and flange 34, respectively, of frame 14. In this manner, peripheral portion 16 is secured to frame 14. Assembly 10 may then be positioned in its usual upright position while resilient lid 18 remains coupled to frame 14 and structure 42 secures tissue sample 44 to bottom wall 12b of cassette 12. This technique can be especially useful for processing an array of small tissue samples because of the easy access to resilient structure 42. In addition, resilient structure 42 may have tissue specific orientation or holding alignment features to facilitate orientation of very specific types of tissue samples. For instance, resilient structure 42 may be made from a gel material having specific cavities or grooves that accept small, hard to orient tissue samples. Such small tissue samples may be, for example, optic nerves from mice or thin arterial structures that must stand up on end perpendicular to the sectioning plane.

Cassette 12 may be formed from a sectionable plastic, such as perfluoroalkoxyethylene (PFA), or polyethylene (PE)-based or containing materials in accordance with the above-incorporated patent properties. The material forming cassette 12 may be at least translucent so as to be non-distracting during tissue analysis. Frame 14, including peripheral portion 16, and lid 18 may be formed from a more rigid, less costly plastic, such as acetal. Acetal is far easier to mold in large quantities or in multi-cavity injection molds. Unlike previous cassettes used during tissue analysis, lid 18 may be formed from a more cost-effective plastic that is different from the plastic used to form cassette 12. For instance, lid 18 may be formed from acetal. In this regard, the volume of FEP/PFA or other sectionable polymer used in the assembly 10 is minimized, which can be beneficial for cost reasons. As will be appreciated from FIG. 2, cassette 12 may be molded separately from the frame 14 and then inserted into the frame 14 with a suitable friction or "snap" fit. Further, when cassette 12 and frame 14 are made of materials with significantly different melting temperatures, they can be co-molded or insert molded in an injection mold machine. In this case, there would be breakaway connections (not shown) similar to the connections 36 formed between the peripheral portion 16 and the lid 18.

Cassette 12 is molded within frame 14 and after frame 14 has been molded. In this case, the frame 14 has a higher melting temperature than the material for forming the cassette 12. The cassette material will not melt the frame material and this process will secure the cassette 12 and frame 14 together in a single unit. In other embodiments, described below, the lid may be formed from the same microtome sectionable material as the cassette. In that way, through robotic assembly, cassette 12 can be molded with frame 14 surrounding it resulting in a processing container that the customer does not need to assemble from parts. Additionally, using such a molding process creates a secure, one piece assembly for shipping and handling. By combining the cassette and frame into a single piece prior to the customer receiving them, the assembly arrives as a single piece ready to load with tissue. This is advantageous over prior assemblies where the user was required to assemble the components before loading the tissue. Further, by surrounding the cassette by a dimensionally stable frame material, the integrity and shape of the cassette are maintained during shipping.

Figure 7:
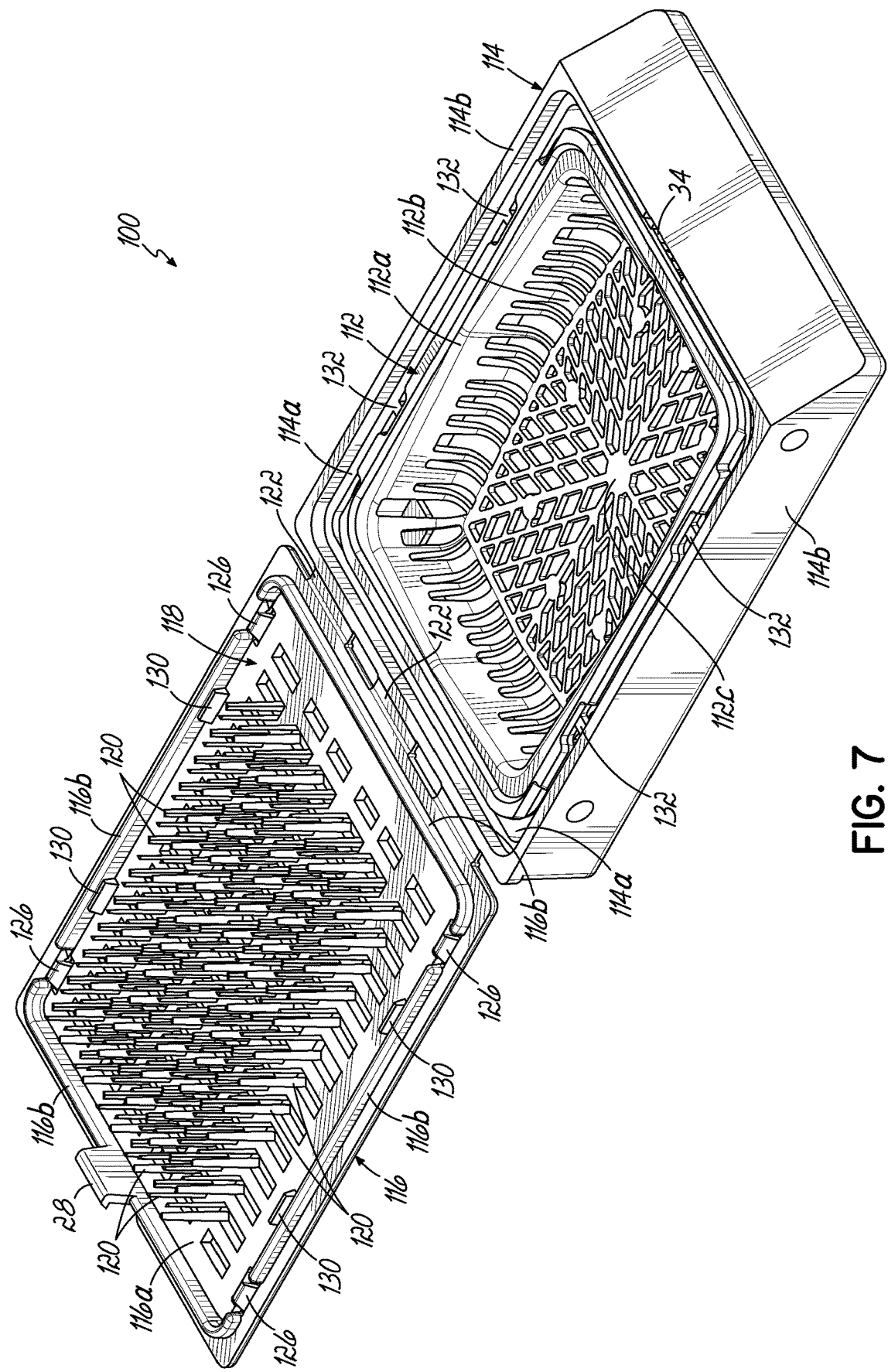
FIG. 7 is a perspective view of another embodiment illustrating an integrally formed cassette and frame structure.
Figure 8:
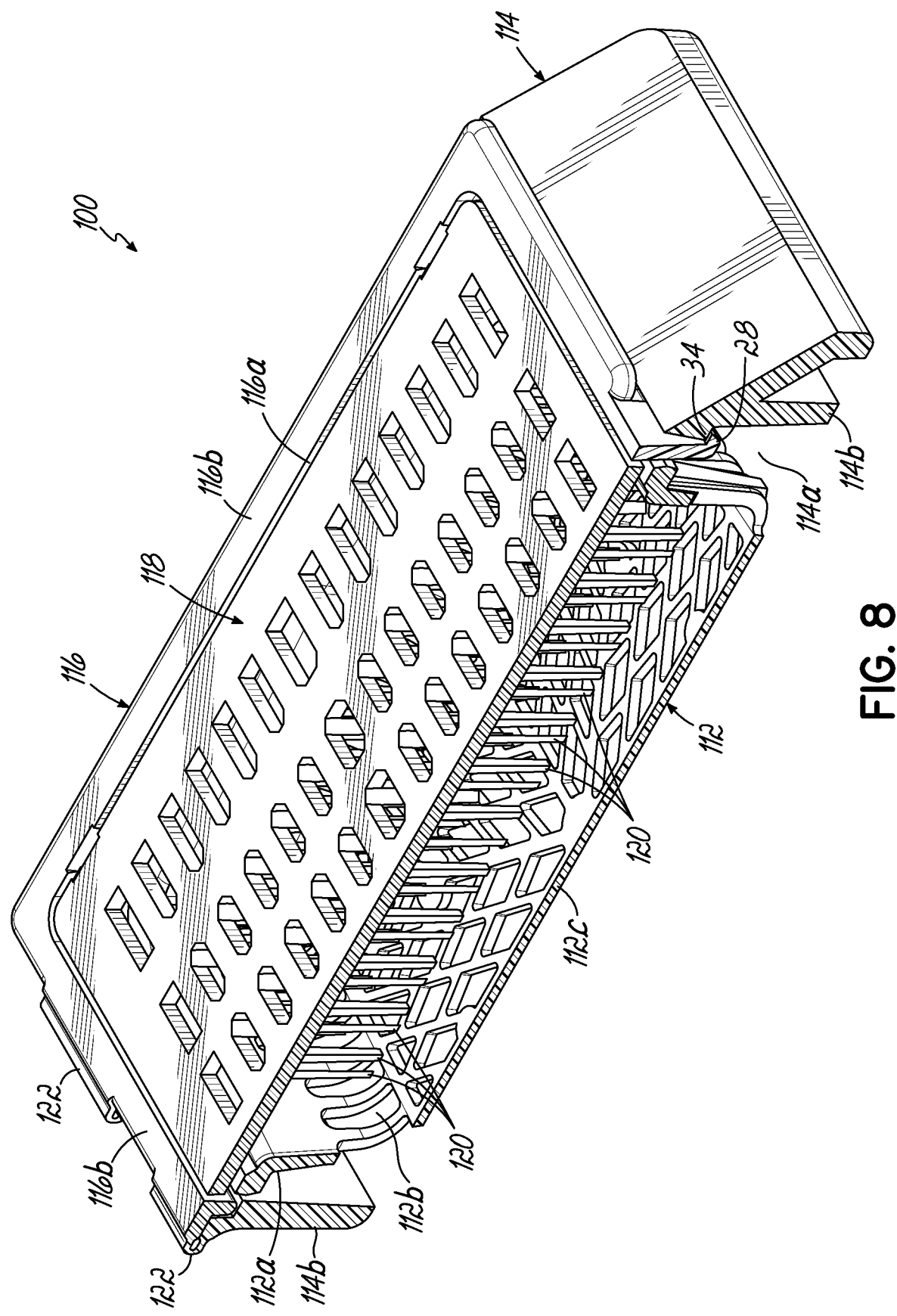
FIG. 8 is a perspective view of the structure illustrated in FIG. 7, but cross sectioned generally along a central lengthwise axis thereof with the lid in a closed position.
Figure 9:
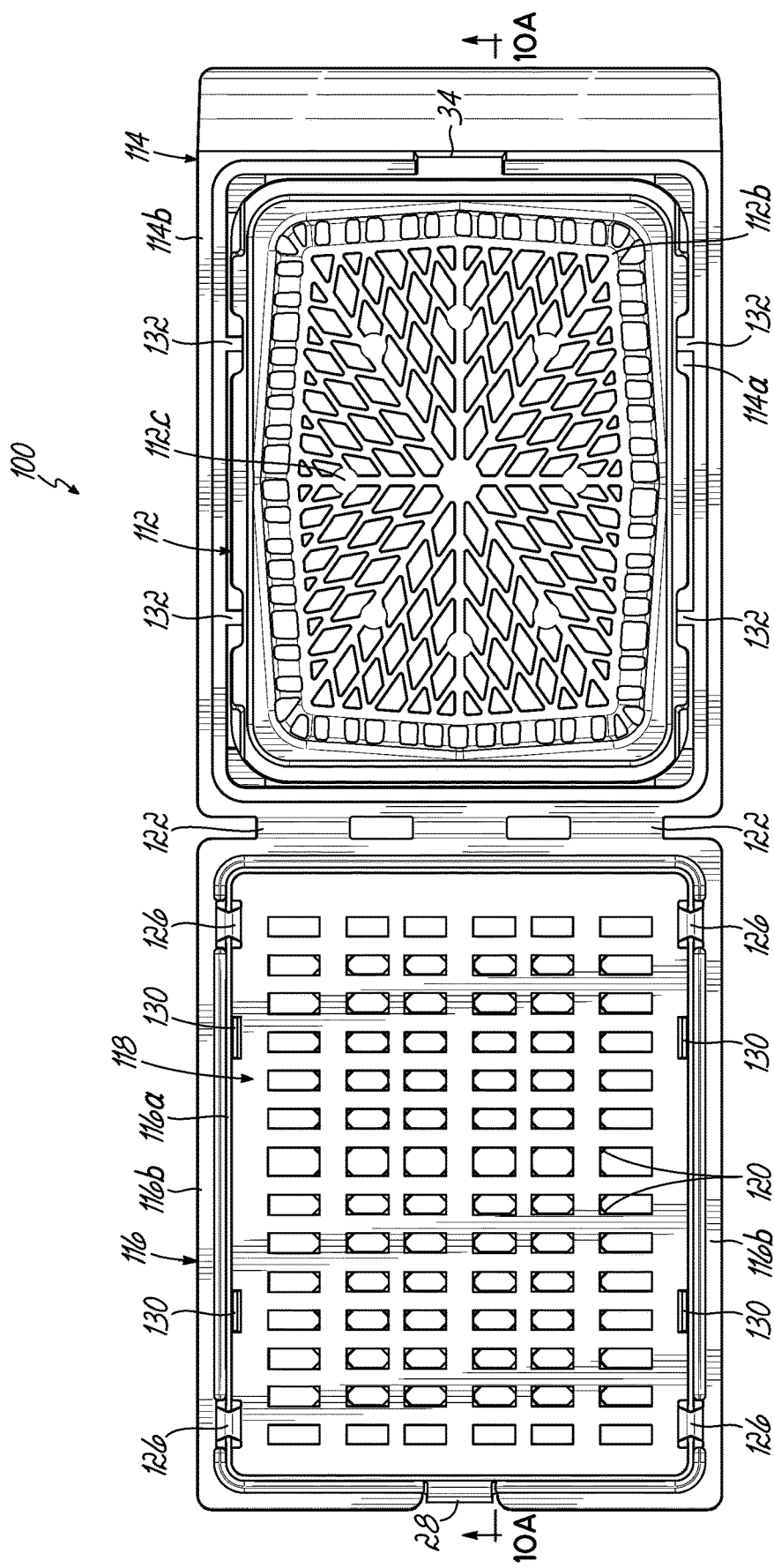
FIG. 9 is a top view of the structure illustrated in FIG. 7 with the peripheral frame portion and lid in an open position.

Referring now to FIGS. 7, 8 and 9, an assembly 100 is shown and constructed in accordance with another illustrative embodiment of the invention. Like elements of structure and function in the embodiments to follow are denoted with like reference numerals to those previously shown and described. The assembly 100 includes a tissue sample cassette 112 including a body 112a with an interior or recess 112b carried within a frame 114, which includes a peripheral portion 116. A lid 118 is separably coupled to the peripheral portion 116 and the peripheral portion 116 generally includes an interior 116a defined between surrounding walls 116b. The lid 118 is sized and configured to fit in the interior 116a and is separably coupled to at least one of the surrounding walls 116b. The frame 114 generally includes an interior 114a defined between surrounding outer walls 114b and the cassette 112 is sized to fit within and, after detachment from the frame 114, move within the interior 114a of the frame 114 between at least a first position and a second "staged" position, as discussed in the above-incorporated patent properties and for the same purposes.

Figure 10C:
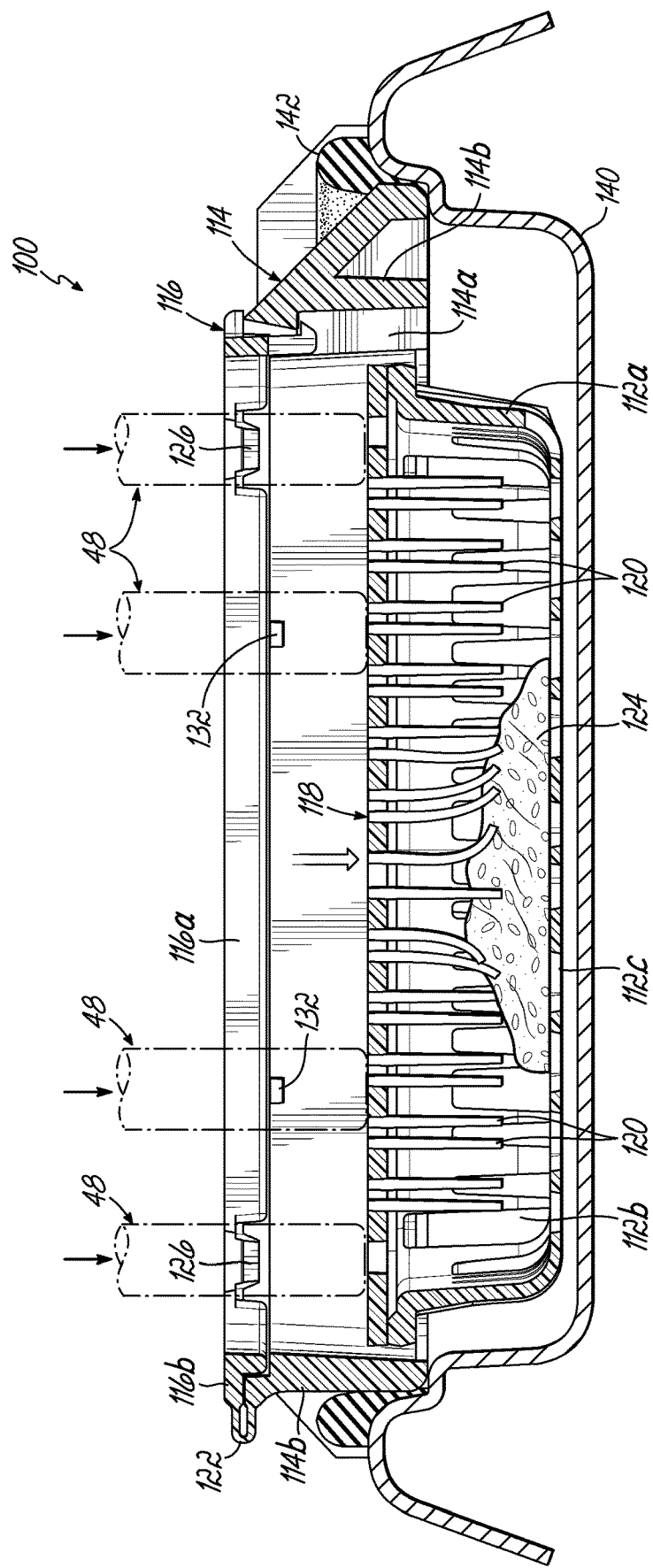
FIG. 10C is a cross sectional view similar to FIG. 10B, but illustrating the cassette portion being staged downwardly into a second position and into a mold.

More specifically, in this embodiment, the entire cassette and frame assembly may be formed in a single molding process from a single material. This material may, for example, be a polyethylene-polypropylene blend or any other suitable material that has sufficient rigidity to provide the necessary support and resist warpage during storage and shipping, but which allows the cassette body 112a to be microtome sectioned as disclosed in the above-incorporated patent properties. Alternatively, the lid 118, frame 114, cassette 112 and/or portions thereof may be formed from different materials depending on factors such as cost and functionality. Of course, the molding process may have separate molding steps. However, as compared to previous embodiments, a single material embodiment has various advantages, such as cost advantages associated with a simpler molding process, and the use of a single, cost efficient and yet functional material. This embodiment further shows the use of flexible fingers 120 as the resilient, biasing structure extending from an interior surface of the lid 118 for engaging with a tissue sample or samples 112 (FIG. 10A) as will be discussed below. The peripheral frame portion 116 is coupled to the remainder of the frame 114 by a hinge 122. As best shown in FIG. 9, the lid 118 is coupled to the peripheral portion 116 with material "bridges" or breakaway connections 126 that are broken as the user depresses on the lid 118 during the staging process as will be discussed below. The lid 118 further includes "cutters" 130 that align with bridges or breakaway connections 132 that secure the cassette body 112a to the frame 114 as also shown in FIG. 9. As the user depresses the lid 118 and breaks the lid 118 away from the peripheral portion 116 at connections 126, these cutters 130 cut through or break the bridges or connections 132 that retain the cassette body 112a to the frame 114. It will be appreciated that the cutters 130 do not need to be sharp, but are at least meant to concentrate force on the thin connections 132. FIGS. 10A and 10B illustrate the respective open and closed positions of the cassette lid 118 and peripheral portion 116. FIG. 10B illustrates the resilient fingers 120 used to retain a tissue sample(s) 124 against the bottom wall 112c of the cassette 112. FIG. 10C illustrates the staging movement of the cassette 112 between the upper or first position (not shown) and the lower or second position that is within a mold 140.

Figure 10D:
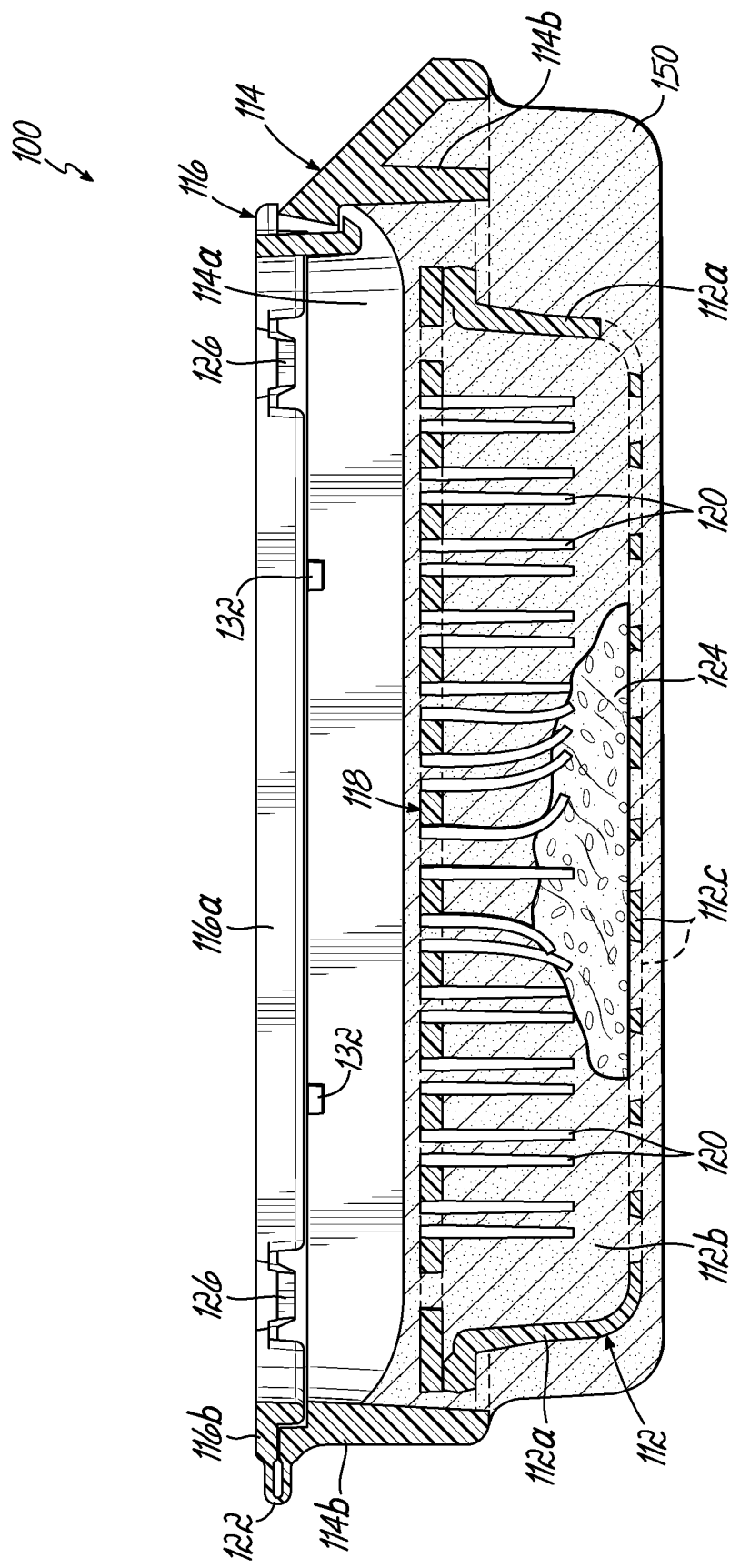
FIG. 10D is a cross sectional view similar to FIG. 10C, but illustrating the integrated and staged structure with the microtome sectionable cassette portion and tissue sample embedded in a block of embedding material, such as paraffin.

In FIG. 10C, the bridges or connections 126 previously discussed have been broken and, thus, the lid 118 is retained against the upper peripheral surface of the cassette body 112a. In the second position, or lower position, the cassette body 112a is exposed below the bottom of the frame 114 for allowing the cassette body 112a and the tissue sample 124 to be sectioned in a microtome 54 (FIG. 4) after embedding and while the frame 114 is held in the microtome chuck, as previously described. As further shown in FIG. 10C, the frame 114 is frictionally held within the mold 140 by being retained against a resilient seal member 142 coupled with the mold 140. FIG. 10D illustrates the process after the step of filling the mold 140 with an embedding material, such as paraffin 150, and allowing the paraffin 150 to solidify into a block that encases both the sectionable cassette 112 and the tissue sample 124 held within the cassette recess or interior 112b. As fully described in the above-incorporated patent properties, and above, this solidified block 150 is then sectioned in a microtome 140 (FIG. 4) and the thin, ribbon-like sections 56 are placed on microscope slides (not shown) for pathological diagnoses.

Figure 11A:
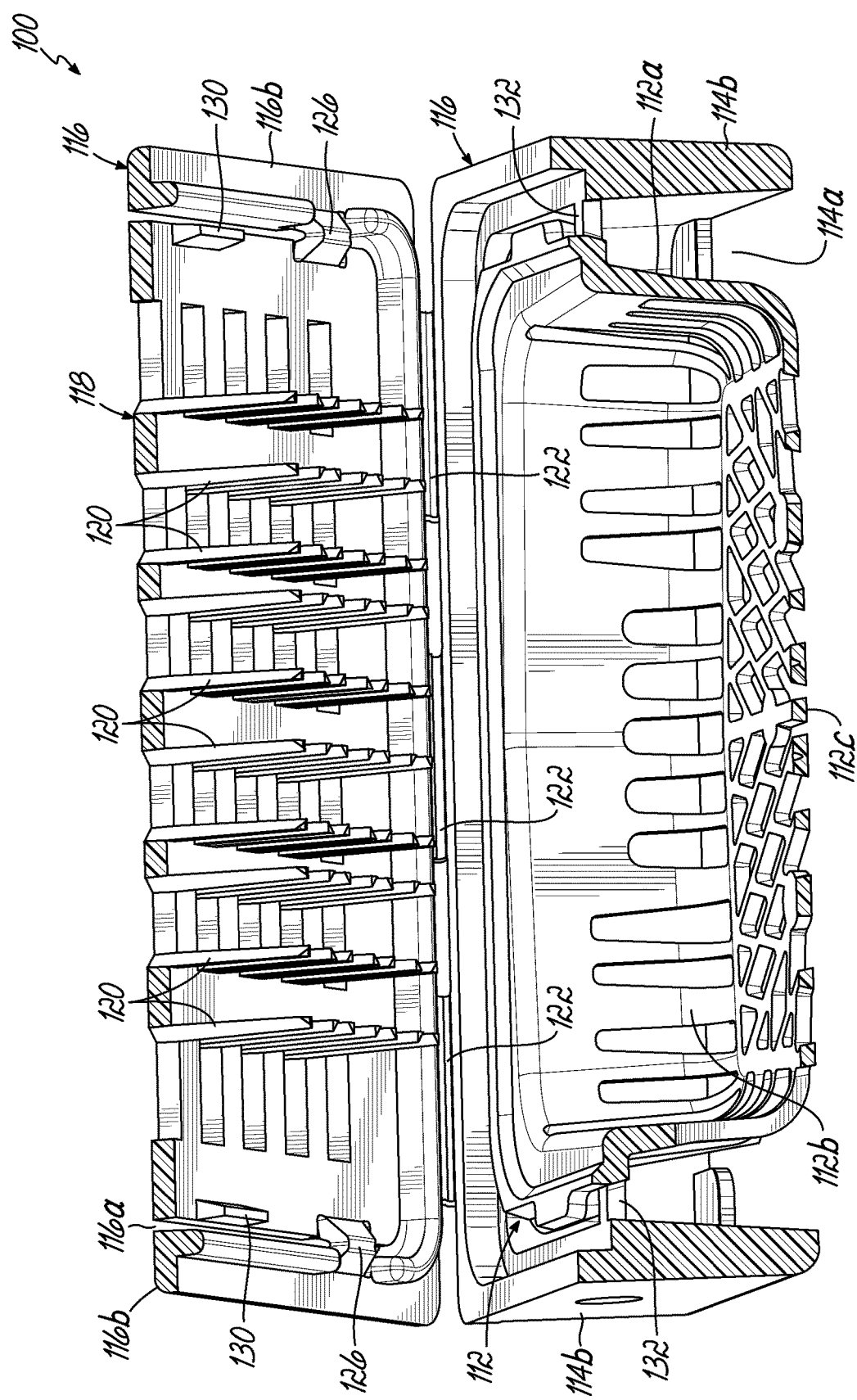
FIG. 11A is a perspective view which has been cross sectioned to illustrate additional details of the integrated cassette and frame structure of this embodiment.
Figure 11B:
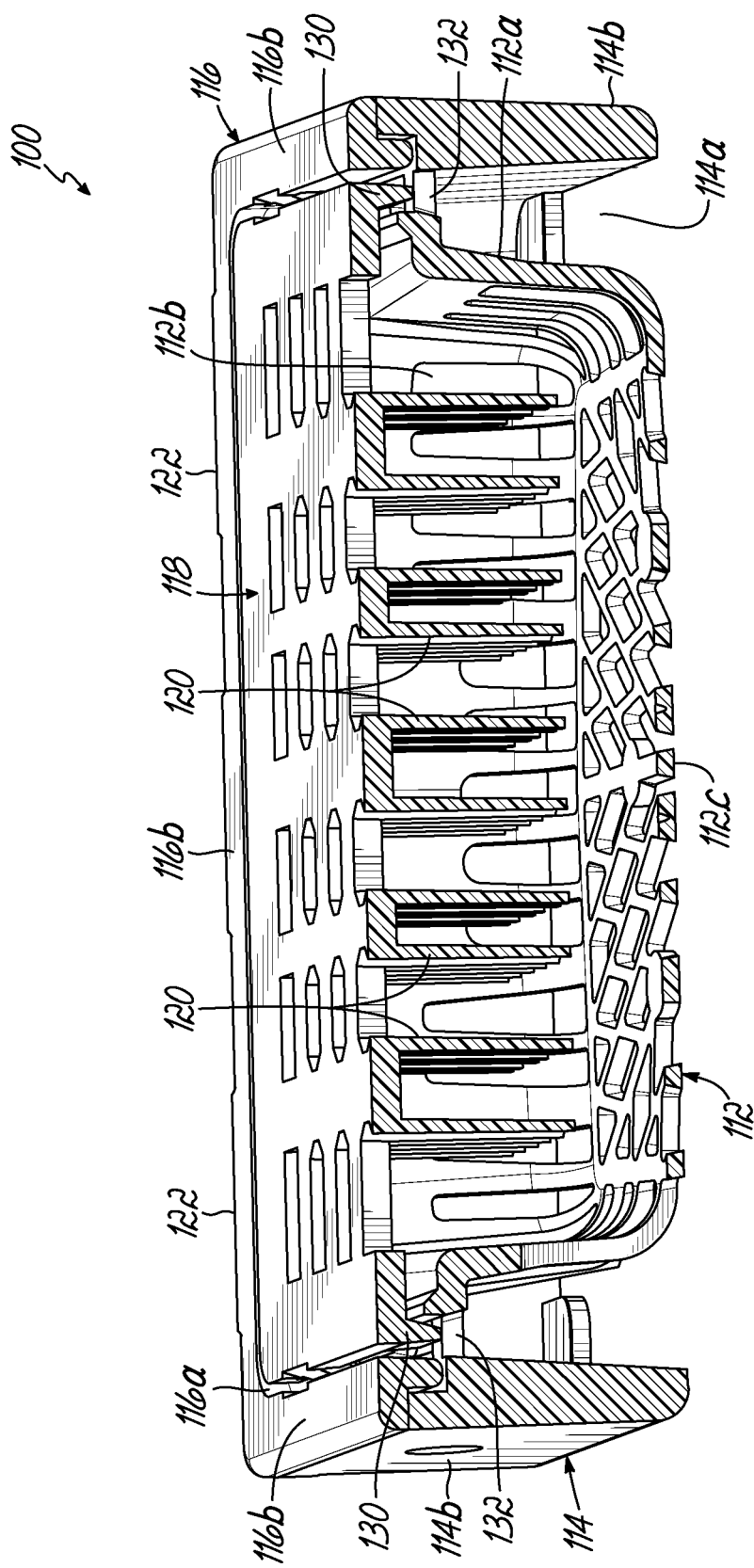
FIG. 11B is a cross sectional view similar to FIG. 11A, but illustrating the lid of the structure in a closed position.
Figure 11C:
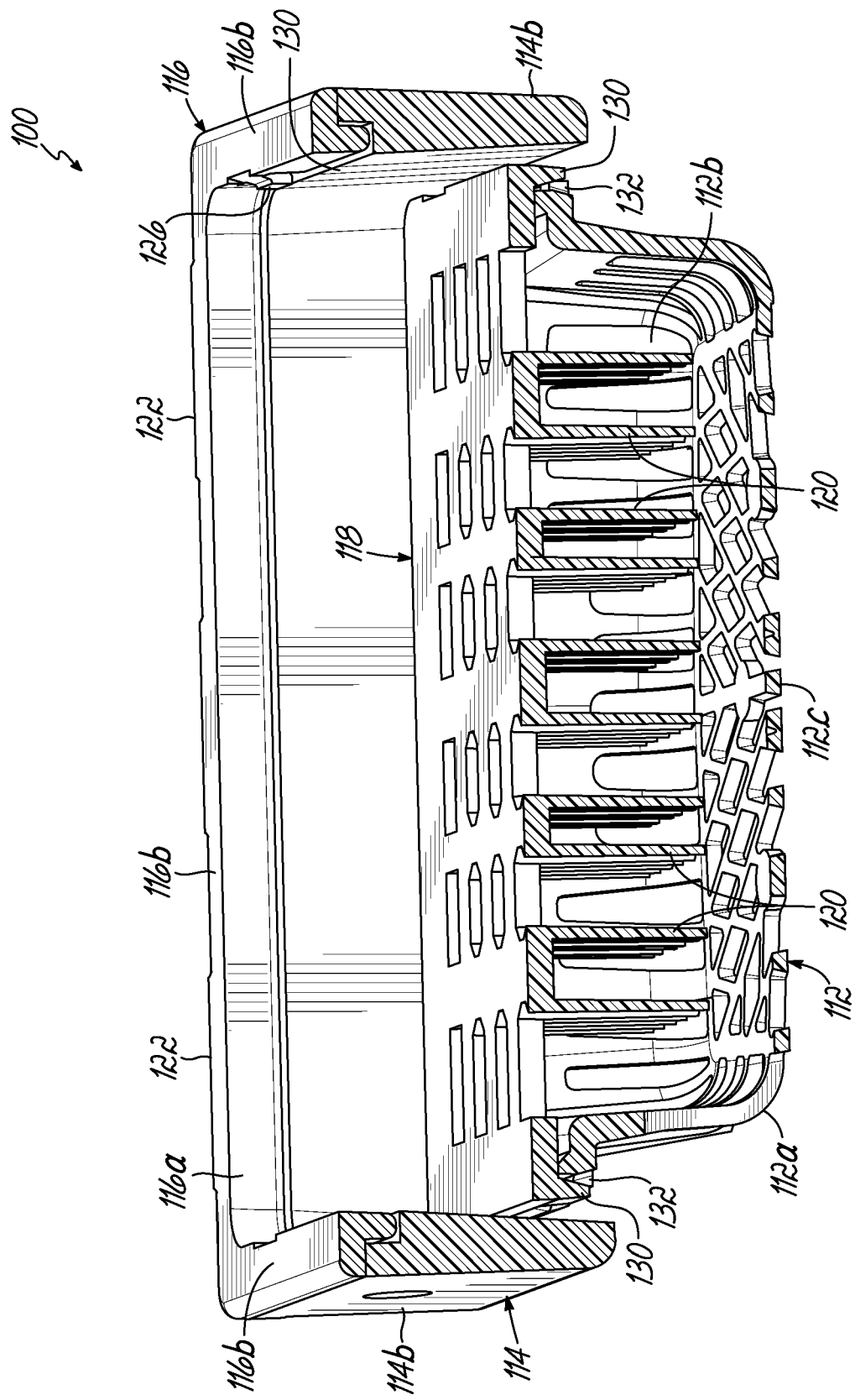
FIG. 11C is a cross sectional view similar to FIG. 11B, but illustrating the cassette portion in the staged or second position.
Figure 12A:
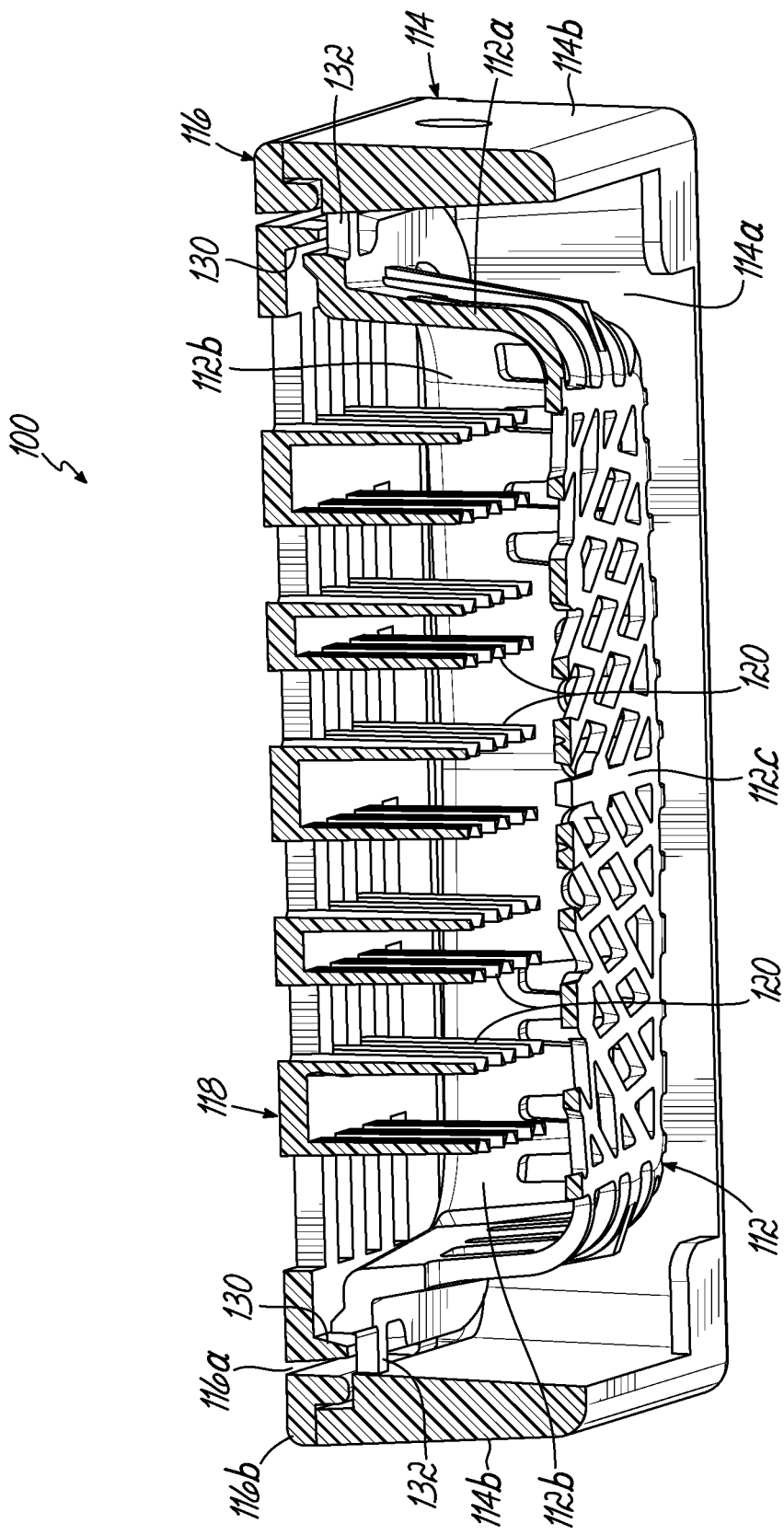
FIG. 12A is another cross sectional view of the integrated cassette and frame structure of this embodiment, illustrating additional details.
Figure 12B:
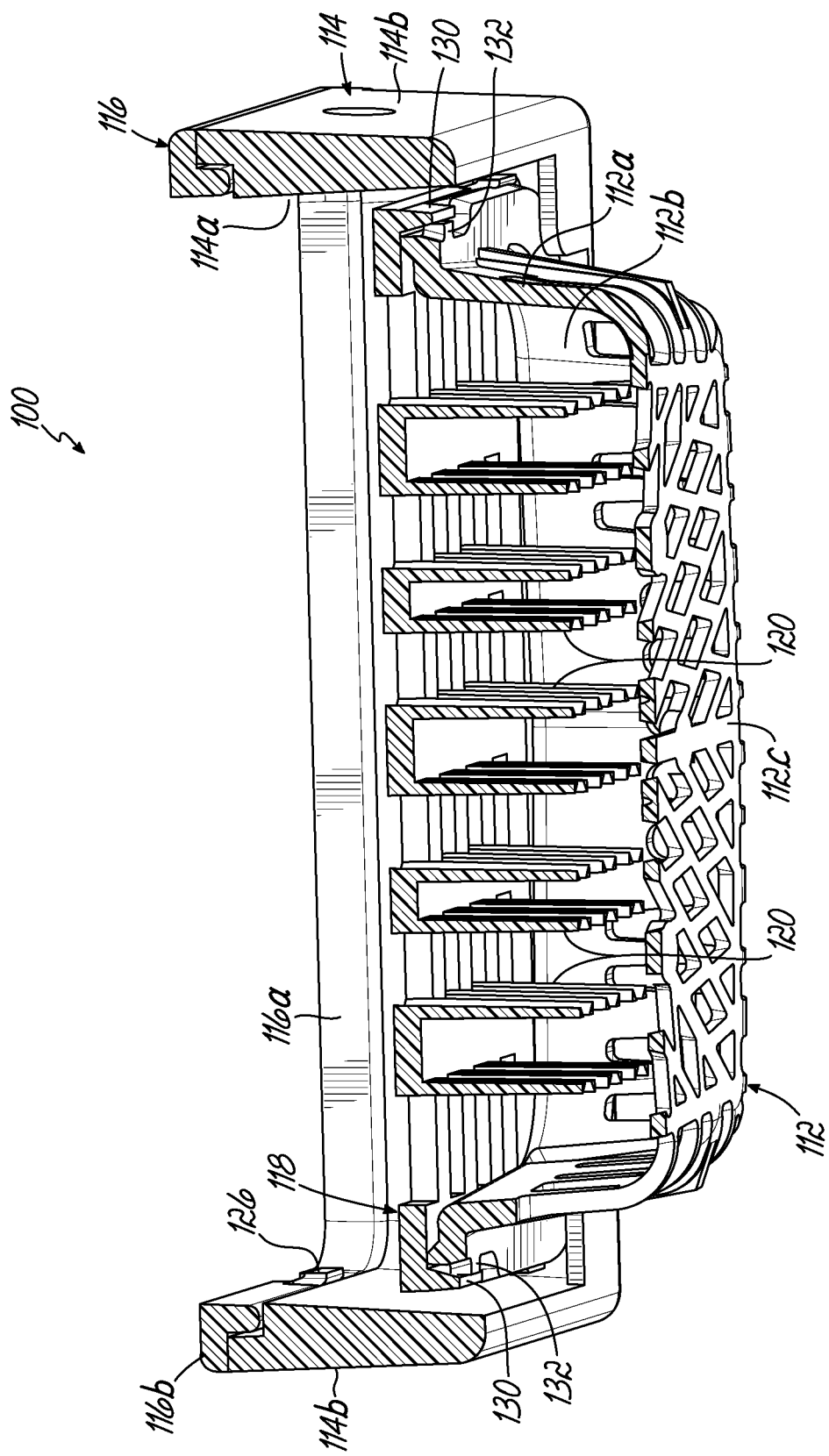
FIG. 12B is a cross sectional view similar to FIG. 12A, but illustrating the cassette portion in a staged or second position.

FIGS. 11A, 11B and 11C better illustrate the construction and use of the breakaway connections 126, 132 and cutters 130 that are associated with the cassette 112 and the frame 114. Specifically, the cutters 130 align with the bridges 132 that connect the cassette body 112a to the frame 114 and, as shown in FIG. 11B, these cutters 130 when depressed downwardly will cut through or help break or shear the frangible bridges or connections 132 thereby separating the cassette 112 from the frame 114. At about the same time, the frangible bridges of material 126 that hold the cassette lid 118 to the peripheral frame portion 116 break and the lid 118 then travels with the cassette body 112a from the first position (not shown) to the second, staged position, illustrated in FIG. 11C. FIGS. 12A and 12B illustrate another perspective showing the bridges 132 and the use of the cutters 130 to break the bridges 132 and allow movement of the cassette 112 and the cassette lid 118 from the first position shown in FIG. 12A to the second position shown in FIG. 12B.

Figure 13:
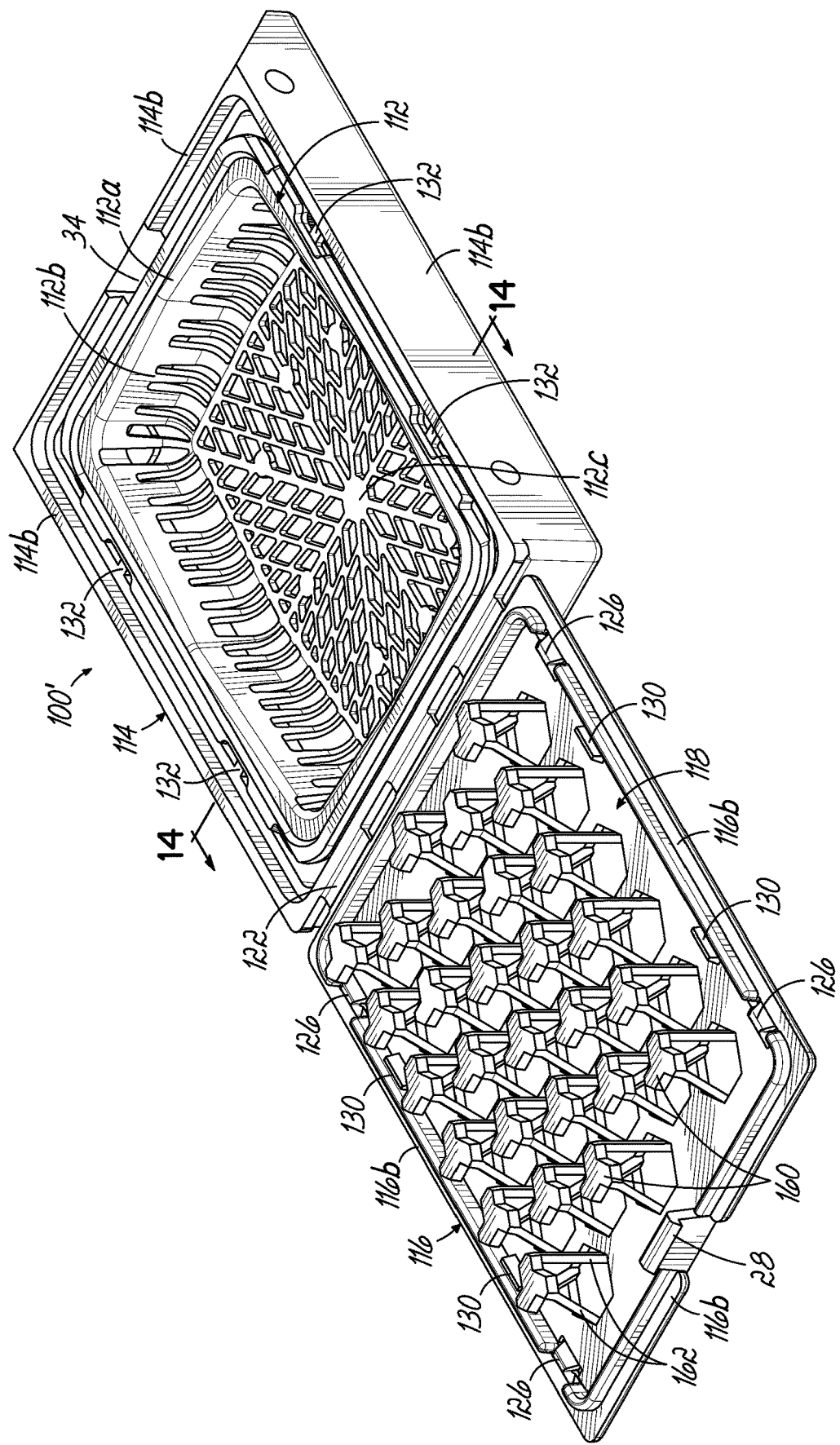
FIG. 13 is a perspective view of another embodiment, illustrating an integrated cassette and frame structure with the lid of the cassette portion in an open position.
Figure 14:
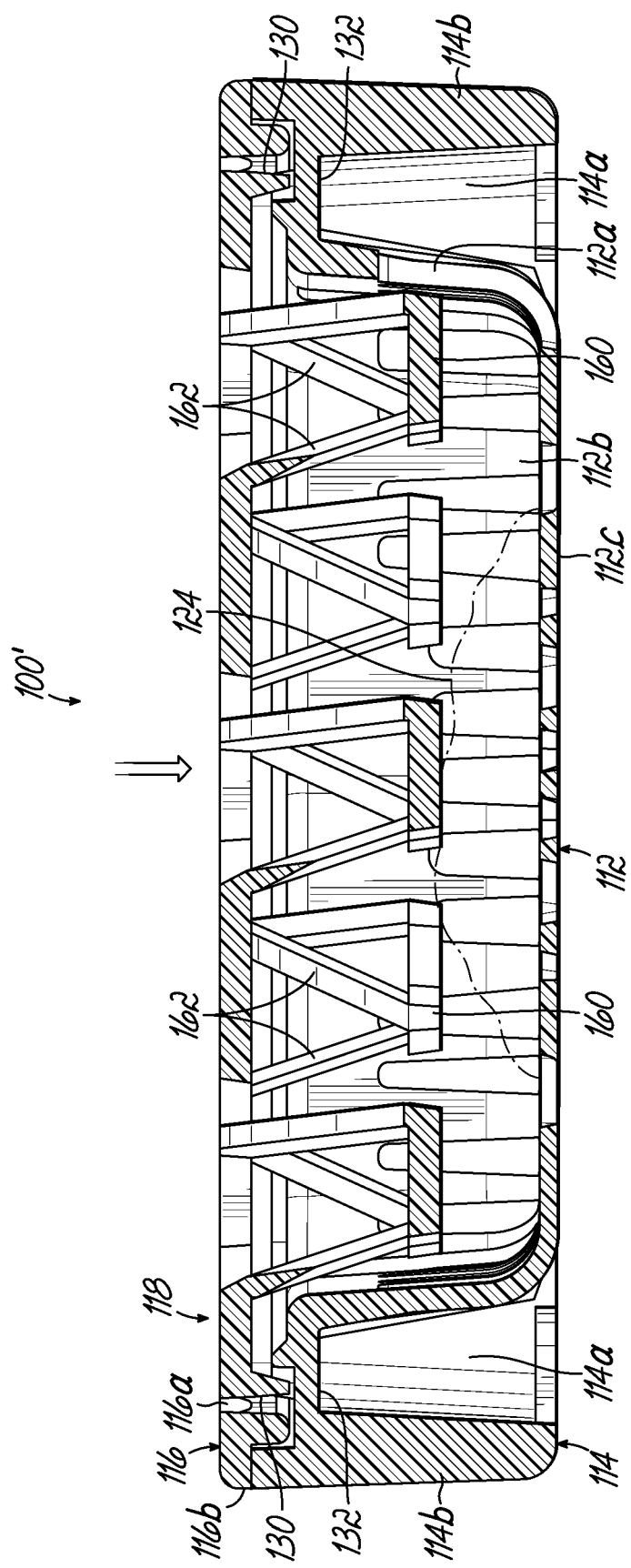
FIG. 14 is a cross sectional view (taken along line 14-14 of FIG. 13) of the integrated cassette and frame structure from FIG. 13, but illustrating the lid in a closed position.

FIGS. 13 and 14 illustrate another illustrative embodiment of a device 100' that is very similar to the embodiment shown and described with respect to FIG. 7 through FIGS. 12A and 12B. Like reference numerals in FIGS. 13 and 14 refer to like structure shown and described above. Therefore, further explanation of previously described structure and function or methodology is not necessary. In this embodiment, the resilient fingers 120 depicted in the previous embodiment have been replaced by pads 160 that are coupled to an underside of the lid 118 by resilient legs 162. Again, this entire cassette and frame structure, including the pad members 160 and legs 162 may be molded out of a single material and within a single mold, thereby greatly simplifying the manufacturing process. Alternatively, two or more of these components may be co-molded or insert molded such as previously described. As shown in FIG. 14, the resilient pad members 160 are used to retain the tissue sample or samples 124 against the bottom surface 112c of the cassette 112, thereby holding the tissue sample or samples 124 in a desired orientation and flatly against the inner bottom surface 112c of the cassette interior 112b. The legs 162 that connect the pads 160 to the underside of the cassette lid 118 may slightly rotate and bend as the pads 160 engage the tissue sample 124 when the lid 118 is closed. This stabilizes and holds the tissue sample(s) 124 during tissue processing and embedding.

Figure 15:
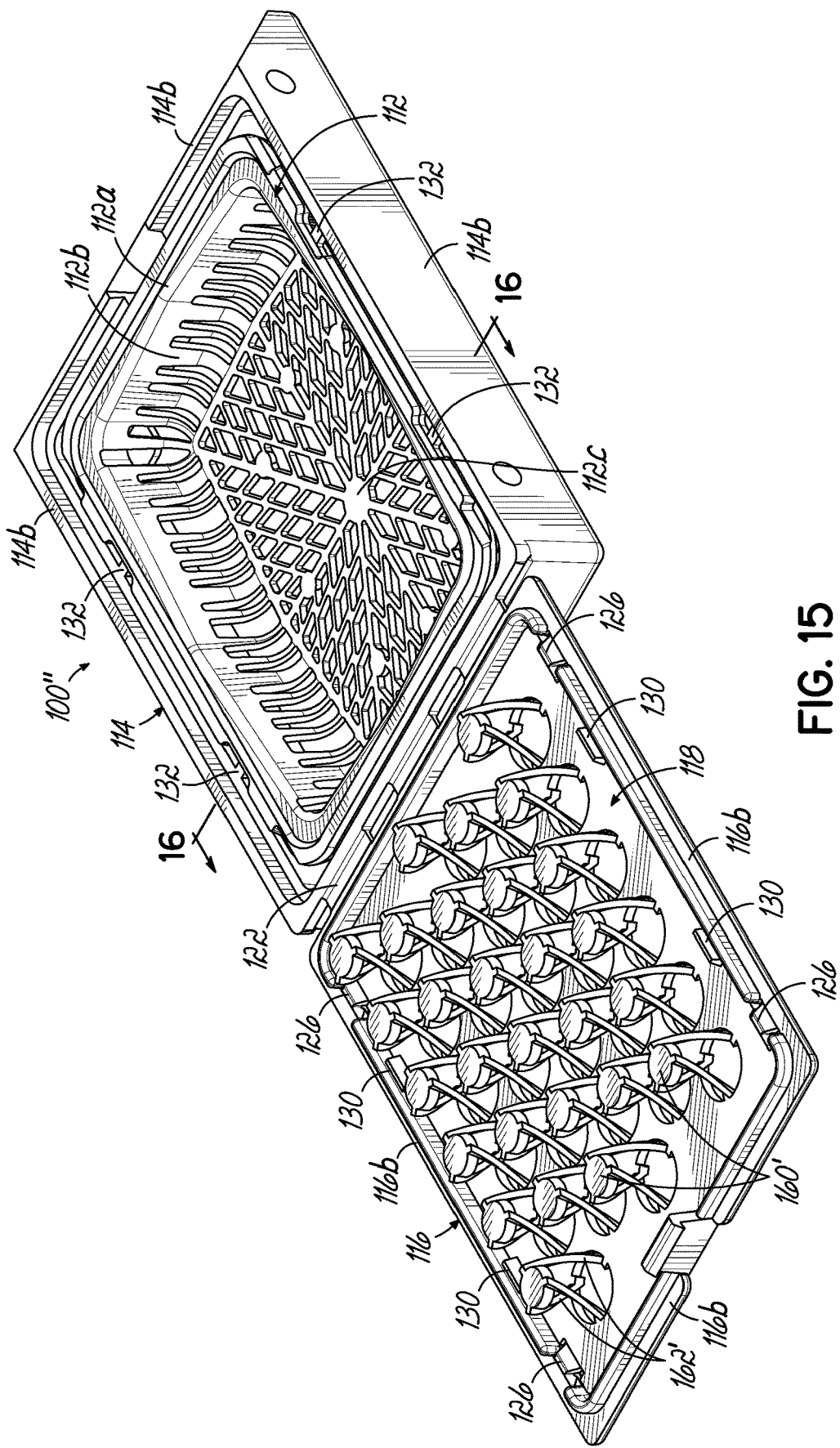
FIG. 15 is a perspective view of another embodiment, illustrating an integrated cassette and frame structure with the lid of the cassette portion in an open position.
Figure 17:
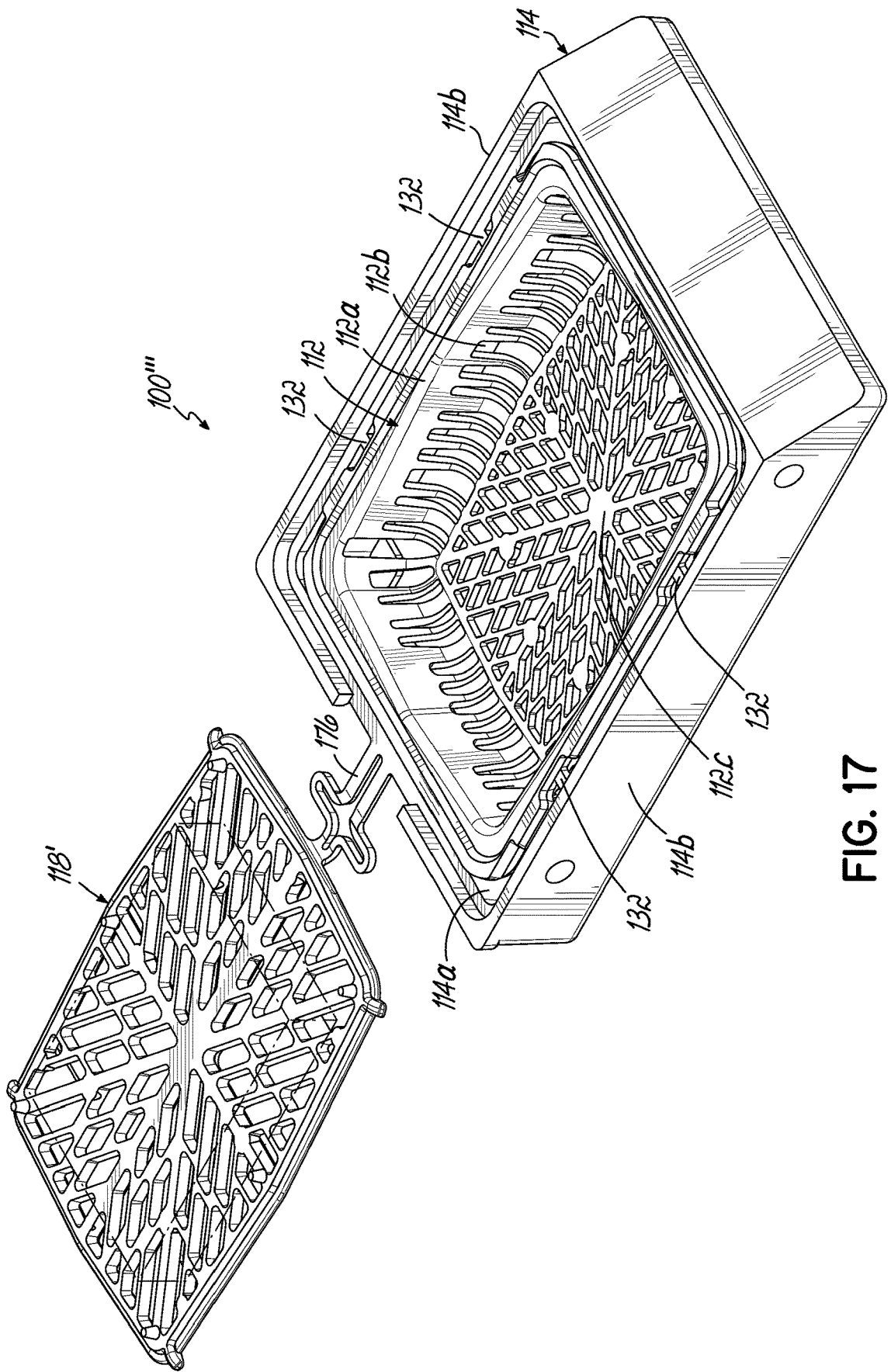
FIG. 17 is a perspective view of another embodiment illustrating an integrated cassette and frame structure, with the lid portion shown in an open position.
Figure 18:
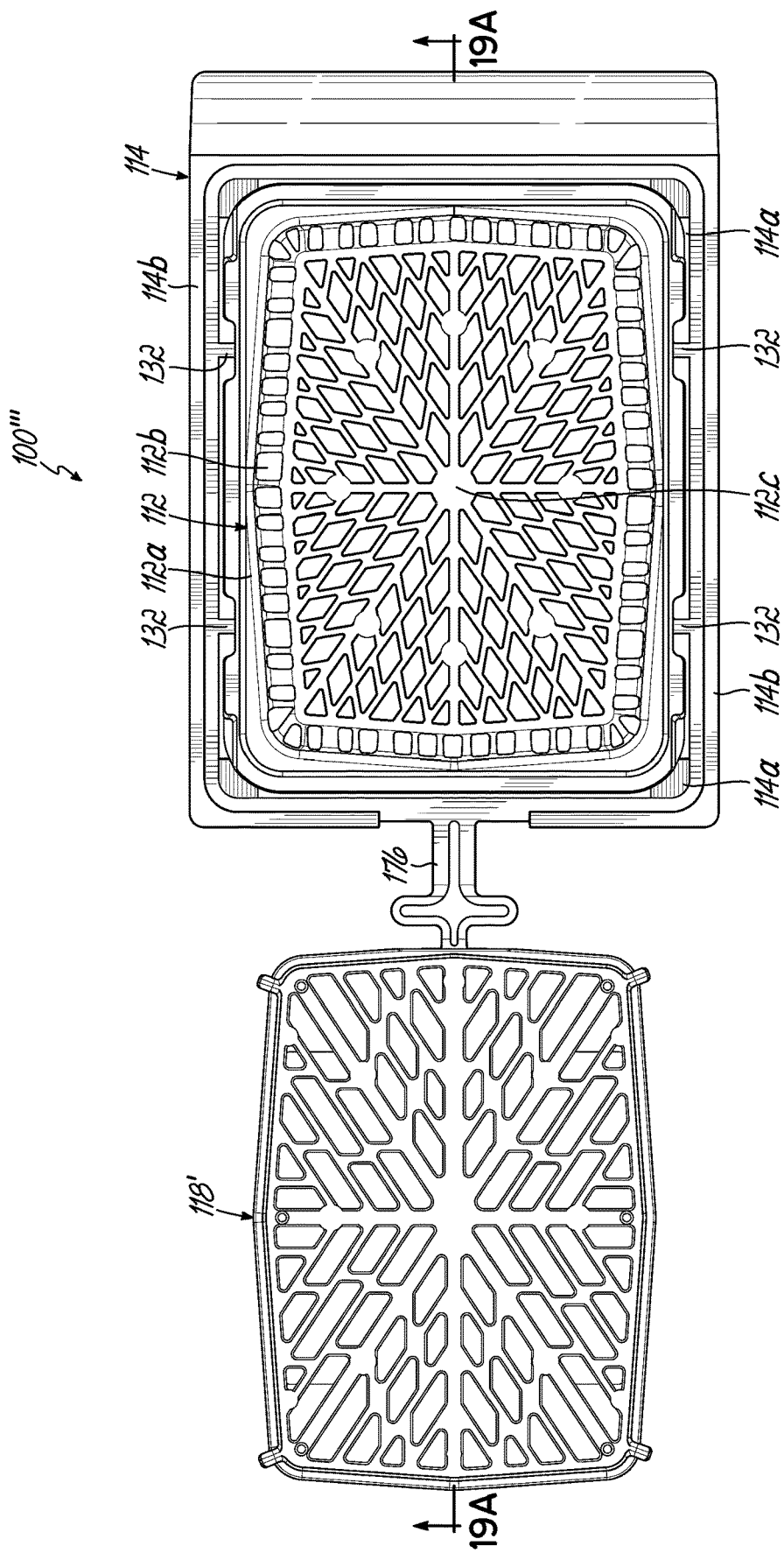
FIG. 18 is a top view illustrating the integrated cassette and frame structure of FIG. 17, again with the lid portion shown in an open position.
Figure 19A:
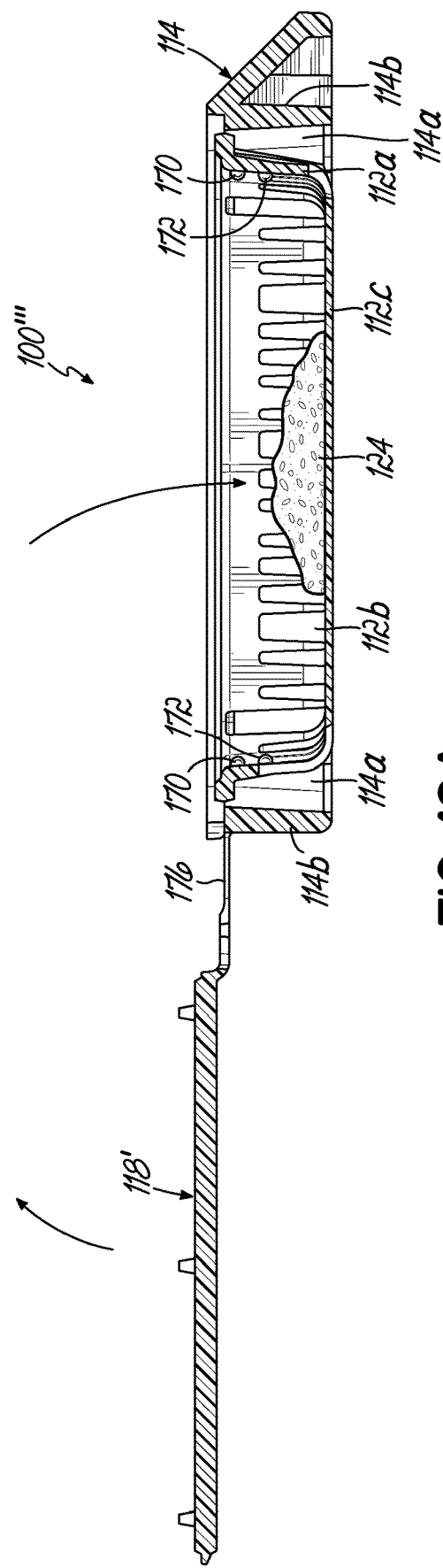
FIG. 19A is a cross sectional view taken generally along line 19A-19A of FIG. 18.
Figure 19B:
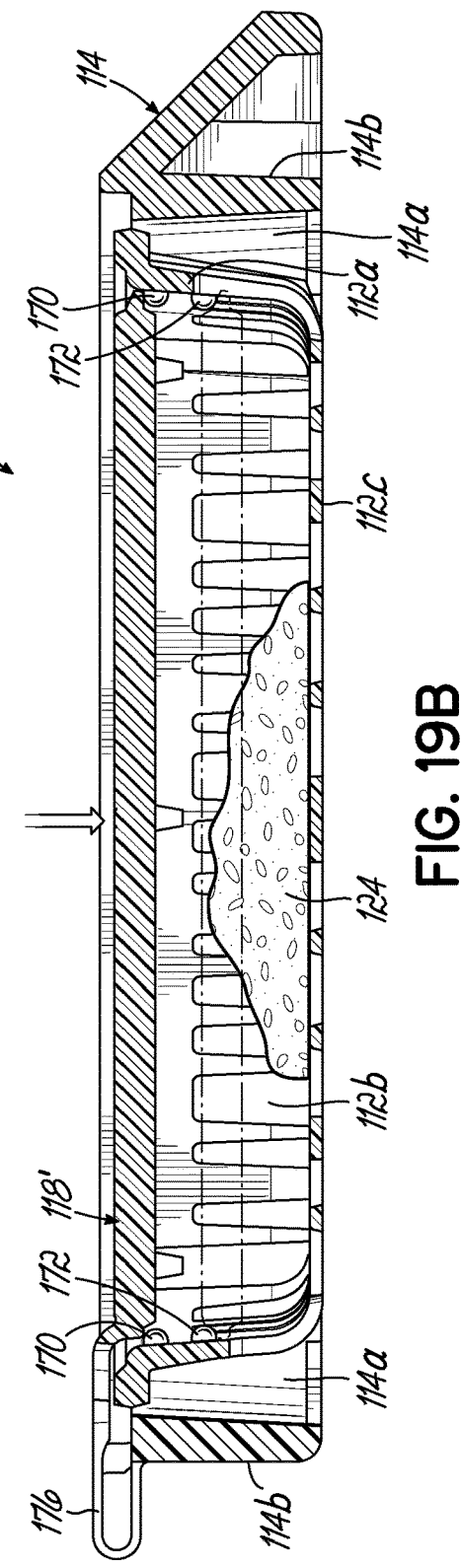
FIG. 19B is a cross sectional view similar to FIG. 19A, but illustrating the lid portion in a closed position.

FIGS. 15, 16A and 16B illustrate yet another illustrative embodiment of a device 100" that is very similar to the embodiment of FIGS. 13 and 14. Like reference numerals again refer to like elements of structure and function as previously described and, therefore, need not be described again. In this embodiment, the only difference relative to the embodiment in FIGS. 13 and 14 is that the resilient pad members 160' have been changed in shape and slightly in structure to be more rounded and for the leg members 162' to be resilient and twistable similar to springs to better engage and hold one or more tissue samples 124 within the cassette interior 112b and against the interior bottom surface 112c of the cassette 112 as shown in FIG. 16B.

Figure 20A:
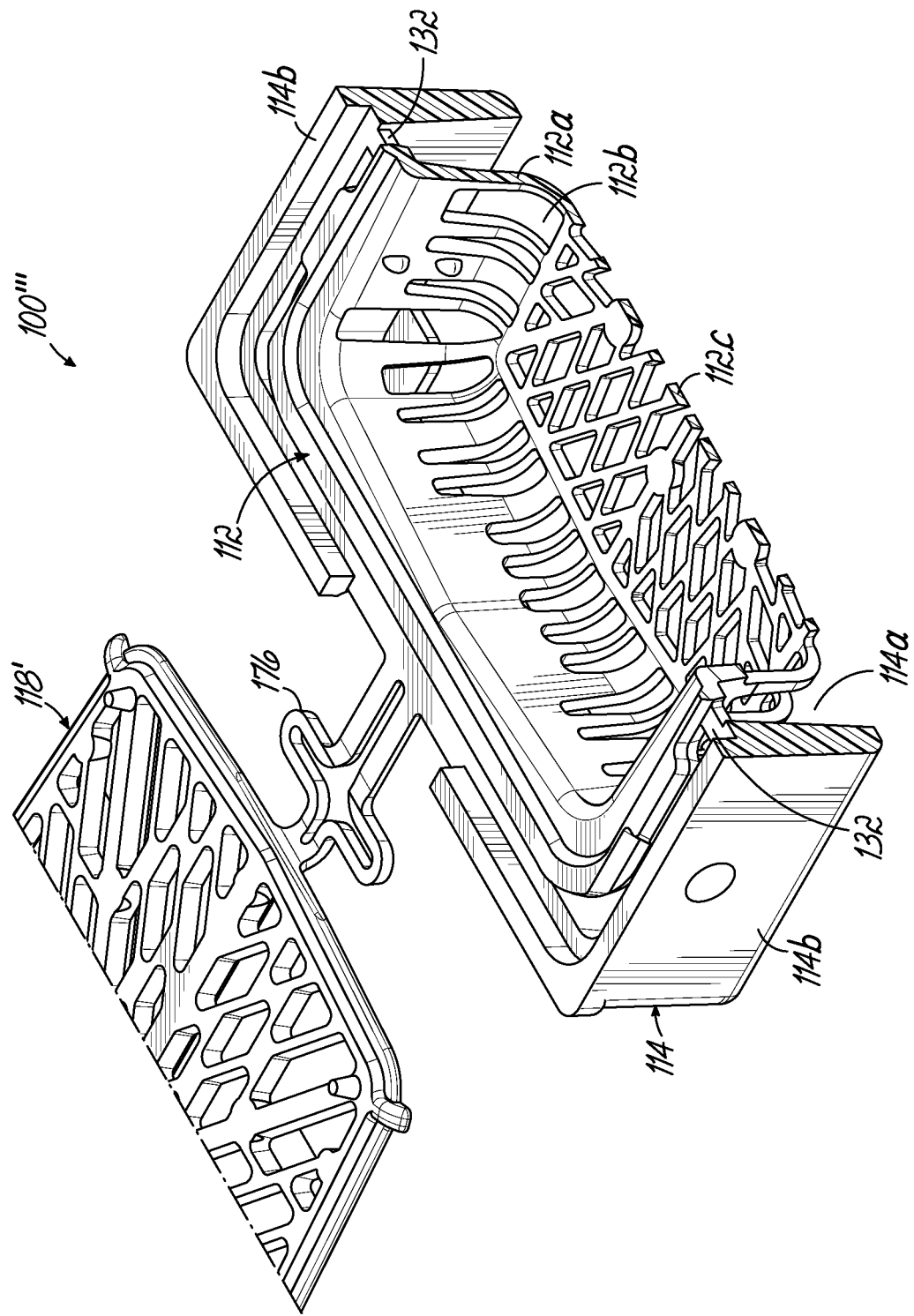
FIG. 20A is a perspective, enlarged view of the integrated cassette and frame structure of FIG. 17, and illustrating additional details.
Figure 20B:
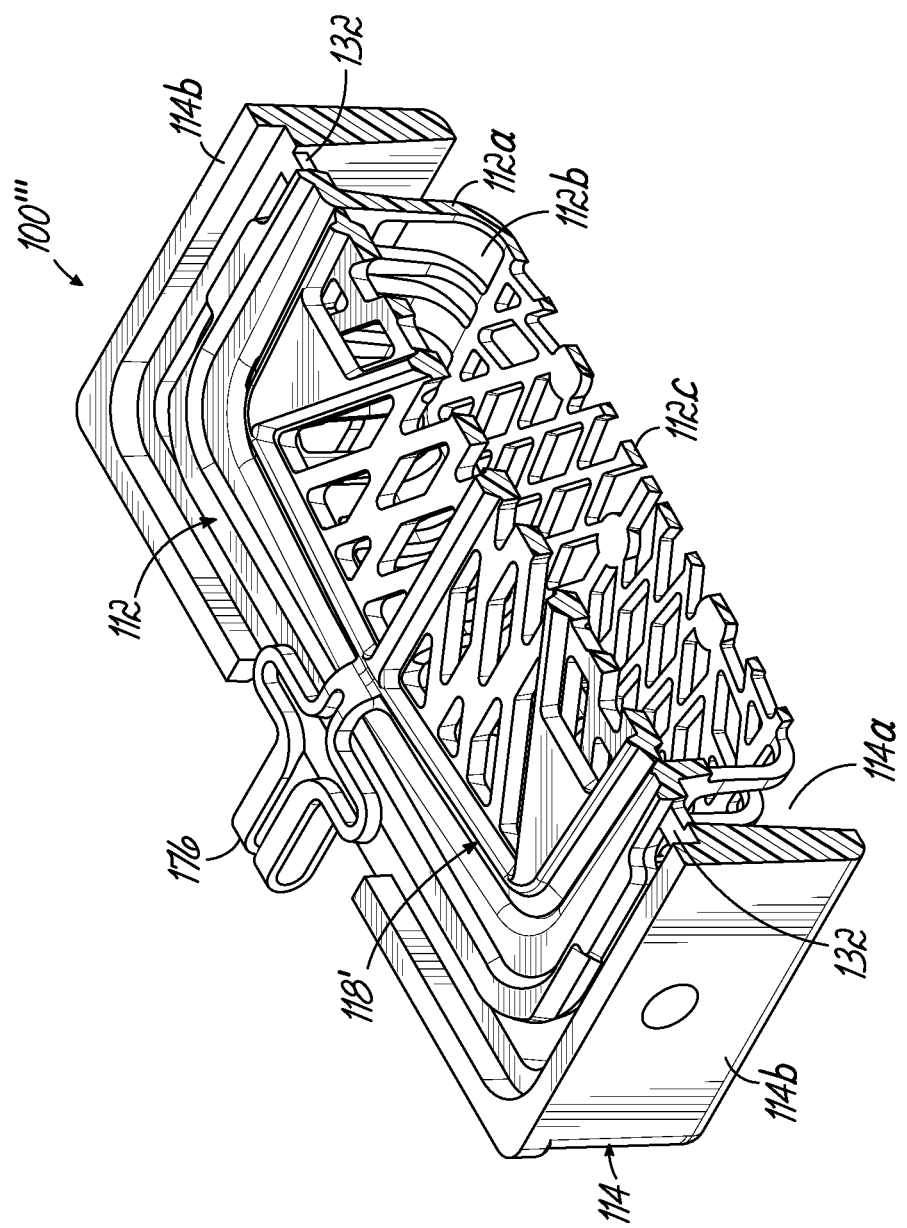
FIG. 20B is a perspective view similar to FIG. 20A, but illustrating the lid portion in a closed position.
Figure 20C:
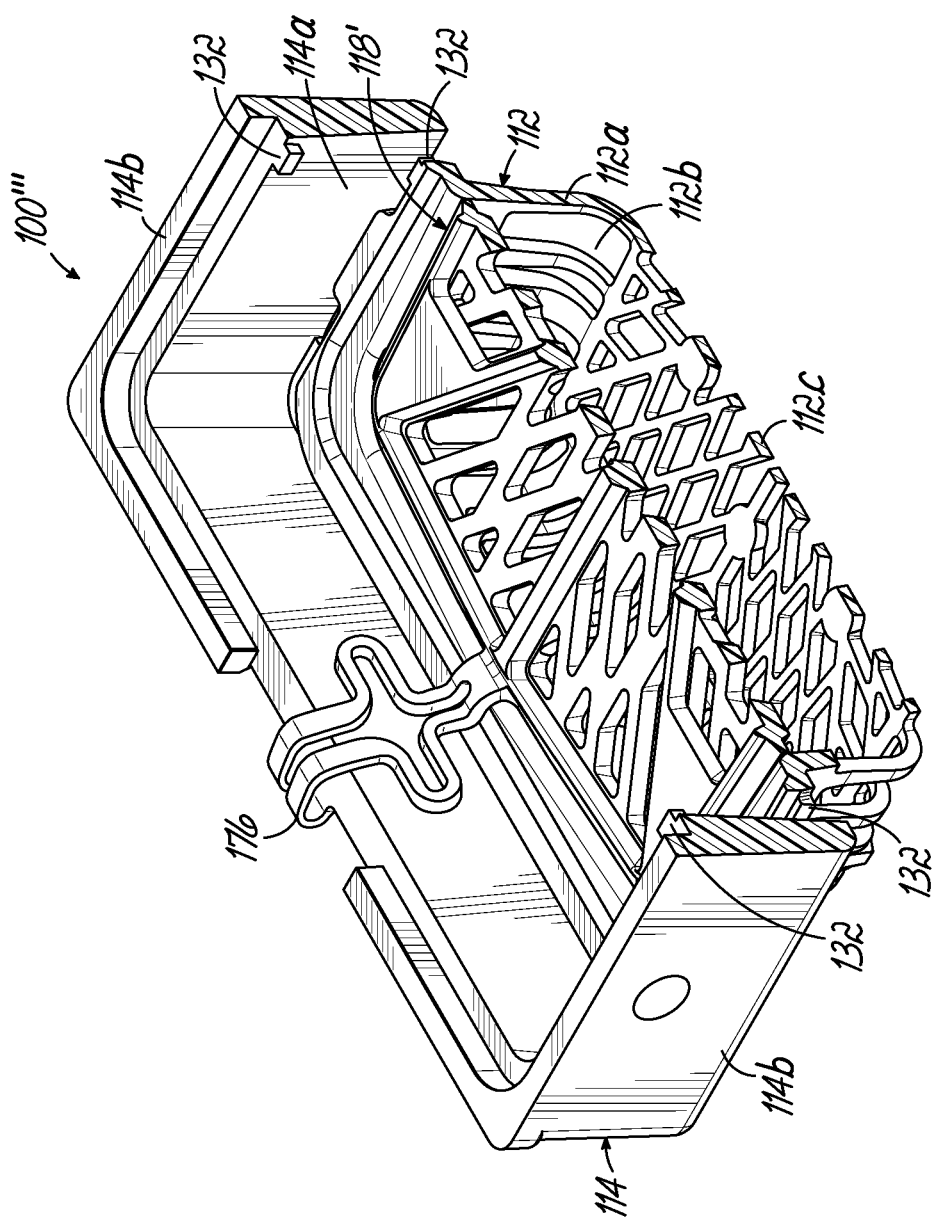
FIG. 20C is a perspective view similar to FIG. 20B, but illustrating the cassette staged or moved downwardly with respect to the frame into a second, staged position.

Now referring to FIGS. 17, 18, 19A and 19B, another illustrative embodiment of a device 100''' is shown and again may be formed from a single material and within a single mold, as will be appreciated from the description to follow. Again, like reference numerals in this embodiment refer to like elements of previous embodiments. In this embodiment, like the embodiment shown and described with regard to FIG. 7 through FIG. 12B, the cassette body 112a is connected to the interior peripheral surfaces of the frame 114 by breakaway material bridges or connections 132. The lid 118' of the cassette 112, however, is designed to fit and latch within the cassette body 112a and to be depressed downwardly into the interior 112b of the cassette body 112a and directly or indirectly against one or more tissue samples 124 therein to retain the tissue sample or samples 124 against the interior bottom surface 112c of the sectionable cassette 112. The "latching" may simply be a friction fit. The material bridges 132 between the cassette body 112a and the frame 114 are designed to be thin and easily frangible as the cassette 112 is staged from the first position to the second position, shown in FIG. 19C. A user or a machine may depress the cassette lid 118' into the cassette body 112a as also shown in FIG. 19C and the cassette lid 118' may snap between two detents 170, 172 as also shown in FIG. 19C. A hinge 176 connects the lid 118' to the frame 114 and has a length such that the cassette lid 118' may extend downwardly into the cassette body 112a as the cassette body 112a is staged from the first position shown in FIG. 19B to the second position shown in FIG. 19C. The structure and function of this illustrative flexible and elongated hinge structure 176 is shown better in FIGS. 20A, 20B and 20C.

Figure 24A:
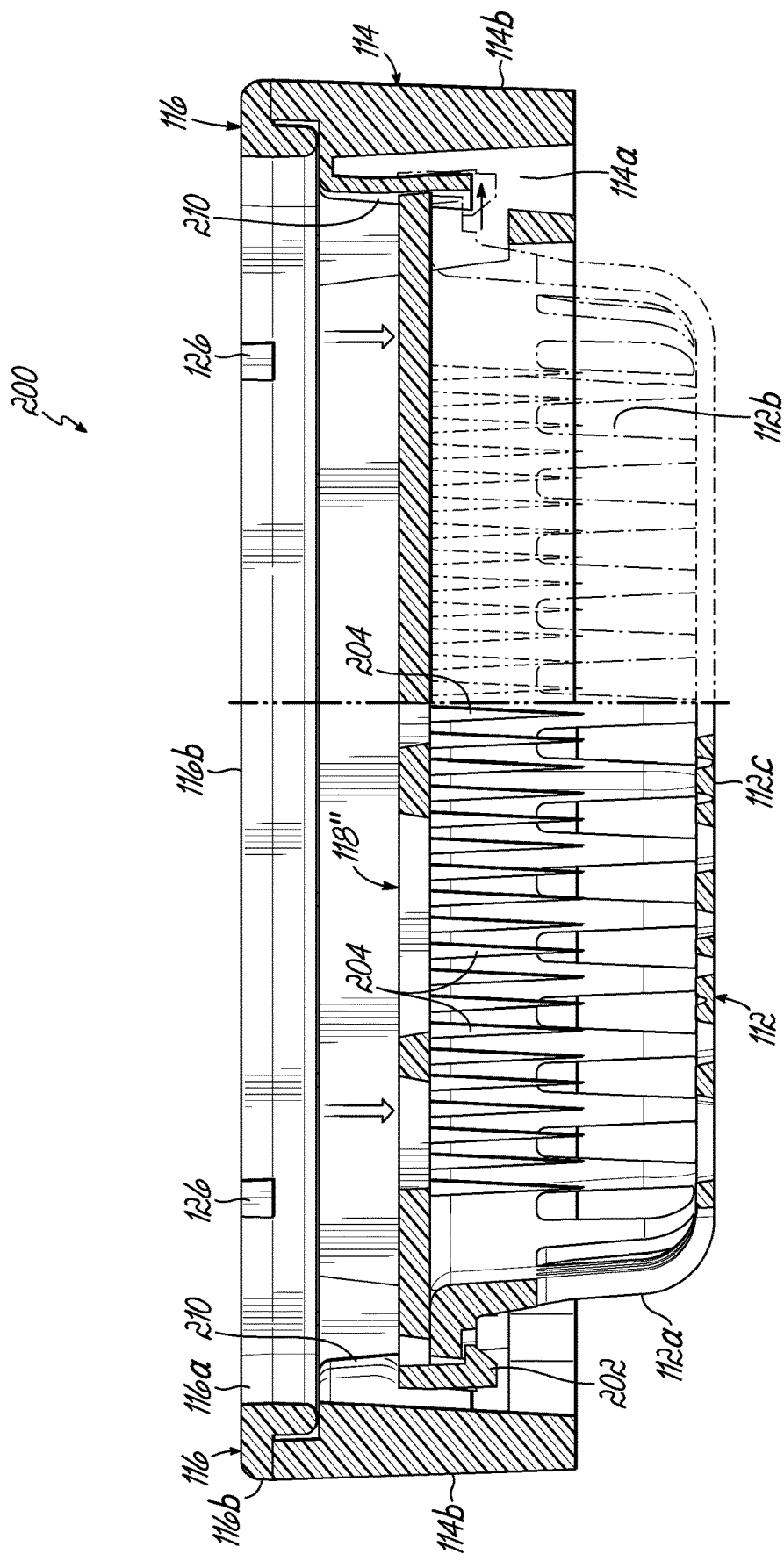
FIG. 24A is a cross sectional view of the structure shown with the cassette in the process of being moved or staged between the first and second positions, with the cross section taken transverse to a lengthwise dimension of the frame and cassette.
Figure 24B:
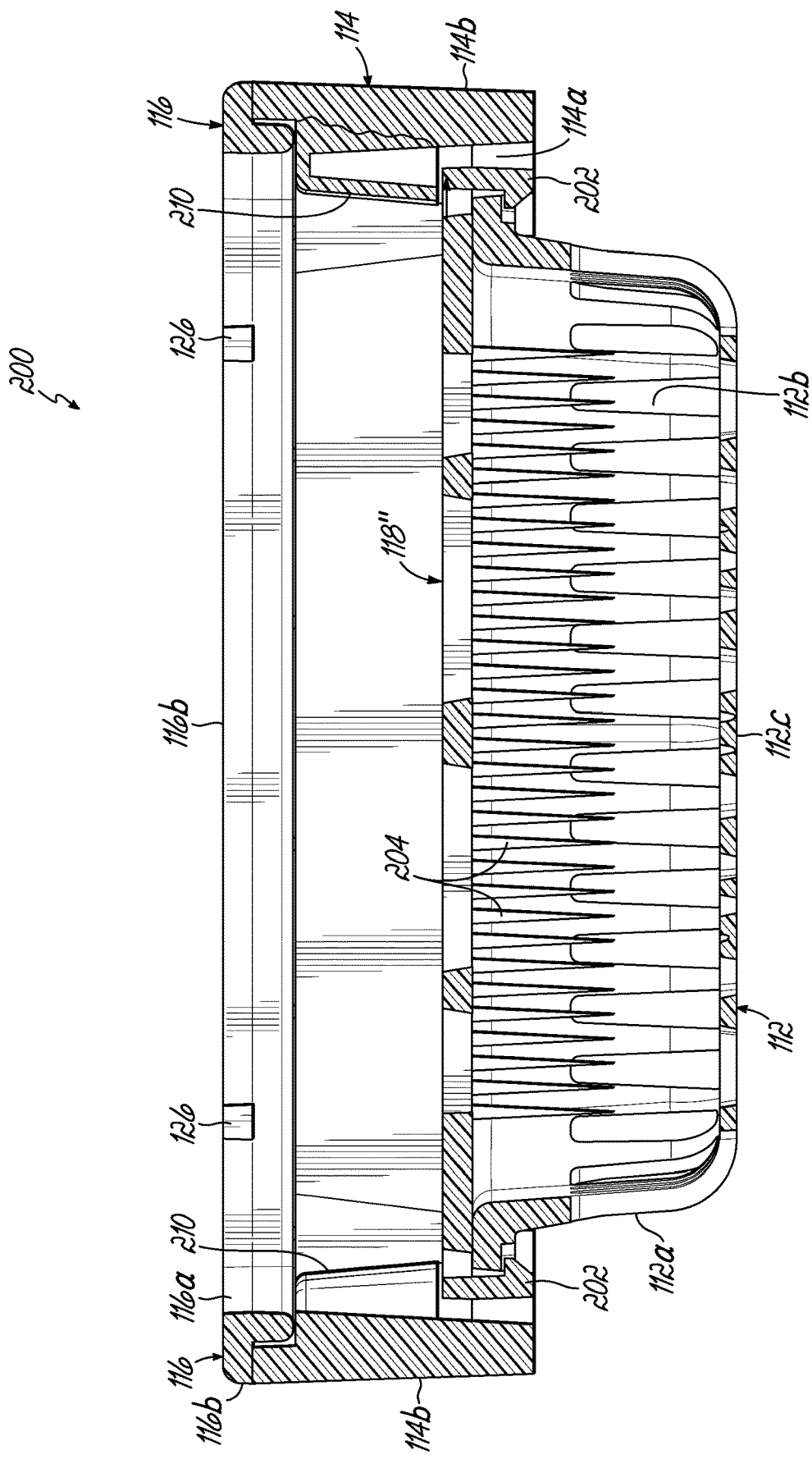
FIG. 24B is a cross sectional view similar to FIG. 24A, but illustrating the cassette staged completely into the second position.

FIGS. 21 through 24B illustrate yet another embodiment of a device 200. Again, this device 200 may be formed from a single material and within a single mold, as will be appreciated from figures and the description to follow, or as in any of the described embodiments, may be formed from different materials using other molding techniques such as co-molding or overmolding or insert-molding. Again, like reference numerals in this embodiment refer to like elements of structure and corresponding function as described with regard to previous embodiments. Therefore, further description of such elements is not repeated here. Elements having one or more prime (') marks are slightly modified from prior, corresponding elements, as will be described and/or readily apparent from the drawings. In this embodiment, like the embodiments previously shown and described, the cassette body 112a is connected to the interior peripheral surfaces of the frame 114 by breakaway material bridges or connections 132. The lid 118" of the cassette 112 is designed to latch to the cassette body 112a using a plurality of latches 202 as shown best in FIGS. 24A & 24B. The lid 118" further includes cutters 130 for previously described reasons. Like previous embodiments, the lid 118" is separable from the peripheral portion 116 of the frame 114. Another difference between this embodiment and previously described embodiments having "resilient structure" for engaging tissue samples within the cassette 112, is that the resilient structure comprises a plurality of linear fingers 204 which may be straight and distally tapered as shown best in FIG. 23A. As alternatively shown in FIG. 23B, the distal ends 204a of the fingers 204 may instead be curved to provide more surface area engagement with one or more tissue samples and a "softer" engagement that is less likely to damage the tissue sample. Another difference between this embodiment and previously described embodiments relates to the method and structure for positioning the cassette 112 and lid 118" within the frame 114. In this regard, as best shown in FIGS. 24A and 24B, each corner of the cassette lid 118" engages with a cassette positioning element 210 that is formed as part of the interior corner of the frame 114. The cassette positioning elements 210 are flexible and hollow such that as the corners of the lid 118" pass by the cassette positioning elements 210 they deform the cassette positioning elements 210 and ultimately "snap" below the cassette positioning elements 210 as shown, for example, in FIGS. 22B and 24B. This retains the cassette 112 and lid 118" in the second position, and ready for embedding and subsequent microtome sectioning, as previously described.

Figure 21:
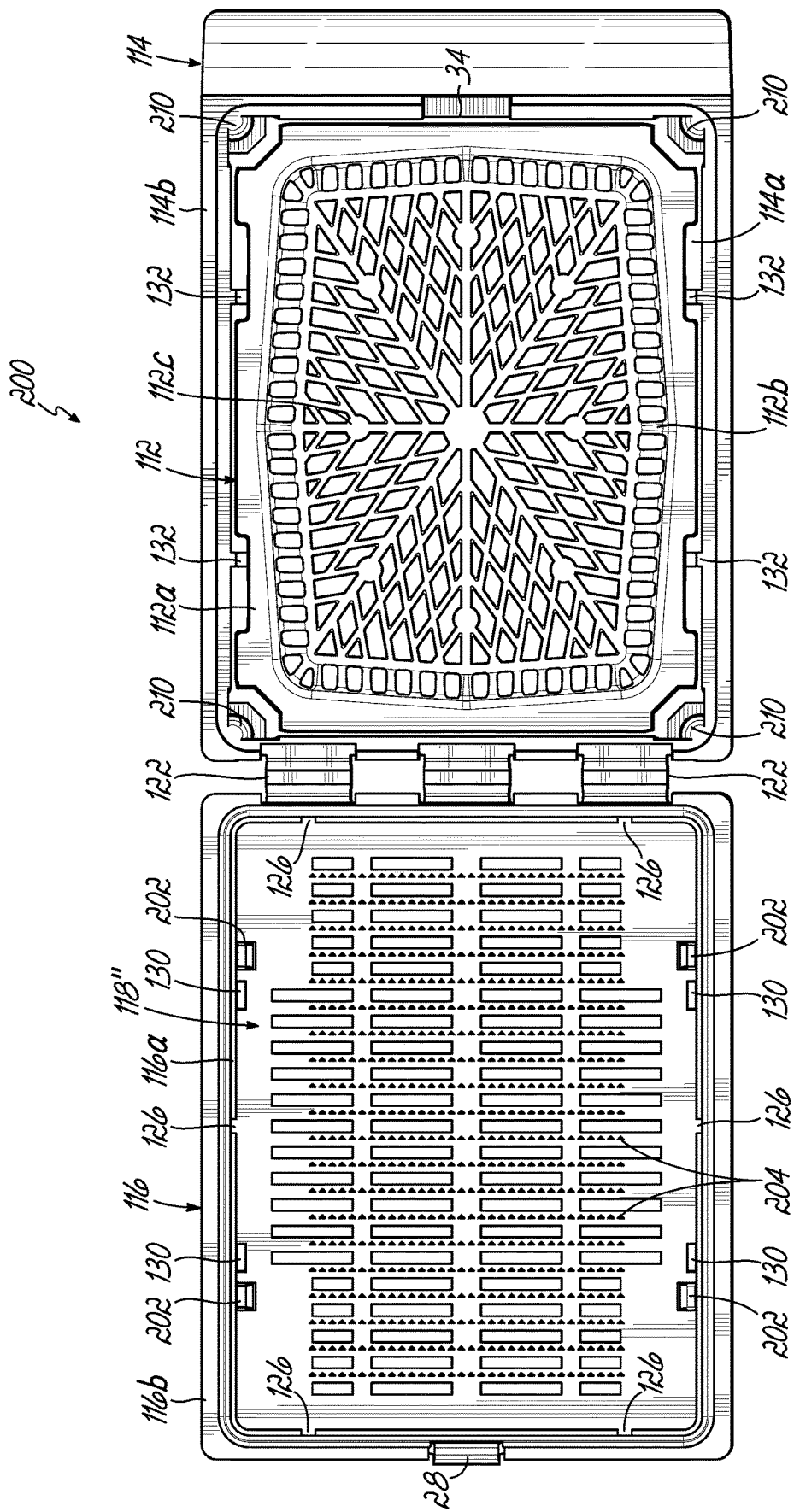
FIG. 21 is a top view of another embodiment illustrating an assembly comprised of an integrated cassette and frame structure.
Figure 22A:
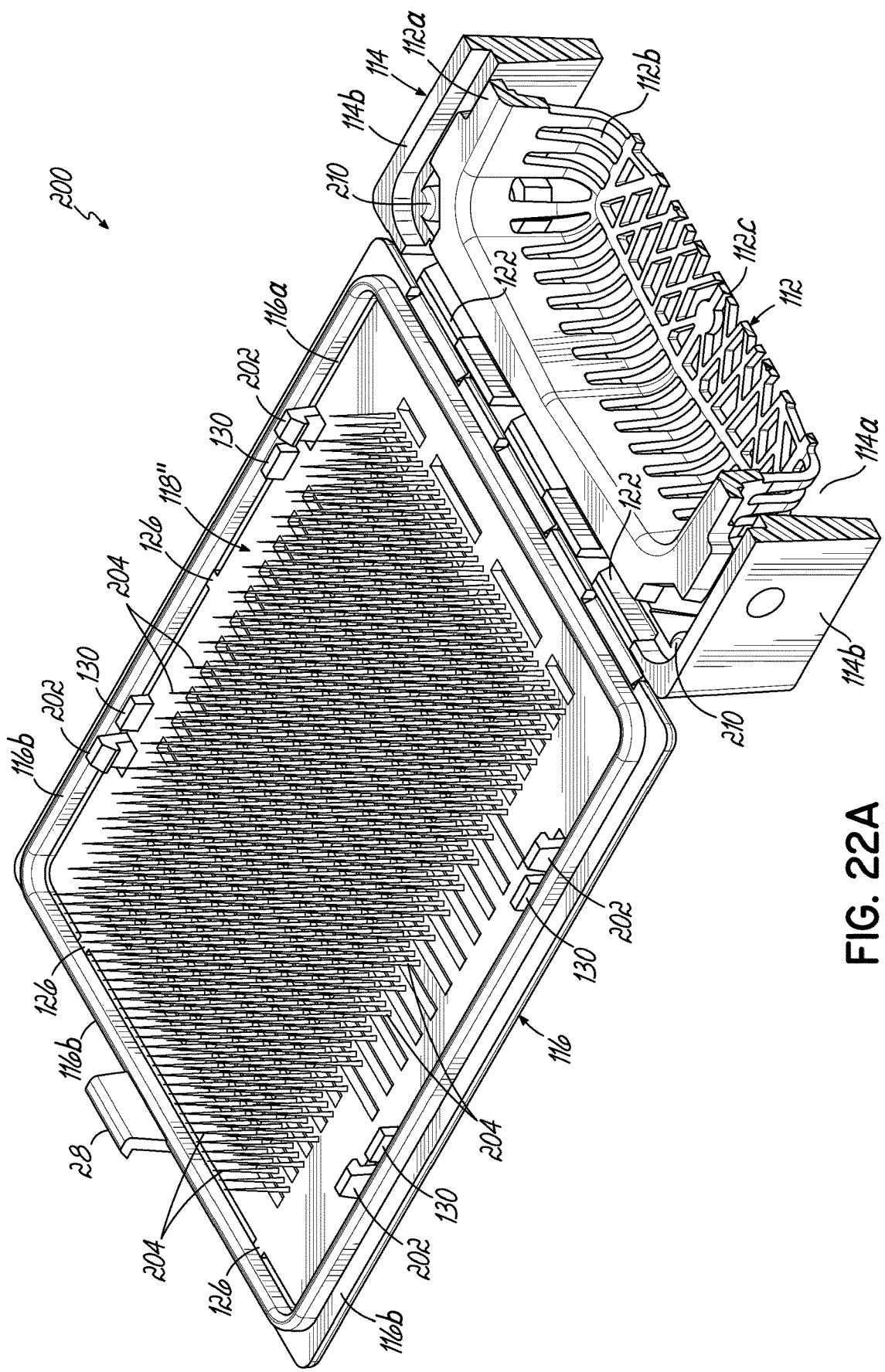
FIG. 22A is a partially fragmented cross sectional view of the structure shown in FIG. 21.
Figure 22B:
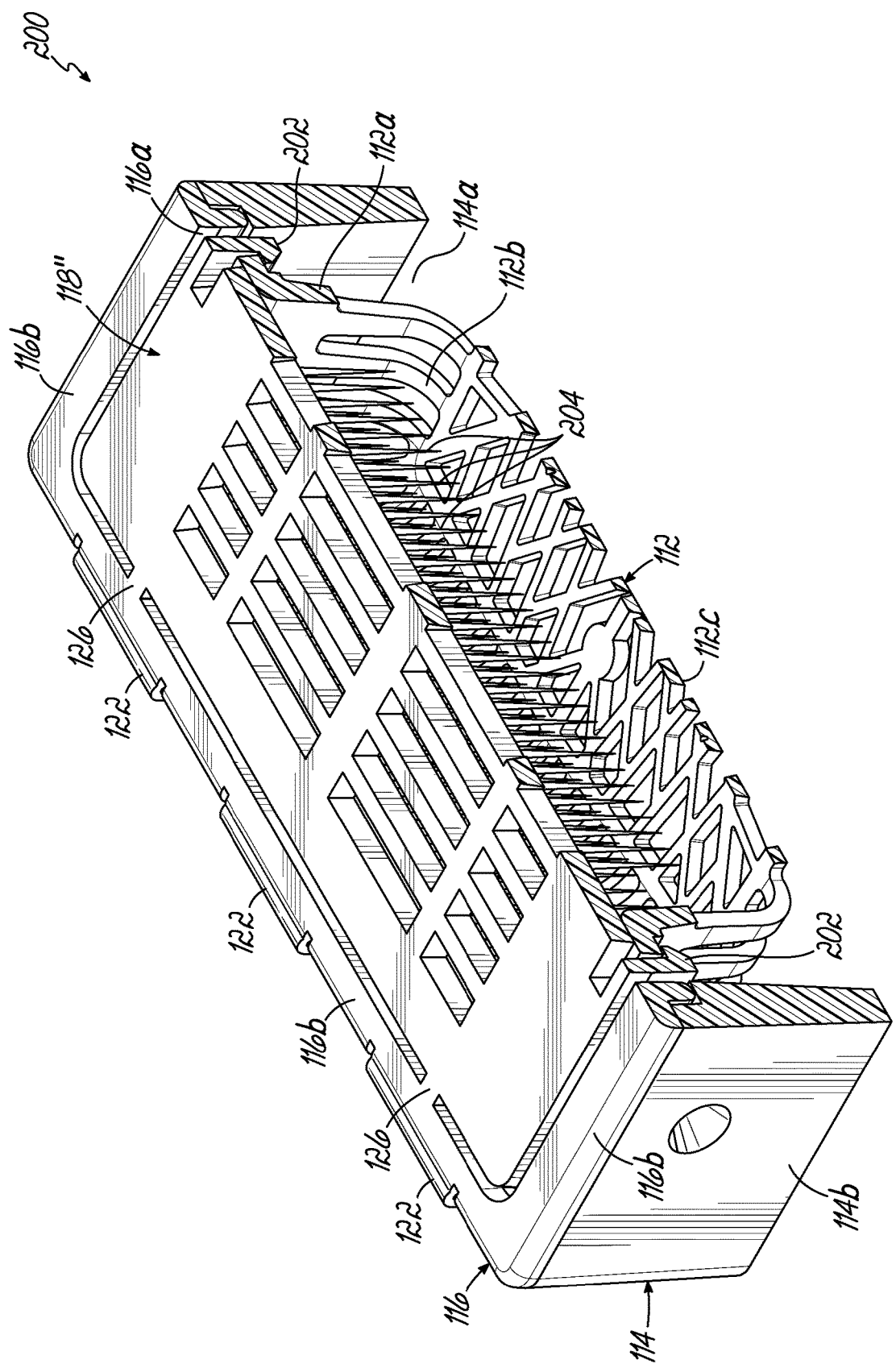
FIG. 22B is a cross sectioned view of the structure shown in FIG. 22A, but illustrating the lid in a closed position.
Figure 22C:
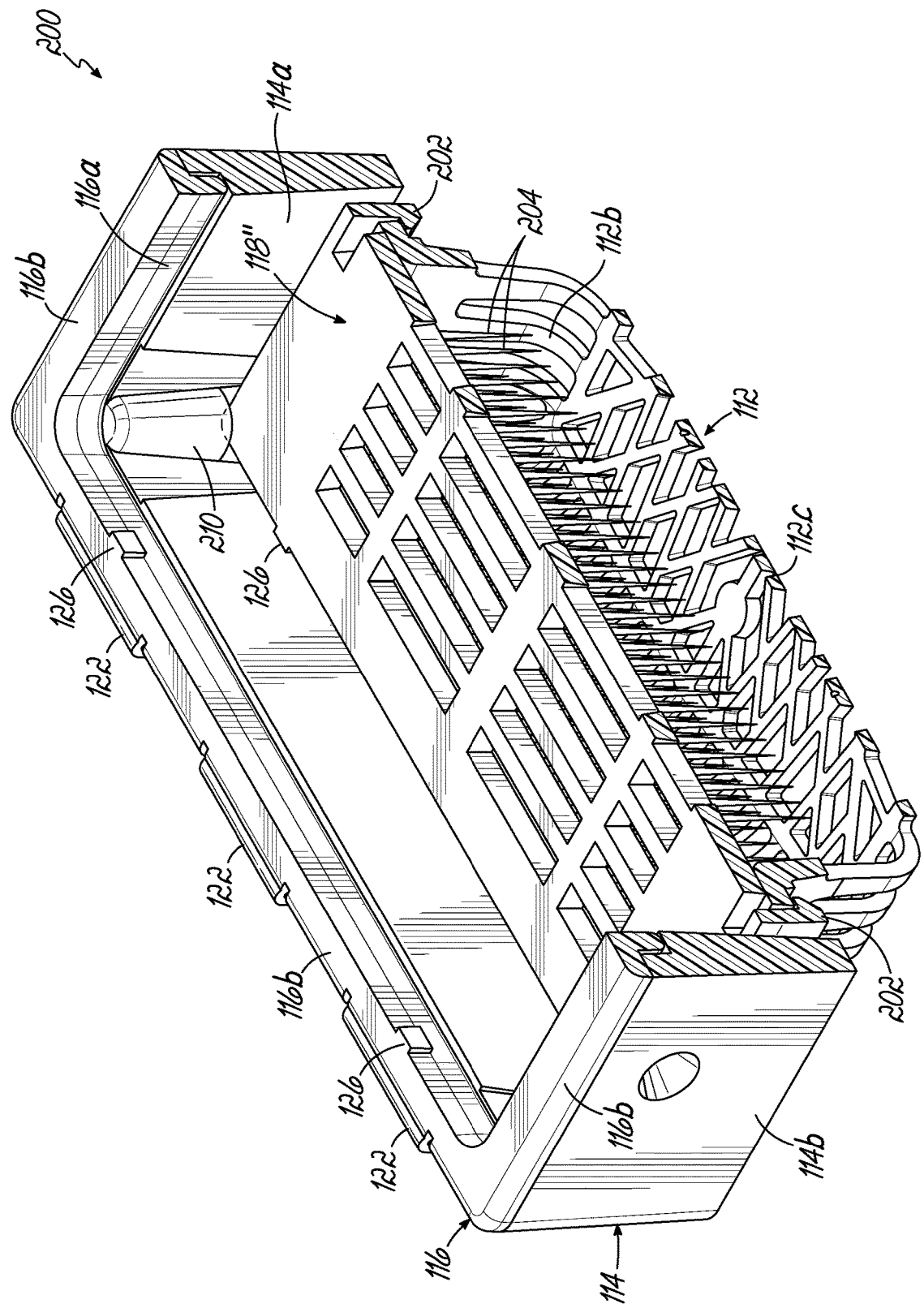
FIG. 22C is a perspective view similar to FIG. 22B, but illustrating the cassette staged to a second position within the frame.
Figure 23B:
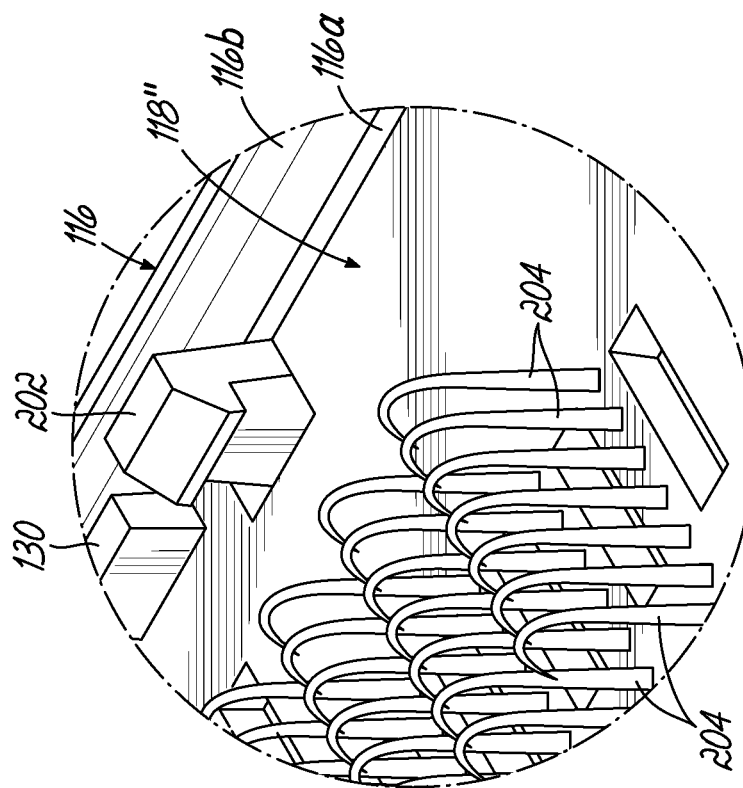
FIGS. 23A and 23B respectively show alternative embodiments of the resilient tissue engaging structure, or fingers, used for holding tissue against a bottom wall of the cassette.
Figure 23A:
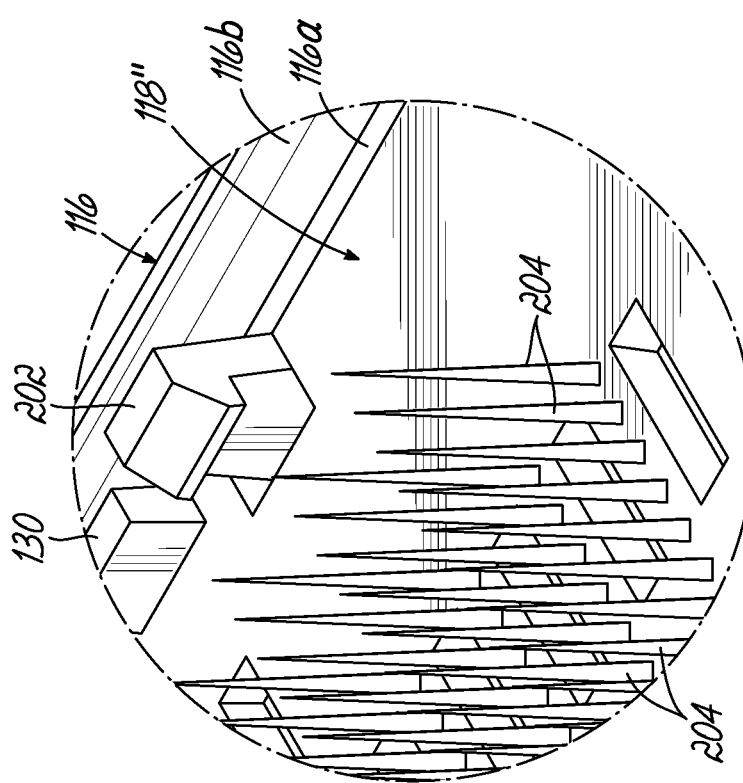

FIGS. 25 through 29C illustrate yet another embodiment of a device 200' similar, for example, to the device 200 shown and described with respect to FIGS. 21 through 24B. While this device 200' may be formed from a single material and also within a single mold, various features have been included so as to make this device more easily and readily molded from at least two different materials for the reasons discussed below. Again, like reference numerals in this embodiment refer to like elements of structure and corresponding function as described with regard to previous embodiments. Therefore, for the sake of brevity further description of such elements and/or methodology is not repeated here. Elements have one or more prime (') marks are slightly modified from prior, corresponding elements, as will either be described or readily apparent from the illustrations. In this embodiment, like the embodiments previously shown and described, the cassette body 112a is connected to the interior peripheral surfaces of the frame 114 by breakaway material bridges or connections 132'. The lid 118" of the cassette 112 includes cutters 130 for the same reasons as previously described. The lid 118" is also designed to latch to the cassette body 112a using undercuts 203a that engage and latch with hook-like members 203b on opposite, inner sides of the cassette body 112a. Like previous embodiments, the lid 118" is separable from the peripheral portion 116 of the frame 114. This embodiment also includes resilient structure carried on the underside of the lid 118". The resilient structure is in the form of curved, resilient fingers 204' for purposes of allowing flexible engagement between distal ends 204a' of the fingers 204' and the one or more tissue samples 124 in the cassette body 112a. Another difference between this embodiment and the embodiment of FIG. 21 is in the structure for positioning the cassette 112 and lid 118" within the frame 114. In this regard, each corner of the cassette lid 118" engages with a cassette positioning element 210' that is formed as part of the interior corner of the frame 114. As with the previously described embodiment, there is one cassette positioning element 210' formed as part of each of the four interior corners of the frame 114. To provide further flexibility as the cassette 112 is moved from the first position shown in FIGS. 29A and 29B to the second position shown in FIG. 29C, a central slot 210a is formed in each of these positioning elements 210'. In a manner similar to that shown and described with regard to FIGS. 21 through 24B, the cassette positioning elements 210' are flexible and hollow such that as the corners of the lid 118" pass by the cassette positioning elements 210' they deform the cassette positioning elements 210' and ultimately "snap" below the cassette positioning elements 210' as shown, for example, in FIG. 29C. This retains the cassette 112 and lid 118" in the second position, and ready for embedding and subsequent microtome sectioning, as previously described.

As previously mentioned, the embodiment of FIGS. 25 through 29C is especially adapted to allow the use of first and second different, moldable materials. More particularly, the material used for the cassette body 112a and the lid 118" is preferably a material that is sectionable in a microtome and has the other various qualities and characteristics as discussed above. As disclosed above and in the incorporated patent properties, this material may be FEP/PFA, polyethylene (PE) based materials, or any other suitable polymeric or other moldable material. The material used for the frame 114 and the peripheral frame portion 116 is a different material, such as acetal, and has a higher melting temperature than the material used for the cassette body 112a and the lid 118". The frame 114 and its peripheral frame portion 116 are also formed from a higher modulus, stiffer material than the material of the cassette body 112a and the lid 118". Among the advantages to this aspect is that the frame 114 has the rigidity needed to be held securely in a microtome chuck during the sectioning procedure described above. The use of different materials, having different thermal and other properties, such as melting temperature and fluid absorption characteristics, presents certain challenges during the molding process, as well as during the histopathologic process used when preparing tissue samples as generally described above. For example, the molding process will inevitably result in the molding material shrinking as the material cools. The use of different materials, such as polyethylene (PE) and acetal, will therefore generally result in different shrinkage rates and/or shrinkage amounts between the components formed of these different materials. During the histopathologic process, the use of processing fluids, such as reagents, will result in swelling of polymeric materials such as PE materials used for the microtome sectionable cassette body 112a and lid 118". The components formed from PE or similar material will therefore swell more than the surrounding components including the frame 114 and the peripheral frame portion 116, which are formed from acetal or similar material. These shrinking and swelling actions can result in undesirable distortions and warpage between the different components formed from different materials. This has been a significant challenge in past development of microtome sectionable histologic biopsy sample cassettes. For example, a microtome sectionable cassette formed of PE would swell and warp to an unacceptable extent within the stiffer, acetal cassette during tissue processing in a liquid reagent bath. Therefore, much more expensive materials such as PFA were used instead because they would not swell to such a great extent.

Figure 25:
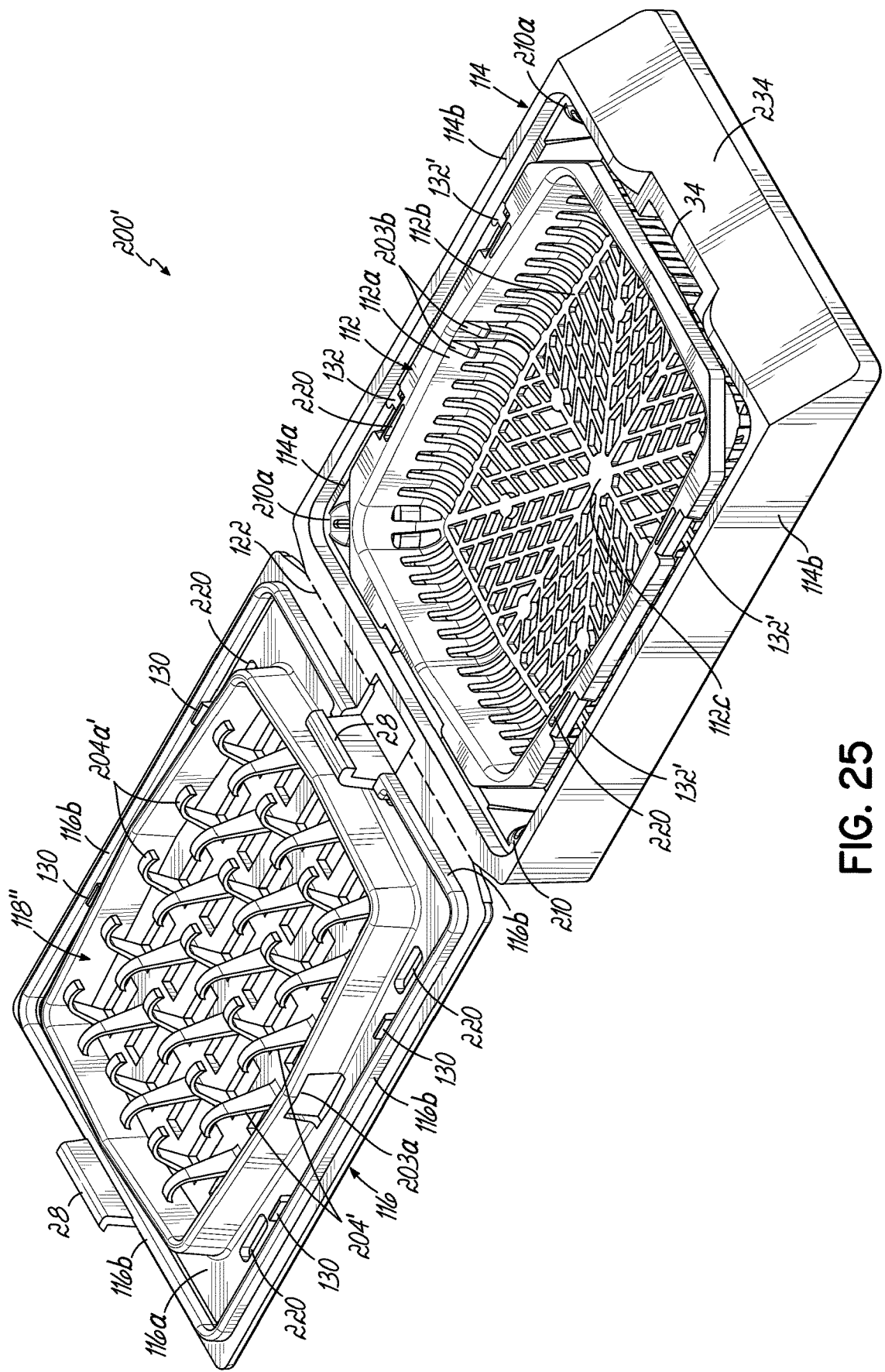
FIG. 25 is a perspective view of another embodiment illustrating an assembly or apparatus comprised of an integrated cassette and frame structure.
Figure 26:
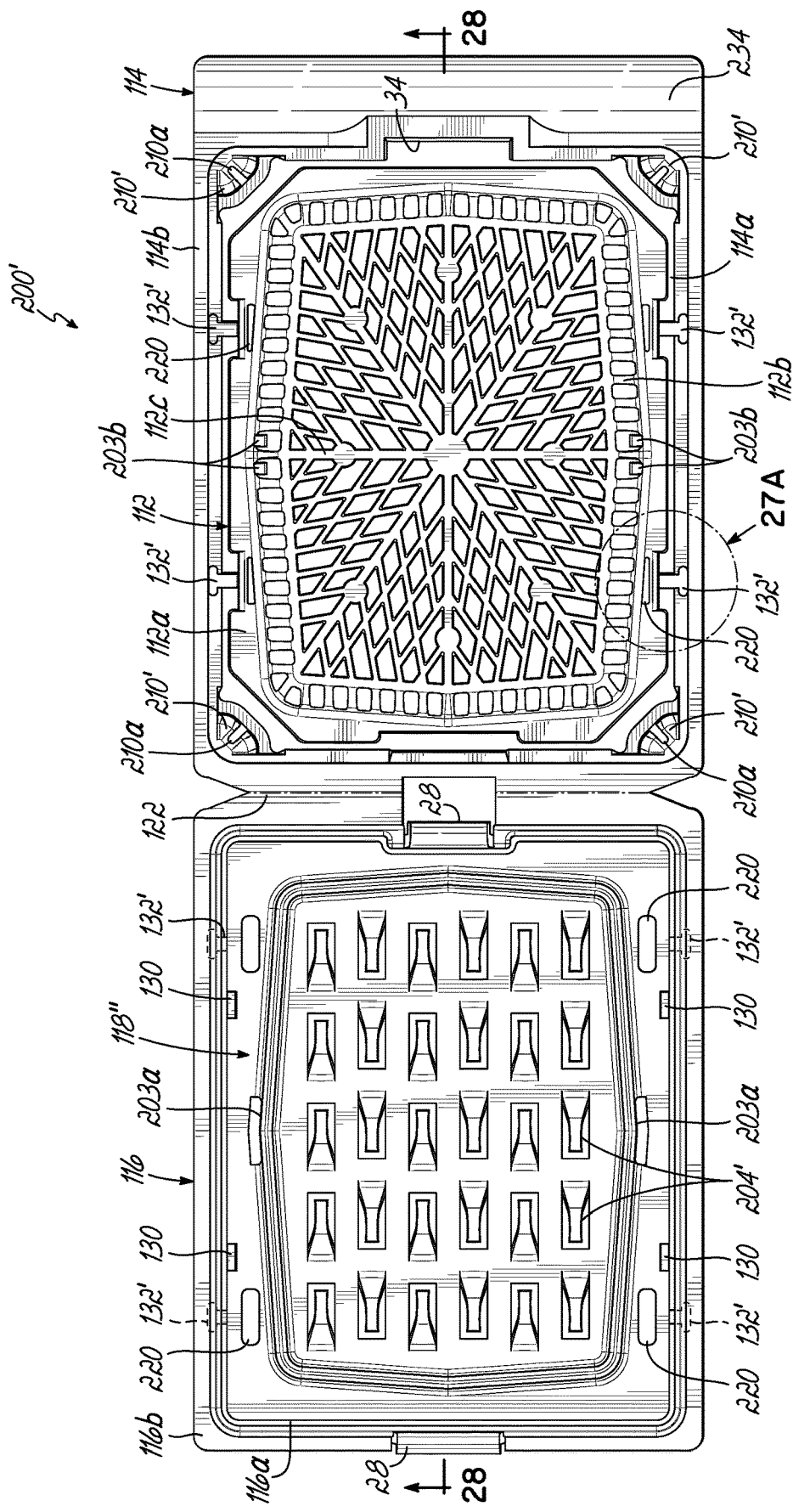
FIG. 26 is a top view of the assembly shown in FIG. 25.
Figure 27B:
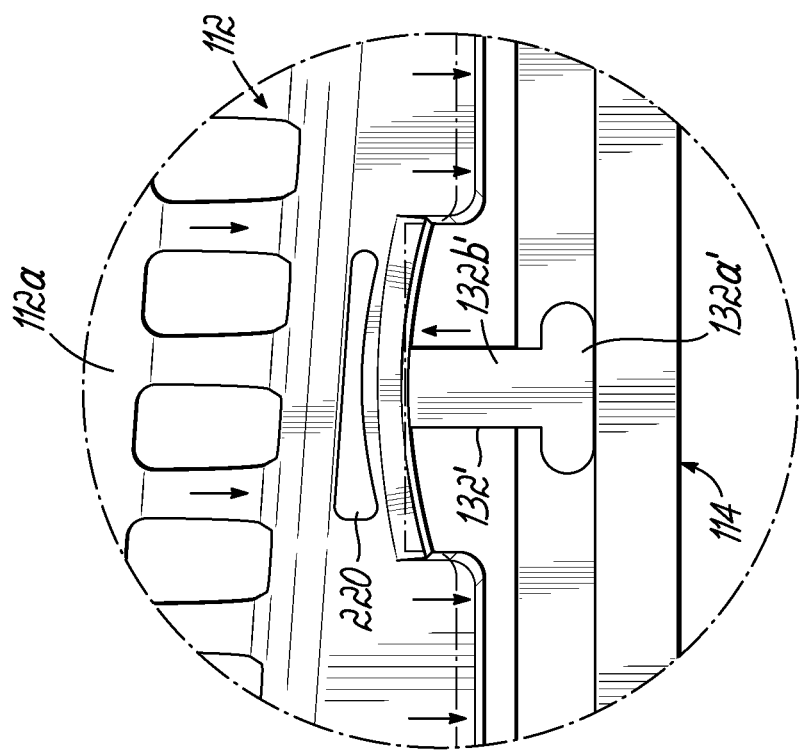
FIG. 27B is an enlarged view of the encircled portion "27A" but illustrating the connecting bridge or structure in a biased or second position.
Figure 27A:
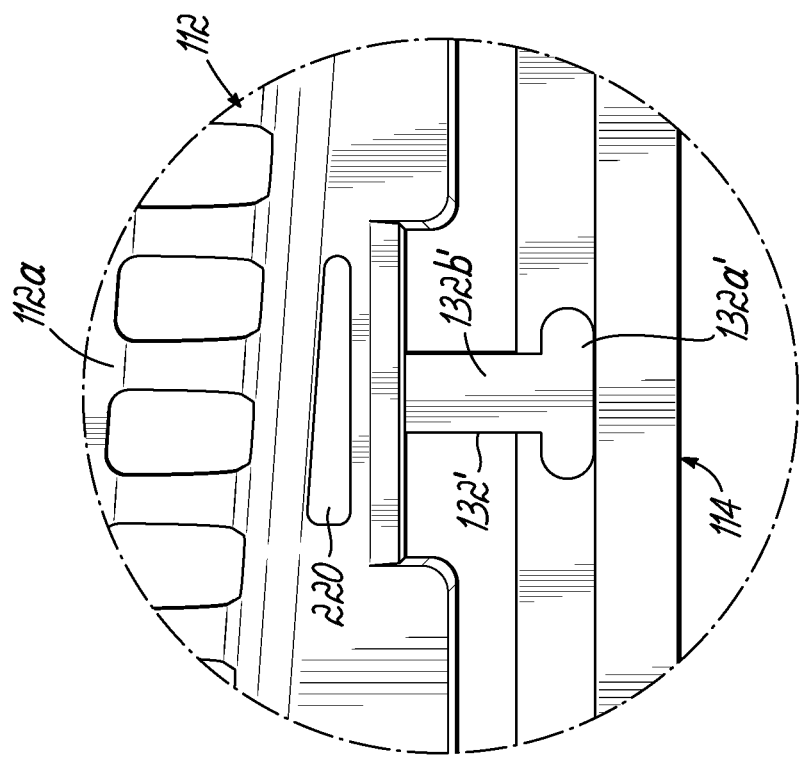
FIG. 27A is an enlarged view of encircled portion "27A" shown in FIG. 26.
Figure 29B:
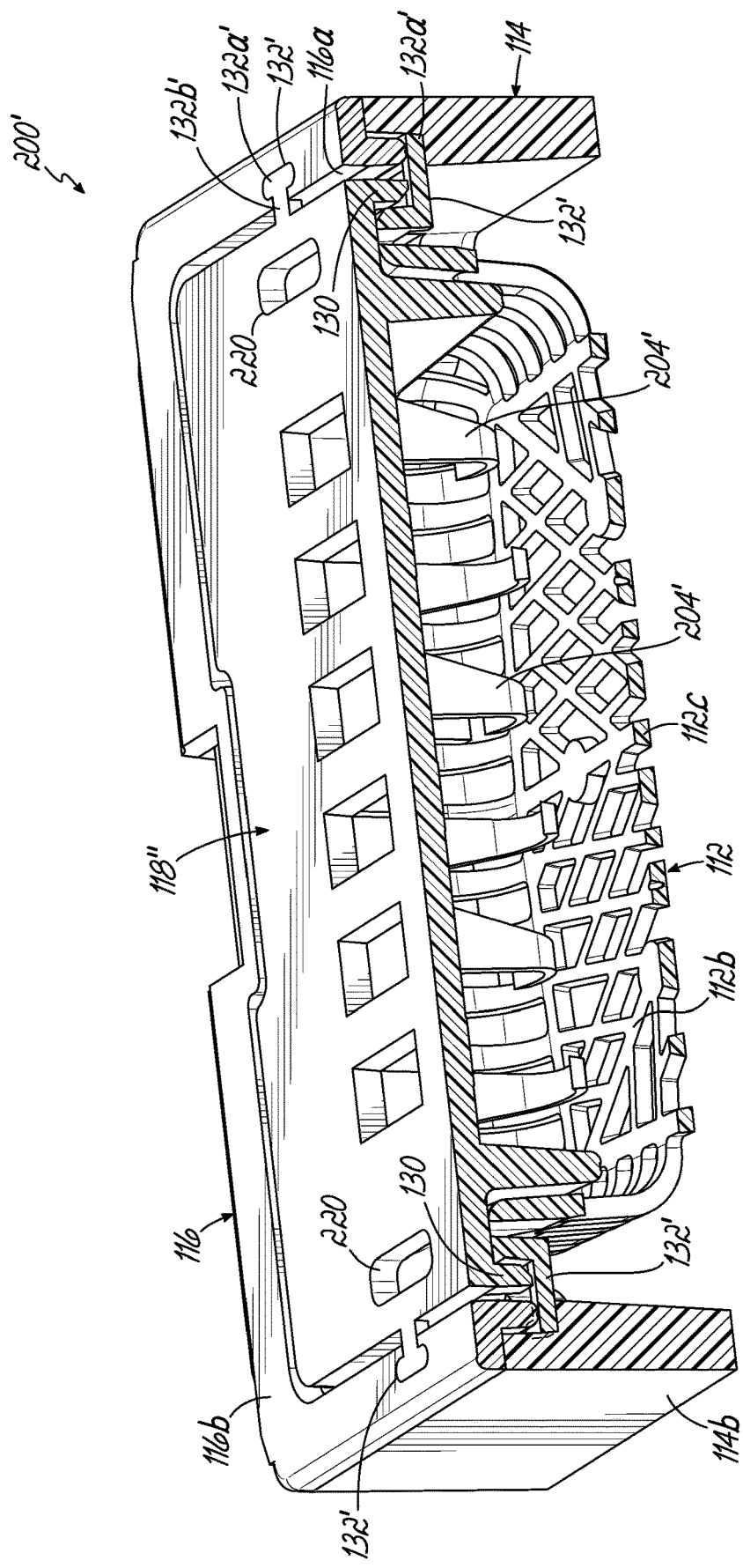
FIG. 29B is a sectioned, perspective view similar to FIG. 29A, but showing the lid in a closed position.
Figure 29C:
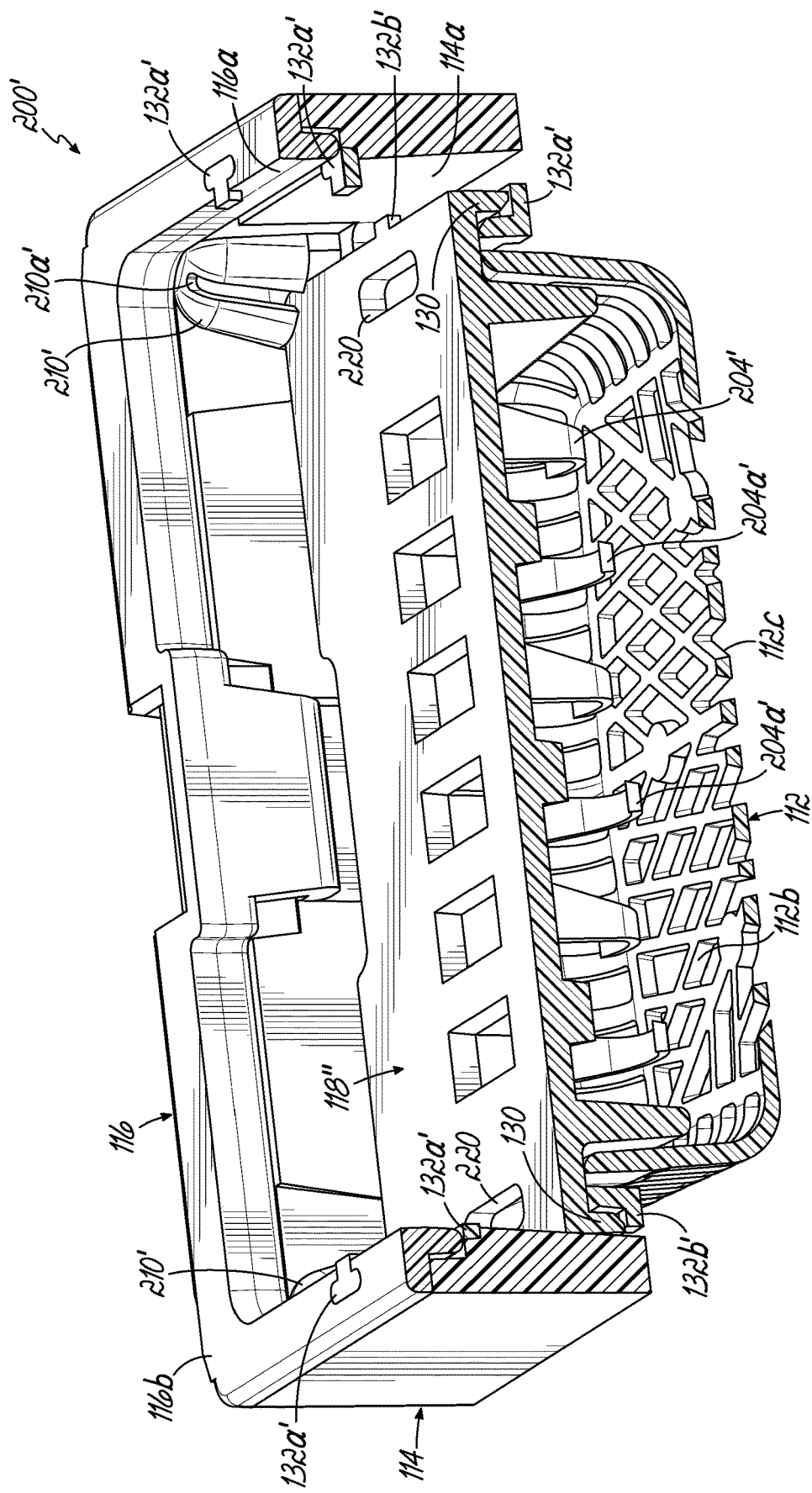
FIG. 29C is a sectioned, perspective view similar to FIG. 29B but showing the cassette and its lid in a second, staged position relative to the frame.

To accommodate and prevent such movements or distortions between the components formed of different materials, especially PE and acetal, a special bridge construction 132' is used, such as shown in FIGS. 27A and 27B. In this embodiment, undesirable distortions and warpage is prevented between the peripheral frame portion 116 and the attached (integrally molded) lid 118", and also between the frame 114 and the attached (integrally molded) cassette body 112a. In this construction, the bridge 132' is formed with a "T" shape such that the cross member 132a' of the "T" is used as an anchor in the frame 114 constructed of a first material (such as acetal) and the straight portion 132b' of the "T" is molded and connects with the other component, in this case the cassette body 112a formed of a second, different material (such as PE). The bridge 132' is molded with the cassette body 112a and is therefore also formed from the second material (e.g., PE). The cassette body 112a further includes an opening 220 toward which the T-shaped bridge member 132' may be biased or moved during relative movement between the cassette body 112a and the frame 114. In this manner, the relative movement is accommodated without causing warpage or other undesirable distortions between the cassette body 112a and the frame 114 either during molding of the device 200' or as a result of its subsequent use in a tissue processing operation as described above. It will be appreciated that the breakaway connecting structure 132' shown in FIGS. 27A and 27B is a connecting structure that will accommodate movement in either direction although the movement is only shown in one direction in FIG. 27B, in order to accommodate and prevent distortions or warpage of the cassette body 112a in this case relative to the frame 114. It will further be appreciated that the frame 114 and the cassette body 112a have four such breakable connections or bridges 132' as generally shown in FIG. 25, and the lid 118" and peripheral frame portion 116 similarly have four such breakable connections or bridges 132' as also shown in dashed lines in FIGS. 25 & 26, and more specifically shown in FIG. 29B (only two connections 132' shown). All eight connections 132' facilitate not only the breakaway connection features as discussed in regard to other embodiments described herein, but also reduced or minimized distortions/warpage between the peripheral frame portion 116 and lid 118", and also between the frame 114 and cassette body 112a. The respective cassette body 112a, lid 118" and all eight bridges or connectors 132' are molded from the second, relatively low melting temperature material, while the frame 114 and peripheral frame portion 116 are molded from the first material which has a higher melting temperature than the second material. The respective cassette body 112a and lid 118" are constructed with outer dimensions sufficiently smaller than the interior dimensions of the respective frame 114 and frame portion 116 to accommodate movement such as shrinking or swelling and, in particular, swelling of the interior component. The cassette body 112a and the lid 118" will not contact the surrounding component, i.e., the frame 114 or the peripheral frame portion 116, due to swelling of the cassette body 112a or lid 118".

Figure 30:
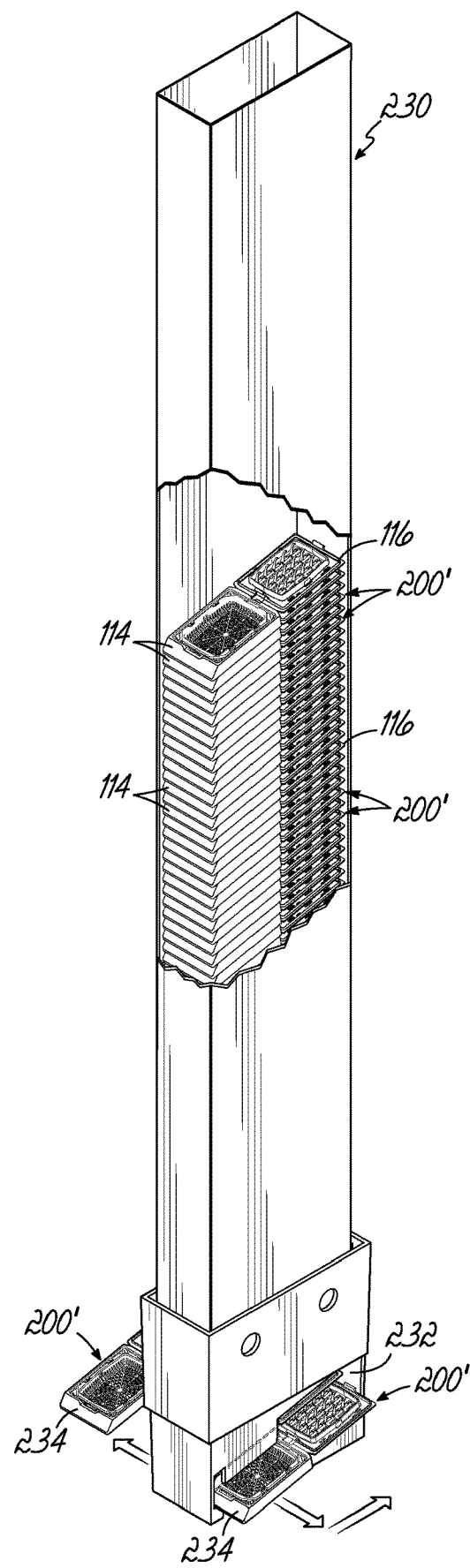
FIG. 30 is a perspective view illustrating a magazine or holder for a stack of the integrated cassette and frame structures shown in FIG. 25.
Figure 31A:
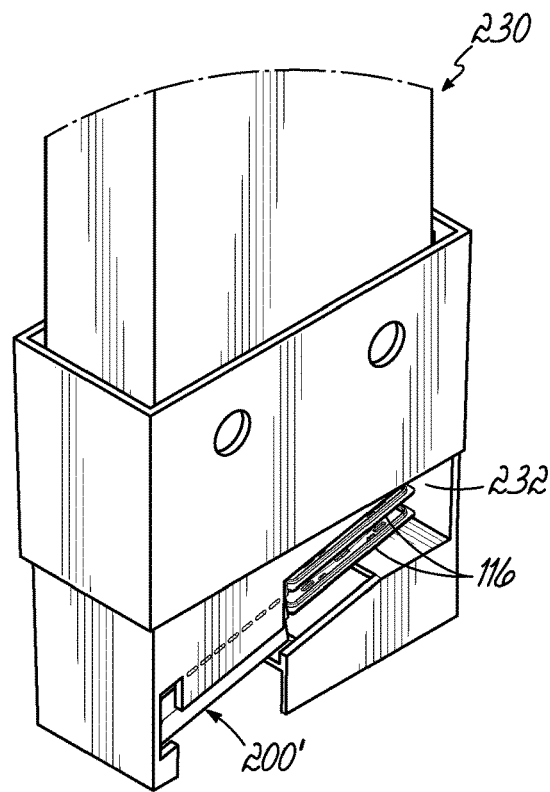
FIG. 31A is an enlarged perspective view of the unloading end of the magazine shown in FIG. 30.
Figure 31B:
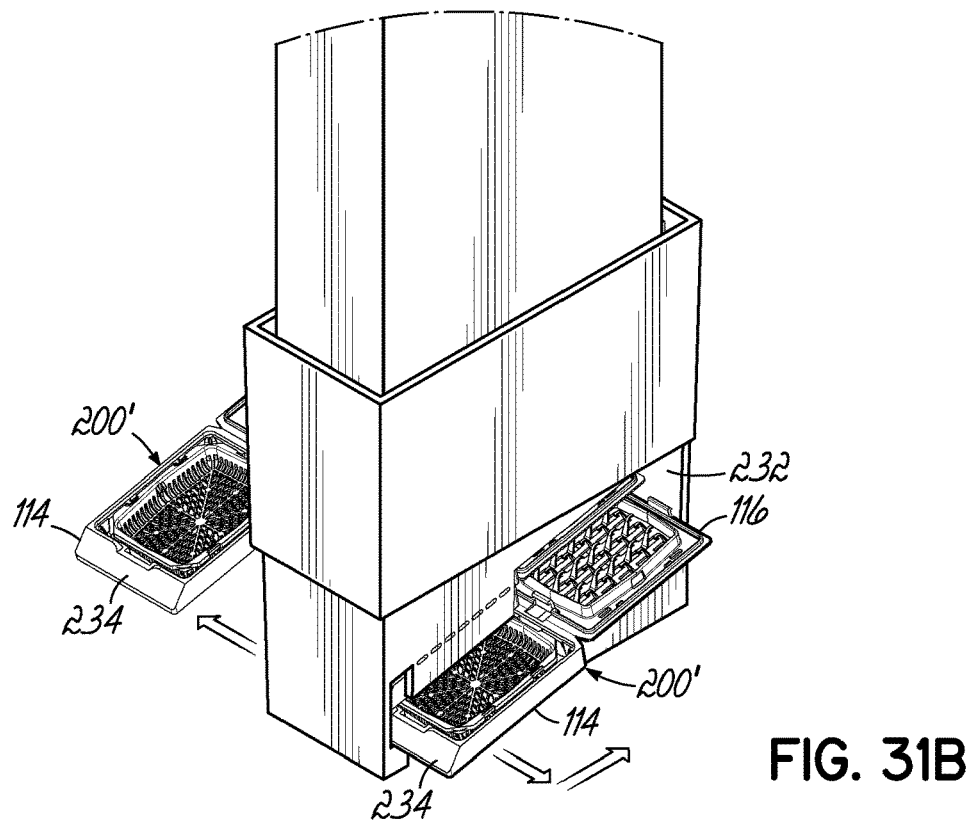
FIG. 31B is an enlarged perspective view similar to FIG. 31A, but illustrating the integrated cassette and frame structures respectively being unloaded from the magazine.

FIGS. 30, 31A and 31B illustrate a magazine 230 for holding and dispensing integrated cassette and frame structures or assemblies, such as the device 200' described immediately above with respect to FIGS. 25 through 29C. Because the two-material molded device 200' is formed with a relatively rigid and planar structure in which the lid 118" is held in an open position relative to the frame 114 by a relatively stiff frangible hinge structure 22', the devices 200' may be readily stacked as shown in FIG. 30 and stored, transported, and ultimately dispensed from the magazine 230 as shown. Each device 200' will be self-supporting in the configuration shown with the frame portion 116 and lid 118" held generally horizontal with the frame 114. The stack of devices 200' will typically be vertically oriented, as shown in FIG. 30, and will gravity feed to a lower output slot 232 of the magazine such that the devices 200' may be dispensed from either side of the magazine 230 by being pushed out of the magazine output slot 232 in either direction, as illustrated. This is helpful because the first step in a typical histopathologic process or operation is to print an accession number or tracking number on the frame 114 of the device 200'. This will be accomplished by printing the number on the angled front face 234 of each frame 114 or on a label (not shown) applied to the front face 234. Therefore, the device 200' readily lends itself to automated dispensing from the magazine 230 to a printer (not shown) for the printing operation. Subsequently, the device 200' may be used as generally described above.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method for preparing one or more biopsy tissue samples for histological examination using a histologic tissue sample support device, the support device including a microtome sectionable tissue cassette, a frame including a peripheral portion, and a lid separably coupled to the peripheral portion of the frame, comprising:
    positioning a tissue sample in the tissue cassette;
    closing the peripheral portion of the frame and the lid when the tissue cassette is in a first position relative to the frame;
    separating the lid from the peripheral portion of the frame; and
    moving the lid and the tissue cassette into a second position relative to the frame where a portion of the tissue cassette extends beyond an edge of the frame for sectioning in the microtome.

2. The method of claim 1, further comprising:
    subjecting the tissue cassette and the tissue sample to a process that replaces fluid in the tissue sample with a hardenable material before or after moving the lid and the tissue cassette into the second position;
    embedding the tissue cassette and the tissue sample in an embedding material; hardening the embedding material into a block; and
    slicing the block with a microtome into thin slices of the embedding material, the tissue cassette, and the tissue sample.

3. A method for manufacturing an apparatus for holding a histologic tissue sample while sectioning the tissue sample in a microtome, comprising:
    molding a tissue cassette having a recess including at least one side wall and a bottom wall, the tissue cassette being formed of a first material that can be successfully sectioned in a microtome, said tissue cassette further being resistant to degradation from solvents and chemicals used to fix and process the tissue sample during a histologic procedure; and
    molding a frame such that the frame is integrally coupled with the tissue cassette, the frame having a peripheral portion, the frame being formed from a second material different from the first material, and including a lid separably coupled to the peripheral portion.

4. The method of claim 3, further comprising:
molding the lid from the first material.

5. A method for manufacturing an apparatus for holding a histologic tissue sample while sectioning the tissue sample in a microtome, comprising:
- molding a tissue cassette having a recess including at least one side wall and a bottom wall, the tissue cassette being formed of a first material that can be successfully sectioned in a microtome, said tissue cassette further being resistant to degradation from solvents and chemicals used to fix and process the tissue sample during a histologic procedure;
- molding a frame such that the frame is integrally coupled with the tissue cassette, the frame being formed from the first material;
- molding a peripheral portion of the frame; and
- molding a lid separably coupled to the peripheral portion and surrounded by the peripheral portion, wherein the lid and the peripheral portion are formed of the first material.

6. A method for preparing one or more biopsy tissue samples for histological examination using a histologic tissue sample support device, the support device including a microtome sectionable tissue cassette, a frame, and a lid coupled to the frame, comprising:
- positioning a tissue sample in the tissue cassette;
- closing the lid when the tissue cassette is in a first position relative to the frame; and
- moving the lid and the tissue cassette into a second position relative to the frame where a portion of the tissue cassette extends beyond an edge of the frame for sectioning in the microtome.

7. The method of claim 6, further comprising:
- subjecting the tissue cassette and the tissue sample to a process that replaces fluid in the tissue sample with a hardenable material before or after moving the lid and the tissue cassette into the second position;
- embedding the tissue cassette and the tissue sample in an embedding material;
- hardening the embedding material into a block; and
- slicing the block with a microtome into thin slices of the embedding material, the tissue cassette, and the tissue sample.

* * * * *